US010875153B2

(12) United States Patent
Bajaj et al.

(10) Patent No.: US 10,875,153 B2
(45) Date of Patent: *Dec. 29, 2020

(54) ADVANCED POLISHING PAD MATERIALS AND FORMULATIONS

(71) Applicant: Applied Materials, Inc., Santa Clara, CA (US)

(72) Inventors: Rajeev Bajaj, Fremont, CA (US); Daniel Redfield, Morgan Hill, CA (US); Mahendra C. Orilall, Santa Clara, CA (US); Boyi Fu, San Jose, CA (US); Ashwin Chockalingam, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,384

(22) Filed: Jan. 20, 2016

(65) Prior Publication Data

US 2016/0136787 A1    May 19, 2016

Related U.S. Application Data

(63) Continuation-in-part of application No. 14/920,801, filed on Oct. 22, 2015, which is a continuation-in-part
(Continued)

(51) Int. Cl.
*B24D 11/00* (2006.01)
*B24D 3/28* (2006.01)
(Continued)

(52) U.S. Cl.
CPC ............ *B24D 11/001* (2013.01); *B24B 37/22* (2013.01); *B24B 37/24* (2013.01); *B24B 37/26* (2013.01);
(Continued)

(58) Field of Classification Search
CPC ......... B24B 37/24; B24B 37/26; B24B 37/22; B33Y 10/00; B33Y 80/00; B33Y 70/00;
(Continued)

(56) References Cited

U.S. PATENT DOCUMENTS 3,741,116 A    6/1973 Green et al.
4,459,779 A    7/1984 Shen
(Continued)

FOREIGN PATENT DOCUMENTS

CN    1345264 A    4/2002
CN    1387469 A    12/2002
(Continued)

OTHER PUBLICATIONS

The Dow Chemical Company—"Specialty Elastomers for Automotive TPO Compounds" brochure, Nov. 2006, 8 pages.
(Continued)

*Primary Examiner* — Shuangyi Abu Ali
(74) *Attorney, Agent, or Firm* — Patterson + Sheridan LLP

(57) ABSTRACT

Embodiments of the present disclosure relate to advanced polishing pads with tunable chemical, material and structural properties, and new methods of manufacturing the same. According to one or more embodiments of the disclosure, it has been discovered that a polishing pad with improved properties may be produced by an additive manufacturing process, such as a three-dimensional (3D) printing process. Embodiments of the present disclosure thus may provide an advanced polishing pad that has discrete features and geometries, formed from at least two different materials that include functional polymers, functional oligomers, reactive diluents, and curing agents. For example, the advanced polishing pad may be formed from a plurality of polymeric layers, by the automated sequential deposition of at least one
(Continued)

resin precursor composition followed by at least one curing step, wherein each layer may represent at least one polymer composition, and/or regions of different compositions.

21 Claims, 16 Drawing Sheets

Related U.S. Application Data of application No. 14/887,240, filed on Oct. 19, 2015, which is a continuation-in-part of application No. 14/885,950, filed on Oct. 16, 2015, now Pat. No. 10,384,330.

(60) Provisional application No. 62/065,270, filed on Oct. 17, 2014, provisional application No. 62/065,193, filed on Oct. 17, 2014.

(51) Int. Cl.
  *B24B 37/24* (2012.01)
  *B24B 37/22* (2012.01)
  *B24D 11/04* (2006.01)
  *B24B 37/26* (2012.01)
  *B33Y 10/00* (2015.01)
  *B33Y 70/00* (2020.01)
  *B33Y 80/00* (2015.01)

(52) U.S. Cl.
  CPC ............... *B24D 3/28* (2013.01); *B24D 11/04* (2013.01); *B33Y 10/00* (2014.12); *B33Y 70/00* (2014.12); *B33Y 80/00* (2014.12)

(58) Field of Classification Search
  CPC ........ B24D 11/001; B24D 11/04; B24D 3/28; B29C 2035/0827; B29C 35/0805; B29C 67/0059; B29K 2033/04; B29K 2995/0077
  See application file for complete search history.

(56) References Cited

U.S. PATENT DOCUMENTS

| | | |
|---|---|---|
| 4,575,330 A | 3/1986 | Hull |
| 4,836,832 A | 6/1989 | Tumey et al. |
| 4,844,144 A | 7/1989 | Murphy et al. |
| 4,942,001 A | 7/1990 | Murphy et al. |
| 5,096,530 A | 3/1992 | Cohen |
| 5,120,476 A | 6/1992 | Scholz |
| 5,121,329 A | 6/1992 | Crump |
| 5,178,646 A | 1/1993 | Barber, Jr. et al. |
| 5,212,910 A | 5/1993 | Breivogel et al. |
| 5,287,663 A | 2/1994 | Pierce et al. |
| 5,300,417 A | 4/1994 | Lushington et al. |
| 5,387,380 A | 2/1995 | Cima et al. |
| 5,533,923 A | 7/1996 | Shamouilian et al. |
| 5,605,760 A | 2/1997 | Roberts |
| 5,609,517 A | 3/1997 | Lofaro |
| 5,626,919 A | 5/1997 | Chapman et al. |
| 5,738,574 A | 4/1998 | Tolles et al. |
| 5,855,588 A | 1/1999 | Young |
| 5,876,268 A | 3/1999 | Lamphere et al. |
| 5,900,164 A | 5/1999 | Budinger et al. |
| 5,905,099 A | 5/1999 | Everaerts et al. |
| 5,906,863 A | 5/1999 | Lombardi et al. |
| 5,921,855 A | 7/1999 | Osterheld et al. |
| 5,932,040 A | 8/1999 | Audisio |
| 5,932,290 A | 8/1999 | Lombardi et al. |
| 5,940,674 A | 8/1999 | Sachs et al. |
| 5,984,769 A | 11/1999 | Bennett et al. |
| 5,989,111 A | 11/1999 | Lamphere et al. |
| 6,022,264 A | 2/2000 | Cook et al. |
| 6,029,096 A | 2/2000 | Manners et al. |
| 6,036,579 A | 3/2000 | Cook et al. |
| 6,062,968 A | 5/2000 | Sevilla et al. |
| 6,090,475 A | 7/2000 | Robinson et al. |
| 6,095,902 A | 8/2000 | Reinhardt |
| 6,117,000 A | 9/2000 | Anjur et al. |
| 6,122,564 A | 9/2000 | Koch et al. |
| 6,126,532 A | 10/2000 | Sevilla et al. |
| 6,155,910 A | 12/2000 | Lamphere et al. |
| 6,206,759 B1 | 3/2001 | Agarwal et al. |
| 6,210,254 B1 | 4/2001 | Cook et al. |
| 6,241,596 B1 | 6/2001 | Osterheld et al. |
| 6,273,806 B1 | 8/2001 | Bennett et al. |
| 6,328,634 B1 | 12/2001 | Shen et al. |
| 6,361,832 B1 | 3/2002 | Agarwal et al. |
| 6,423,255 B1 | 7/2002 | Hoechsmann et al. |
| 6,454,634 B1 | 9/2002 | James et al. |
| 6,488,570 B1 | 12/2002 | James et al. |
| 6,500,053 B2 | 12/2002 | James et al. |
| 6,520,847 B2 | 2/2003 | Osterheld et al. |
| 6,569,373 B2 | 5/2003 | Napadensky |
| 6,582,283 B2 | 6/2003 | James et al. |
| 6,585,563 B1 | 7/2003 | Redeker et al. |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,699,115 B2 | 3/2004 | Osterheld et al. |
| 6,719,818 B1 | 4/2004 | Birang et al. |
| 6,736,709 B1 | 5/2004 | James et al. |
| 6,746,225 B1 | 6/2004 | McHugh |
| 6,749,485 B1 | 6/2004 | James et al. |
| 6,796,880 B2 | 9/2004 | Redeker et al. |
| 6,811,937 B2 | 11/2004 | Lawton |
| 6,840,843 B2 | 1/2005 | Jones et al. |
| 6,860,793 B2 | 3/2005 | Budinger et al. |
| 6,860,802 B1 | 3/2005 | Vishwanathan et al. |
| 6,869,350 B2 | 3/2005 | Roberts et al. |
| 6,875,097 B2 | 4/2005 | Grunwald |
| 6,896,593 B2 | 5/2005 | Prasad |
| 6,913,517 B2 | 7/2005 | Prasad |
| 6,935,931 B2 | 8/2005 | Prasad |
| 6,955,588 B1 | 10/2005 | Anderson, II et al. |
| 6,984,163 B2 | 1/2006 | Roberts |
| 6,991,517 B2 | 1/2006 | Redeker et al. |
| 6,998,166 B2 | 2/2006 | Prasad |
| 7,169,030 B1 | 1/2007 | Kulp |
| 7,195,544 B2 | 3/2007 | Prasad |
| 7,252,871 B2 | 8/2007 | Crkvenac et al. |
| 7,264,641 B2 | 9/2007 | Prasad |
| 7,267,607 B2 | 9/2007 | Prasad |
| 7,300,619 B2 | 11/2007 | Napadensky et al. |
| 7,311,862 B2 | 12/2007 | Prasad |
| 7,371,160 B1 | 5/2008 | Cruz et al. |
| 7,377,840 B2 | 5/2008 | Deopura et al. |
| 7,425,172 B2 | 9/2008 | Misra et al. |
| 7,435,161 B2 | 10/2008 | Prasad et al. |
| 7,435,165 B2 | 10/2008 | Prasad |
| 7,438,636 B2 | 10/2008 | Kulp et al. |
| 7,445,847 B2 | 11/2008 | Kulp |
| 7,455,571 B1 | 11/2008 | Kuo et al. |
| 7,497,885 B2 | 3/2009 | Kollodge |
| 7,517,488 B2 | 4/2009 | Saikin |
| 7,530,880 B2 | 5/2009 | Bajaj et al. |
| 7,531,117 B2 | 5/2009 | Ederer et al. |
| 7,537,446 B2 | 5/2009 | James et al. |
| 7,699,684 B2 | 4/2010 | Prasad |
| 7,704,122 B2 | 4/2010 | Misra et al. |
| 7,704,125 B2 | 4/2010 | Roy et al. |
| 7,815,778 B2 | 10/2010 | Bajaj |
| 7,846,008 B2 | 12/2010 | Bajaj |
| 8,066,555 B2 | 11/2011 | Bajaj |
| 8,075,372 B2 | 12/2011 | Prasad |
| 8,075,745 B2 | 12/2011 | Bajaj |
| 8,118,641 B2 | 2/2012 | Kulp et al. |
| 8,142,860 B2 | 3/2012 | Vanmaele et al. |
| 8,142,869 B2 | 3/2012 | Kobayashi et al. |
| 8,177,603 B2 | 5/2012 | Bajaj |
| 8,257,545 B2 | 9/2012 | Loyack et al. |
| 8,260,447 B2 | 9/2012 | Mattes et al. |
| 8,287,793 B2 | 10/2012 | Deopura et al. |

(56) References Cited

U.S. PATENT DOCUMENTS

| | | | |
|---|---|---|---|
| 8,288,448 B2 | 10/2012 | Kulp | |
| 8,292,692 B2 | 10/2012 | Bajaj | |
| 8,377,623 B2 | 2/2013 | Fong | |
| 8,380,339 B2 | 2/2013 | Misra et al. | |
| 8,546,717 B2 | 10/2013 | Stecker | |
| 8,598,523 B2 | 12/2013 | Stecker et al. | |
| 8,702,479 B2 | 4/2014 | Huang et al. | |
| 8,709,114 B2 | 4/2014 | Cantrell et al. | |
| 8,715,035 B2 | 5/2014 | Roy et al. | |
| 8,784,721 B2 | 7/2014 | Philippi et al. | |
| 8,821,214 B2 | 9/2014 | Joseph | |
| 8,864,859 B2 | 10/2014 | Roy et al. | |
| 8,883,392 B2 | 11/2014 | Napadensky et al. | |
| 8,888,480 B2 | 11/2014 | Yoo et al. | |
| 8,932,116 B2 | 1/2015 | Deopura et al. | |
| 8,986,585 B2 | 3/2015 | Cantrell et al. | |
| 9,017,140 B2 | 4/2015 | Allison et al. | |
| 9,067,297 B2 | 6/2015 | Allison et al. | |
| 9,067,299 B2 | 6/2015 | Bajaj et al. | |
| 9,156,124 B2 | 10/2015 | Allison et al. | |
| 9,162,340 B2 | 10/2015 | Joseph et al. | |
| 9,259,820 B2 | 2/2016 | Qian et al. | |
| 9,259,821 B2 | 2/2016 | Qian et al. | |
| 9,278,424 B2 | 3/2016 | Roy et al. | |
| 9,296,085 B2 | 3/2016 | Bajaj et al. | |
| 9,314,897 B2 | 4/2016 | Qian et al. | |
| 9,333,620 B2 | 5/2016 | Qian et al. | |
| 9,421,666 B2 | 8/2016 | Krishnan et al. | |
| 9,457,520 B2 | 10/2016 | Bajaj et al. | |
| 9,587,127 B2 | 3/2017 | Herlihy et al. | |
| 9,630,249 B2 | 4/2017 | Toyserkani et al. | |
| 9,744,724 B2 | 8/2017 | Bajaj et al. | |
| 9,873,180 B2 | 1/2018 | Bajaj et al. | |
| 9,993,907 B2 | 6/2018 | Murugesh et al. | |
| 2001/0008830 A1 | 7/2001 | Tolles et al. | |
| 2001/0020448 A1 | 9/2001 | Vaartstra et al. | |
| 2001/0046834 A1 | 11/2001 | Ramana et al. | |
| 2002/0077036 A1 | 6/2002 | Roberts et al. | |
| 2002/0112632 A1 | 8/2002 | Faibish | |
| 2002/0173248 A1 | 11/2002 | Doan et al. | |
| 2003/0019570 A1 | 1/2003 | Chen et al. | |
| 2003/0056870 A1 | 3/2003 | Comb et al. | |
| 2003/0134581 A1 | 7/2003 | Wang et al. | |
| 2003/0181137 A1 | 9/2003 | Redeker et al. | |
| 2003/0205325 A1 | 11/2003 | Boyd et al. | |
| 2004/0033758 A1 | 2/2004 | Wiswesser | |
| 2004/0055223 A1* | 3/2004 | Ono | B24B 37/22 51/293 |
| 2004/0058623 A1 | 3/2004 | Lin et al. | |
| 2004/0106367 A1 | 6/2004 | Walker et al. | |
| 2004/0126575 A1 | 7/2004 | Yoshida et al. | |
| 2004/0133298 A1 | 7/2004 | Toyserkani et al. | |
| 2004/0154533 A1 | 8/2004 | Agarwal et al. | |
| 2004/0173946 A1 | 9/2004 | Pfeifer et al. | |
| 2004/0175451 A1 | 9/2004 | Maekawa et al. | |
| 2004/0187714 A1 | 9/2004 | Napadensky et al. | |
| 2004/0198185 A1 | 10/2004 | Redeker et al. | |
| 2005/0003189 A1 | 1/2005 | Bredt et al. | |
| 2005/0020082 A1 | 1/2005 | Vishwanathan et al. | |
| 2005/0086869 A1 | 4/2005 | Park et al. | |
| 2005/0101228 A1 | 5/2005 | Prasad | |
| 2005/0110853 A1 | 5/2005 | Gardner et al. | |
| 2005/0153634 A1 | 7/2005 | Prasad et al. | |
| 2005/0171224 A1 | 8/2005 | Kulp | |
| 2005/0227590 A1 | 10/2005 | Sung | |
| 2006/0019587 A1 | 1/2006 | Deopura et al. | |
| 2006/0052040 A1 | 3/2006 | Prasad | |
| 2006/0160478 A1 | 7/2006 | Donohue et al. | |
| 2006/0185256 A1 | 8/2006 | Nevoret et al. | |
| 2006/0192315 A1 | 8/2006 | Farr et al. | |
| 2006/0226567 A1 | 10/2006 | James et al. | |
| 2006/0252900 A1 | 11/2006 | Bowman et al. | |
| 2007/0009606 A1 | 1/2007 | Serdy et al. | |
| 2007/0054599 A1 | 3/2007 | Taylor et al. | |
| 2007/0117393 A1 | 5/2007 | Tregub et al. | |
| 2007/0128874 A1 | 6/2007 | Shida et al. | |
| 2007/0128991 A1 | 6/2007 | Yoon et al. | |
| 2007/0149096 A1 | 6/2007 | Nishimura et al. | |
| 2007/0212979 A1 | 9/2007 | Preston | |
| 2007/0235133 A1 | 10/2007 | Benassi | |
| 2007/0235904 A1 | 10/2007 | Saikin | |
| 2008/0009228 A1 | 1/2008 | Osypka et al. | |
| 2008/0057845 A1 | 3/2008 | Prasad | |
| 2008/0157436 A1 | 7/2008 | Patel et al. | |
| 2008/0207100 A1 | 8/2008 | Roy et al. | |
| 2008/0211141 A1 | 9/2008 | Deopura et al. | |
| 2008/0314878 A1 | 12/2008 | Cai et al. | |
| 2009/0053976 A1 | 2/2009 | Roy et al. | |
| 2009/0093201 A1 | 4/2009 | Kazuno et al. | |
| 2009/0105363 A1 | 4/2009 | Napadensky | |
| 2009/0206065 A1 | 8/2009 | Kruth et al. | |
| 2009/0253353 A1 | 10/2009 | Ogawa et al. | |
| 2009/0311955 A1 | 12/2009 | Kerprich et al. | |
| 2009/0321979 A1 | 12/2009 | Hiraide | |
| 2010/0140850 A1 | 6/2010 | Napadensky et al. | |
| 2010/0203815 A1 | 8/2010 | Bajaj | |
| 2010/0323050 A1 | 12/2010 | Kumagai et al. | |
| 2011/0059247 A1 | 3/2011 | Kuzusako et al. | |
| 2011/0077321 A1 | 3/2011 | Napadensky | |
| 2011/0180952 A1 | 7/2011 | Napadensky | |
| 2012/0178845 A1 | 7/2012 | Napadensky et al. | |
| 2012/0302148 A1* | 11/2012 | Bajaj | B24B 37/205 451/527 |
| 2012/0315830 A1 | 12/2012 | Joseph et al. | |
| 2013/0012108 A1 | 1/2013 | Li et al. | |
| 2013/0017769 A1 | 1/2013 | Kimura | |
| 2013/0019570 A1 | 1/2013 | Weible | |
| 2013/0055568 A1 | 3/2013 | Dusel et al. | |
| 2013/0059509 A1 | 3/2013 | Deopura et al. | |
| 2013/0172509 A1 | 7/2013 | Pawloski et al. | |
| 2013/0231032 A1 | 9/2013 | Swedek et al. | |
| 2013/0283700 A1* | 10/2013 | Bajaj | B24B 37/26 51/295 |
| 2013/0307194 A1 | 11/2013 | Elsey | |
| 2013/0309951 A1 | 11/2013 | Benvegnu et al. | |
| 2013/0316081 A1 | 11/2013 | Kovalcik et al. | |
| 2013/0328228 A1 | 12/2013 | Pettis et al. | |
| 2014/0048970 A1 | 2/2014 | Batchelder et al. | |
| 2014/0117575 A1 | 5/2014 | Kemperle et al. | |
| 2014/0163717 A1 | 6/2014 | Das et al. | |
| 2014/0206268 A1 | 7/2014 | Lefevre et al. | |
| 2014/0239527 A1 | 8/2014 | Lee | |
| 2014/0324206 A1 | 10/2014 | Napadensky | |
| 2014/0370214 A1 | 12/2014 | Araki et al. | |
| 2014/0370788 A1 | 12/2014 | Nair | |
| 2015/0024233 A1 | 1/2015 | Gunther | |
| 2015/0031781 A1 | 1/2015 | Landers et al. | |
| 2015/0037601 A1 | 2/2015 | Blackmore | |
| 2015/0038066 A1 | 2/2015 | Huang | |
| 2015/0045928 A1 | 2/2015 | Perez et al. | |
| 2015/0056421 A1 | 2/2015 | Yudovin-Farber et al. | |
| 2015/0056892 A1 | 2/2015 | Vacassy et al. | |
| 2015/0056895 A1 | 2/2015 | Fotou et al. | |
| 2015/0061170 A1 | 3/2015 | Engel et al. | |
| 2015/0065020 A1 | 3/2015 | Roy et al. | |
| 2015/0084238 A1 | 3/2015 | Bonassar et al. | |
| 2015/0093977 A1 | 4/2015 | Deopura et al. | |
| 2015/0115490 A1 | 4/2015 | Reinarz | |
| 2015/0123298 A1 | 5/2015 | Napadensky | |
| 2015/0126099 A1 | 5/2015 | Krishnan et al. | |
| 2015/0129798 A1 | 5/2015 | Napadensky | |
| 2015/0174826 A1 | 6/2015 | Murugesh et al. | |
| 2015/0216790 A1 | 8/2015 | Feng et al. | |
| 2016/0052103 A1 | 2/2016 | Qian et al. | |
| 2016/0107287 A1 | 4/2016 | Bajaj et al. | |
| 2016/0107288 A1 | 4/2016 | Orilall et al. | |
| 2016/0114458 A1 | 4/2016 | Bajaj et al. | |
| 2016/0176021 A1 | 6/2016 | Orilall et al. | |
| 2016/0221145 A1 | 8/2016 | Huang et al. | |
| 2016/0229023 A1 | 8/2016 | Lugg et al. | |
| 2016/0279757 A1 | 9/2016 | Qian et al. | |
| 2016/0354901 A1 | 12/2016 | Krishnan et al. | |
| 2017/0100817 A1 | 4/2017 | Ganapathiappan et al. | |
| 2017/0151648 A1 | 6/2017 | Huang et al. | |

(56) References Cited

U.S. PATENT DOCUMENTS

| | | | |
|---|---|---|---|
| 2017/0182629 A1 | 6/2017 | Lehuu et al. | |
| 2017/0203406 A1 | 7/2017 | Ganapathiappan et al. | |
| 2017/0203409 A1 | 7/2017 | Lefevre et al. | |
| 2018/0236632 A1 | 8/2018 | Murugesh et al. | |

FOREIGN PATENT DOCUMENTS

| | | | |
|---|---|---|---|
| CN | 1474735 A | 2/2004 | |
| CN | 1484566 A | 3/2004 | |
| CN | 1531473 A | 9/2004 | |
| CN | 1569399 A | 1/2005 | |
| CN | 1802237 A | 7/2006 | |
| CN | 1829587 A | 9/2006 | |
| CN | 1897226 A | 1/2007 | |
| CN | 1961410 A | 5/2007 | |
| CN | 101072657 A | 11/2007 | |
| CN | 101124067 A | 2/2008 | |
| CN | 101199994 A | 6/2008 | |
| CN | 101375374 A | 2/2009 | |
| CN | 101612722 A | 12/2009 | |
| CN | 101883664 A | 11/2010 | |
| CN | 102099156 A | 6/2011 | |
| CN | 102686361 A | 9/2012 | |
| CN | 102762340 A | 10/2012 | |
| CN | 102770239 A | 11/2012 | |
| CN | 102892553 A | 1/2013 | |
| CN | 103465155 A | 12/2013 | |
| CN | 103476546 A | 12/2013 | |
| CN | 103561907 A | 2/2014 | |
| CN | 203542340 U | 4/2014 | |
| CN | 104105575 A | 10/2014 | |
| CN | 104210108 A | 12/2014 | |
| CN | 104385595 A | 3/2015 | |
| CN | 104400998 A | 3/2015 | |
| CN | 104607639 A | 5/2015 | |
| CN | 104625945 A | 5/2015 | |
| CN | 107078048 A | 8/2017 | |
| CN | 110142688 A | 8/2019 | |
| DE | 19834559 A1 | 2/2000 | |
| EP | 1016133 A1 | 7/2000 | |
| EP | 1512519 A2 | 3/2005 | |
| EP | 1661690 A1 | 5/2006 | |
| EP | 2025458 A2 | 2/2009 | |
| EP | 2025459 A2 | 2/2009 | |
| EP | 2277686 A2 | 1/2011 | |
| EP | 2431157 A1 | 3/2012 | |
| EP | 2463082 A1 | 6/2012 | |
| JP | H08132342 A | 5/1996 | |
| JP | 09076353 A | 3/1997 | |
| JP | 11-254542 A | 9/1999 | |
| JP | 11-347761 A | 12/1999 | |
| JP | 2001501544 A | 2/2001 | |
| JP | 2001507634 A | 6/2001 | |
| JP | 2001507997 A | 6/2001 | |
| JP | 200228849 A | 1/2002 | |
| JP | 2002151447 A | 5/2002 | |
| JP | 2003324087 A | 11/2003 | |
| JP | 2004235446 A | 8/2004 | |
| JP | 2004-243518 A | 9/2004 | |
| JP | 2005150235 A | 6/2005 | |
| JP | 3801100 B2 | 7/2006 | |
| JP | 2007281435 A | 10/2007 | |
| JP | 2008531306 A | 8/2008 | |
| JP | 2008207323 A | 9/2008 | |
| JP | 2008546167 A | 12/2008 | |
| JP | 2009-101487 A | 5/2009 | |
| JP | 2013515379 A | 5/2013 | |
| JP | 2013530061 A | 7/2013 | |
| JP | 2014515319 A | 6/2014 | |
| JP | 2017520496 A | 7/2017 | |
| JP | 2017533586 A | 11/2017 | |
| KR | 2003-0020658 A | 3/2003 | |
| KR | 2005-0052876 A | 6/2005 | |
| KR | 10-0606476 B1 | 8/2006 | |
| KR | 2008-0038607 A | 5/2008 | |
| KR | 20100028294 A | 3/2010 | |
| KR | 1020130138841 | 12/2013 | |
| KR | 10-2015-0047628 A | 5/2015 | |
| TW | 404878 B | 9/2000 | |
| TW | 200528529 A | 9/2005 | |
| TW | 200628262 A | 8/2006 | |
| TW | I290576 B | 12/2007 | |
| TW | 200906543 A | 2/2009 | |
| TW | 200909134 A | 3/2009 | |
| TW | 200927382 A | 7/2009 | |
| TW | 201016387 A | 5/2010 | |
| TW | I374792 B | 10/2012 | |
| TW | 201309419 A | 3/2013 | |
| TW | I388398 B | 3/2013 | |
| TW | 201350265 A | 12/2013 | |
| WO | 9830356 A1 | 7/1998 | |
| WO | 1998047662 A1 | 10/1998 | |
| WO | 9849723 A1 | 11/1998 | |
| WO | 2000002707 A1 | 1/2000 | |
| WO | 2000002708 A1 | 1/2000 | |
| WO | 01/64396 A1 | 9/2001 | |
| WO | 02/24415 A1 | 3/2002 | |
| WO | 9956914 A1 | 5/2002 | |
| WO | 2002043921 A1 | 6/2002 | |
| WO | 2002070200 A1 | 9/2002 | |
| WO | 03089702 A1 | 10/2003 | |
| WO | 03103959 A1 | 12/2003 | |
| WO | 2003099518 A1 | 12/2003 | |
| WO | 2004037490 A1 | 5/2004 | |
| WO | 2005000526 A1 | 1/2005 | |
| WO | 2005100497 A1 | 10/2005 | |
| WO | 2007001699 A1 | 1/2007 | |
| WO | 2007024464 A1 | 3/2007 | |
| WO | 2007055678 A2 | 5/2007 | |
| WO | 2007055901 A1 | 5/2007 | |
| WO | 2008123085 A1 | 10/2008 | |
| WO | 2009026776 A1 | 3/2009 | |
| WO | 2009158665 A1 | 12/2009 | |
| WO | 2010016486 A1 | 2/2010 | |
| WO | 2010123744 A2 | 10/2010 | |
| WO | 20100116486 A1 | 10/2010 | |
| WO | 2011/082155 A2 | 7/2011 | |
| WO | 2011082155 A2 | 7/2011 | |
| WO | 2011088057 A1 | 7/2011 | |
| WO | 2012173885 A2 | 12/2012 | |
| WO | 2013128452 | 9/2013 | |
| WO | 2013162856 A1 | 10/2013 | |
| WO | 2014/095200 A1 | 6/2014 | |
| WO | 2014141276 A2 | 9/2014 | |
| WO | 2015/040433 A2 | 3/2015 | |
| WO | 2015/055550 A1 | 4/2015 | |
| WO | 2015111366 A1 | 7/2015 | |
| WO | 2015118552 A1 | 8/2015 | |
| WO | 2015120430 A1 | 8/2015 | |
| WO | 20150161210 A1 | 10/2015 | |
| WO | 2016057075 A1 | 4/2016 | |
| WO | 2016060712 A1 | 4/2016 | |
| WO | 2016061544 A1 | 4/2016 | |
| WO | 2017066077 A1 | 4/2017 | |

OTHER PUBLICATIONS

The Dow Chemical Company—"Dow VLDPE DFDB-1085 NT, Very Low Density Polyethylene Resin" Technical Data, UL Prospector, Oct. 2003, 2 pages.

Lubrizol Advanced Materials, Inc.—"Lubrizol Engineered Polymers, Estane 58144 TPU" Technical Data, Feb. 2014, 2 pages.

Sekisui Voltek, LLC—"Volara Type EO" Technical Data, Jan. 2010, 2 pages.

Rogers Corporation, High Performance Foams Division, PORON Microcellular Urethanes—Product Availability Booklet, May 1, 2015, 11 pages.

PCT Notification of Transmittal of the International Search Report and the Written Opinion of the International Searching Authority for International Application No. PCT/US2015/027537 dated Jul. 29, 2015; 11 total pages.

(56) References Cited

OTHER PUBLICATIONS

PCT Notification of Transmittal of the International Search Report and the Written Opinion of the International Searching Authority for International Application No. PCT/US2015/027473 dated Jul. 29, 2015; 10 total pages.
Wikipedia [online]; 3D Printing; 2013; 17 total pages.
PCT Notification of Transmittal of the International Search Report and the Written Opinion of the International Searching Authority for International Application No. PCT/US2013/035513 dated Jun. 25, 2013; 12 total pages.
3D Printing: The Next Industrial Revolution: Christopher Barnatt Publisher: CreateSpace Independent Publishing Platform (May 4, 2013) Language: English ISBN-10: 148418176X ISBN-13: 978-1484181768.
C. Wong. "Damping Associated with Incipient Melting in Aluminum-Indium Alloys", David Taylor Research Center—SME 89-99. Jan. 1990.
Tammy Hickey et al. "Internal Friction and Modules Studies on Austempered Ductile Iron", Technical Report ARCCB-TR-98001. Jan. 1996. 24 pages.
RODEL. Rodel IC1000 CMP PAD. 1999. 2 pages.
Byoung-Ho Kwon et al. "Dishing and Ersosion in STI CMP". System IC R&D Center, Hyundai Electronics Industries Co. Ltd. 1999 IEEE. 3 pages.
S. Raghavan et al. "Chemical Mechanical Planariarization in Integrated Circuit Device Manufacturing". vol. 98-7. 1998. 19 pages.
Rajeev Bajaj et al. "Effect of Polishing Pad Material Properties on Chemical Mechanical Polishing (CMP) Processes". 1994. 8 pages.
RODEL. Rodel IC1010. 1998. 2 pages.
Peter Freeman et al. "A Study of the Variation of Physical Properties in Random Lots of Urethane Polishing Pads for CMP". A RODEL Publication. vol. 2, Issue 6. Jun. 1996. 8 Pages.
John J. Aklonis et al. "Introduction to Polymer Viscoelasticity". Second Edition. 1983. 6 pages.
Weidan Li et al. "The Effect of the Polishing Pad Treatments on the Chemical-Mechanical Polishing of SiO2 Films", Thin Solid Films 270 (1995). 6 pages.
U.S. Appl. No. 14/575,608, filed Dec. 18, 2014.
Antje M.J. Van Den Berg et al., "Inkjet Printing of Polyurethane Colloidal Suspensions", www.rsc.org/softmatter. Jul. 13, 2006.
Yu-Lim Jun et al. "Slicing Bitmap Generation and Patterning Technique a SFF System Using UV-Resin", International Conference on Control, Automation and Systems 2007. 5 Pages.
H. Yang. "High Viscosity Jetting System for 3D Reactive Inkjet Printing", Additive Manufacturing and 3D Printing Group, University of Nottingham. 9 pages.
I Hermant et al. "A Comparative Study of Polyurethane-Poly(Methyl Methacrylate) Interpenetrating and Semi-1 Interprenetrating Polymer Networks", vol. 20, No. 1. pp. 85-89, 1984.
Lee M. Cook. "CMP Consumables II: Pad" Chapter 6. Semiconductors and Semimetals, vol. 63. Published 1999. Chemical Mechanical Polishing in Silicon Processing. ISBN: 978-0-12-752172-5.
International Search Report dated Dec. 28, 2015 for application No. PCT/US2015/056077.
International Search Report dated Jan. 28, 2016 for Application No. PCT/US2015/056254.
Taiwan Office Action dated Jul. 4, 2019, for Taiwan Application/Patent No. 10413235.
Chinese Supplemental Search Report dated Mar. 9, 2019, for Chinese Patent Application No. 201580069624.1.
Chinese Office Action dated Mar. 22, 2019, for Chinese Patent Application No. 201580069573.2.
Chinese Office Action dated Mar. 22, 2019, for Chinese Patent Application No. 201580069624.1.
EPO Extended European Search Report dated Mar. 19, 2019 for European Patent Application No. 16855985.4.
Andrews, Rodney J., et al.—"Glass Transition Temperatures of Polymers," Polymer Handbook, Fourth Edition, J. Brandrup et al., Editors, A Wiley Interscience Publication, John Wiley & Sons, Inc., 1999, VI / 193-198.
Crow—"Glass Transition Temperature," webpage, Polymer Properties Database, http://polymerdatabase.com/polymer%20physics/GlassTransition.html, 2015, printed Apr. 10, 2019, 2 pages.
Crow—"Glass Transition Temperatures," webpage, Polymer Properties Database, http://polymerdatabase.com/polymer%20physics/Polymer%20Tg%20C.html, 2015, printed Apr. 10, 2019, 6 pages.
HUPC—"Dipropylene Glycol Diacrylate (DPGDA)" webpage, CAS No. 57472-68-1_Radiation, http://www.union-pigment.com/china/radiation-curable-57472.html, printed Apr. 8, 2019, 2 pages.
Polysciences, Inc.—"Monomers Product Guide," 2012, 16 pages.
Whisnaut, David—"Polymer Chemistry: The Glass Transition" webpage, Engineering Libre Texts, https://eng.libretexts.org/Bookshelves/Materials_Schience?Supplemental_Modules_Materia . . . , printed Apr. 10, 2019, 2 pages.
Sigma-Aldrich—"Thermal Transitions of Homopolymers: Glass Transition & Melting Point" webpage, https://www.sigmaaldrich.com/technical-documents/articles/materials-science/polymer-scie . . . , printed Apr. 8, 2019, 3 pages.
Antje M.J. Van Den Berg, "Inkjet Printing of Polyurethane Colloidal Suspensions", www.rsc.org/softmatter. Jul. 13, 2006.
Peter Krober et al. "Reactive Inkjet Printing of Polyurethanes", www.rsc.org/materials. Journal of Materials Chemistry. Jan. 6, 2009.
Plastics in Action; 3-D Printing Speeds Prototype Development dated May/Jun. 1998; 2 total pages.
Chinese Office Action dated Jul. 30, 2018, for Chinese Application/Patent No. 201580069573.2.
Chinese Office Action dated Jul. 30, 2018, for Chinese Application/Patent No. 201580069624.1.
EP Search Report and Written Opinion dated Jun. 20, 2018 for Application No. EP 15 85 0997.
Taiwan Office Action dated Jul. 9, 2019, for Taiwan Patent Application No. 108102209.
Japanese Decision to Grant a Patent dated Jan. 28, 2020, for Japanese Patent Application No. 2017-520496.
ASTM International—"Standard Terminology for Additive Manufacturing Technologies," ASTM Designation: F2792-12a, copyright dated Sep. 9, 2013, pp. 1-3.
Merriam-Webster Dictionary—"Droplet," https://www.merriam-webster.com/dictionary/droplet, accessed Feb. 24, 2020, 8 pages.
Shahrubudin, N., et al.—"An Overview on 3D Printing Technology: Technological, Materials, and Applications," 2nd International Conference on Sustainable Materials Processing and Manufacturing (SMPM 2019), Procedia Manufacturing, 35 (2019), published by Elsevier B.V., pp. 1286-1296.
Wikipedia—"Drop (liquid)," https://en.wikipedia.org/wiki/Drop_(liquid), last edited Feb. 12, 2020, accessed Feb. 24, 2020, 5 pages.
Chinese Office Action dated Oct. 9, 2019, for Chinese Patent Application No. 201580069573.2.
Chinese Office Action dated Oct. 8, 2019, for Chinese Patent Application No. 201580069624.1.
Japanese Office Action dated Oct. 29, 2019, for Japanese Patent Application No. 2017-520508.
Chinese Office Action dated Oct. 18, 2019, for Chinese Patent Application No. 201680060117.6.
Taiwan Office Action dated Oct. 24, 2019, for Taiwan Patent Application No. 105132308.
Japanese Office Action dated Nov. 5. 2019, for Japanese Patent Application No. 2018-519328.
Moylan, John—"Considerations for Measuring Glass Transition Temperature," webpage on Element Materials Technology's website, https://www.element.com/nucleus/2017/08/15/18/45/considerations-for-measuring-glass-transition-temperature, Feb. 19, 2019, 8 pages.
ASTM International—"Standard Test Method for Assignment of the Glass Transition Temperature by Dynamic Mechanical Analysis," standard issued under Designation E1640, current edition approved Aug. 1, 2013, 6 pages.
Japanese Office Action dated Sep. 24, 2019, for Japanese Patent Application No. 2017-520496.
Chinese Office Action dated Jan. 22, 2020, for Chinese Patent Application No. 201580060603.3.
Japanese Decision to Grant dated Mar. 3, 2020, for Japanese Patent Application No. 2018-519328.

(56) References Cited

OTHER PUBLICATIONS

Chinese Office Action dated Mar. 13, 2020, for Chinese Patent Application No. 201580069624.1.
Japanese Office Action dated Jul. 14, 2020, for Japanese Patent Application No. 2019-081720.
Office Action dated Apr. 22, 2020 and Search Report dated Apr. 14, 2020, for Chinese Patent Application No. 201680082260.5.
Chinese Office Action dated Jul. 13, 2020, for Chinese Patent Application No. 201910516558.8.
Chinese Office Action dated Jul. 14, 2020, for Chinese Patent Application No. 201580060603.3.
European Office Action dated Aug. 20, 2020, for European Patent Application No. 20172985.2.
Taiwan Office Action dated Sep. 8, 2020, for Taiwan Patent Application No. 109112154.
Chinese Office Action dated Sep. 2, 2020, for Chinese Patent Application No. 201910555566.5.

\* cited by examiner

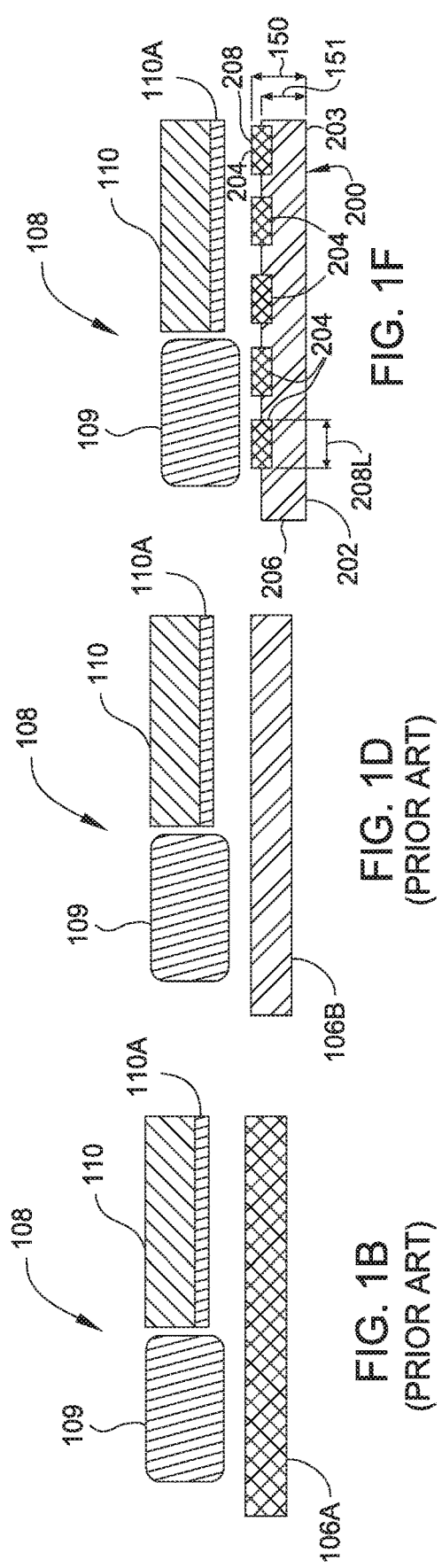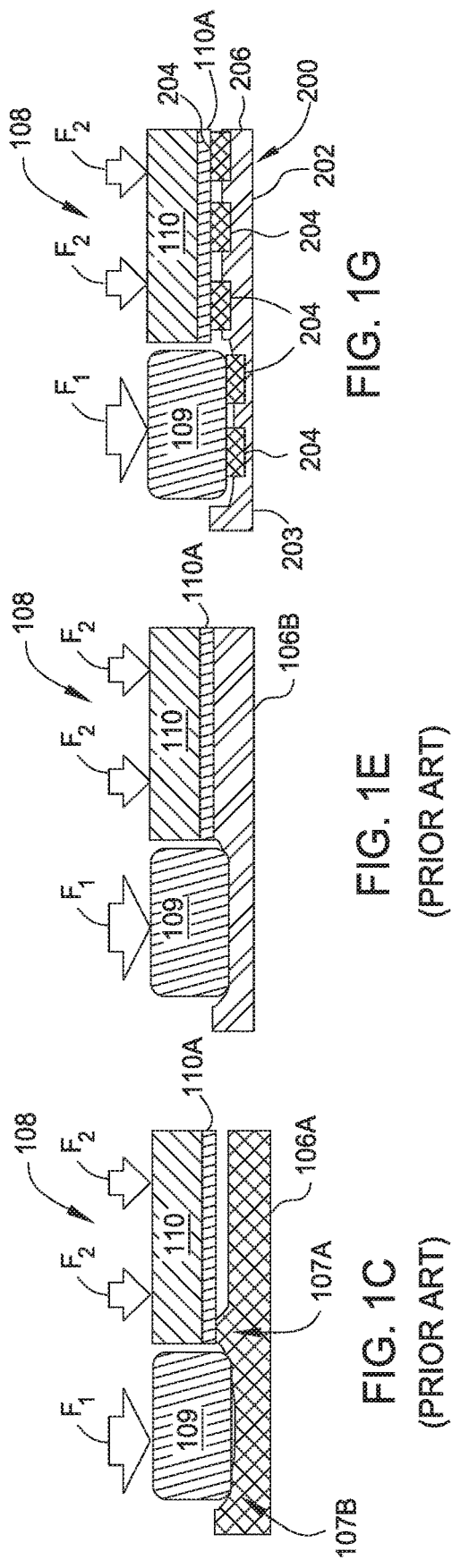

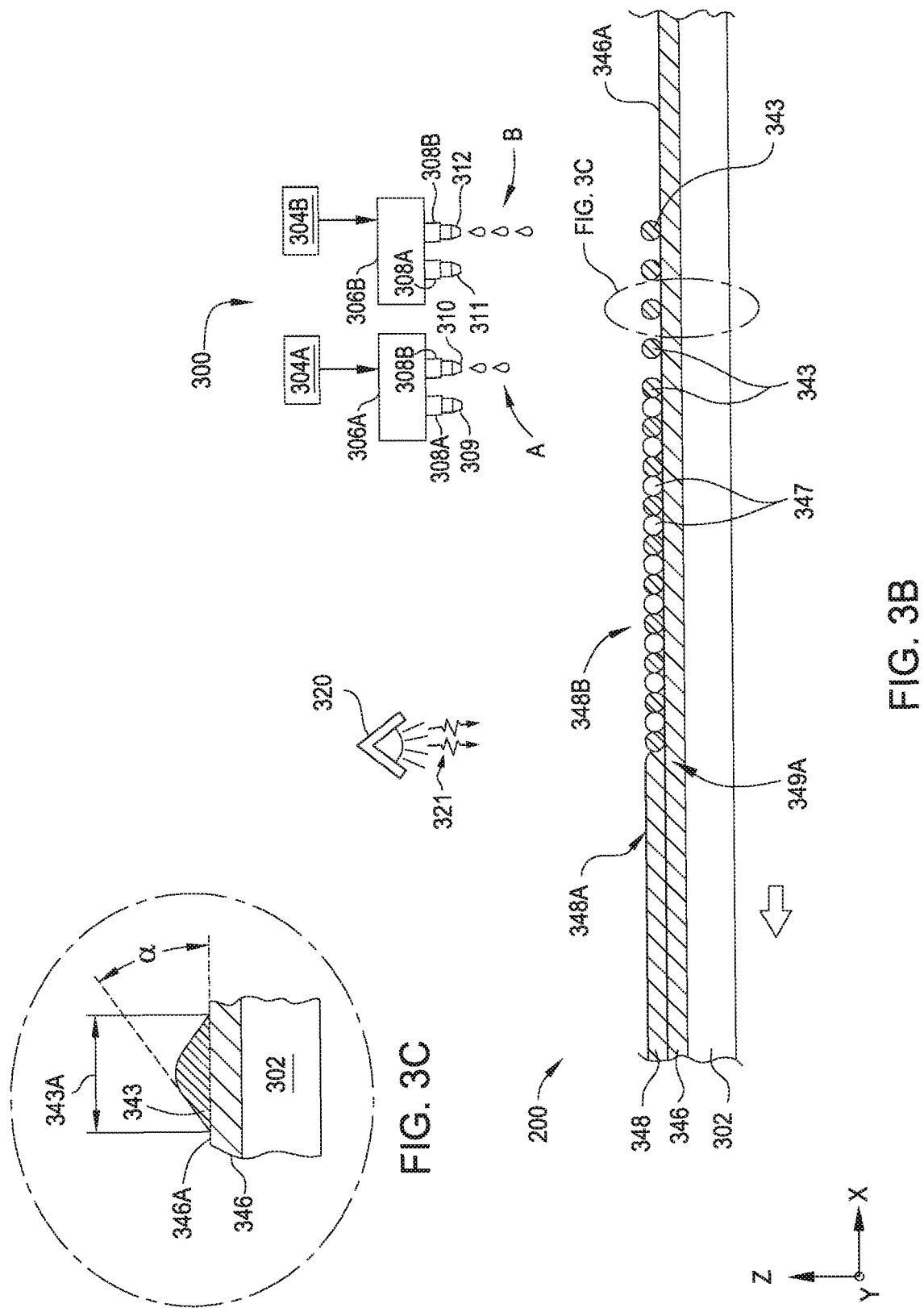

ADVANCED POLISHING PAD MATERIALS AND FORMULATIONS

CROSS-REFERENCE TO RELATED APPLICATIONS

This application is a continuation-in-part of U.S. patent application Ser. No. 14/920,801, filed on Oct. 22, 2015, which is a continuation-in-part of U.S. patent application Ser. No. 14/887,240, filed on Oct. 19, 2015, now U.S. Pat. No. 10,821,573, issued Nov. 3, 2020, which is a continuation-in-part of U.S. patent application Ser. No. 14/885,950, filed on Oct. 16, 2015, now U.S. Pat. No. 10,384,330, issued Aug. 20, 2019, which are all incorporated herein by reference. The U.S. patent application Ser. No. 14/887,240 and U.S. patent application Ser. No. 14/885,950 both claim priority to U.S. Provisional Patent Application Ser. No. 62/065,193, filed on Oct. 17, 2014 and U.S. Provisional Patent Application Ser. No. 62/065,270, filed on Oct. 17, 2014, which are also all incorporated herein by reference.

BACKGROUND

Field

Embodiments disclosed herein generally relate to polishing articles and methods for manufacturing polishing articles used in polishing processes. More specifically, embodiments disclosed herein relate to polishing pads produced by processes that yield improved polishing pad properties and performance, including tunable performance.

Description of the Related Art

Chemical mechanical polishing (CMP) is a conventional process that has been used in many different industries to planarize surfaces of substrates. In the semiconductor industry, uniformity of polishing and planarization has become increasingly important as device feature sizes continue to decrease. During a CMP process, a substrate, such as a silicon wafer, is mounted on a carrier head with the device surface placed against a rotating polishing pad. The carrier head provides a controllable load on the substrate to push the device surface against the polishing pad. A polishing liquid, such as slurry with abrasive particles, is typically supplied to the surface of the moving polishing pad and polishing head. The polishing pad and polishing head apply mechanical energy to the substrate, while the pad also helps to control the transport of slurry which interacts with the substrate during the polishing process. Because polishing pads are typically made from viscoelastic polymeric materials, the mechanical properties of a polishing pad (e.g., elasticity, rebound, hardness, and stiffness), and the CMP processing conditions have a significant impact on the CMP polishing performance on both an IC die level (microscopic/nanoscopic) and wafer or global level (macroscopic). For example, CMP process forces and conditions, such as pad compression, pad rebound, friction, and changes in temperature during processing, and abrasive aqueous slurry chemistries will impact polishing pad properties and thus CMP performance.

Chemical mechanical polishing processes performed in a polishing system will typically include multiple polishing pads that perform different parts of the full polishing process. The polishing system typically includes a first polishing pad that is disposed on a first platen, which produces a first material removal rate and a first surface finish and a first flatness on the surface of the substrate. The first polishing step is typically known as a rough polish step, and is generally performed at a high polishing rate. The system will also typically include at least one additional polishing pad that is disposed on at least an additional platen, which produces a second material removal rate and a second surface finish and flatness on the surface of the substrate. The second polishing step is typically known as a fine polish step, which is generally performed at a slower rate than the rough polishing step. In some configurations, the system may also include a third polishing pad that is disposed on a third platen, which produces a third removal rate and a third surface finish and flatness on the surface of the substrate. The third polishing step is typically known as a material clearing or buffing step. The multiple pad polishing process can be used in a multi-step process in which the pads have different polishing characteristics and the substrates are subjected to progressively finer polishing or the polishing characteristics are adjusted to compensate for different layers that are encountered during polishing, for example, metal lines underlying an oxide surface.

During each of the CMP processing steps, a polishing pad is exposed to compression and rebound cycles, heating and cooling cycles, and abrasive slurry chemistries. Eventually the polishing pad becomes worn or "glazed" after polishing a certain number of substrates, and then needs to be replaced or reconditioned.

A conventional polishing pad is typically made by molding, casting or sintering polymeric materials that include polyurethane materials. In the case of molding, polishing pads can be made one at a time, e.g., by injection molding. In the case of casting, the liquid precursor is cast and cured into a cake, which is subsequently sliced into individual pad pieces. These pad pieces can then be machined to a final thickness. Pad surface features, including grooves which aid in slurry transport, can be machined into the polishing surface, or be formed as part of the injection molding process. These methods of manufacturing polishing pads are expensive and time consuming, and often yield non-uniform polishing results due to the difficulties in the production and control of the pad surface feature dimensions. Non-uniformity has become increasingly important as the dimensions of IC dies and features continue to shrink.

Current pad materials and methods to produce them limit the manipulation and fine control bulk pad properties such as storage modulus (E') and loss modulus (E"), which play critical roles in pad performance. Therefore, uniform CMP requires a pad material and surface features, such as grooves and channels, with a predictable and finely controlled balance of storage modulus E' and loss modulus E", that are further maintained over a CMP processing temperature range, from, for example, about 30° C. to about 90° C. Unfortunately, conventional pad production via traditional bulk polymerization and casting and molding techniques only provide a modicum of pad property (e.g., modulus) control, because the pad is a random mixture of phase separated macromolecular domains that are subject to intramolecular repulsive and attractive forces and variable polymer chain entanglement. For example, the presence of phase separated micro and macroscopic structural domains in the bulk pad may yield an additive combination of non-linear material responses, such as a hysteresis in the storage modulus E' over multiple heating and cooling cycles that typically occur during the CMP processing of batches of substrates, which may result polishing non-uniformities and unpredictable performance across the batch of substrates.

Because of the drawbacks associated with conventional polishing pads and their methods of manufacture, there is a need for new polishing pad materials and new methods of manufacturing polishing pads that provide control of pad feature geometry, and fine control of the pad's material, chemical and physical properties. Such improvements are expected to yield improved polishing uniformity at both a microscopic level and macroscopic level, such as over the entire substrate.

SUMMARY

Embodiments of the disclosure may provide a polishing pad having a polishing surface that is configured to polish a surface of a substrate, comprising a plurality of first polishing elements that each comprise a plurality of first polymer layers, wherein at least one of the plurality of first polymer layers forms the polishing surface, and one or more second polishing elements that each comprise a plurality of second polymer layers, wherein at least a region of each of the one or more second polishing elements is disposed between at least one of the plurality of first polishing elements and a supporting surface of the polishing pad. In some configurations, the plurality of first polymer layers comprise a first polymer composition and the plurality of second polymer layers comprise a second polymer composition. The first polymer composition may be formed from a first droplet composition and the second polymer composition may be formed from a second droplet composition. In some embodiments, the second droplet composition may comprise a greater amount of a resin precursor composition material than the first droplet composition, and the resin precursor composition material may have a glass transition temperature of less than or equal to about 40° C., such as less than or equal to 30° C. In some embodiments, the first droplet comprises a greater amount of oligomers and resin precursor composition materials than the second droplet composition, wherein the oligomers and resin precursor composition materials have a functionality greater than or equal to two. In some embodiments, the first droplet composition comprises oligomers and resin precursor composition materials that have a functionality greater than or equal to two and the second droplet composition comprises resin precursor composition materials that have a functionality less than or equal to two.

Embodiments of the disclosure may further provide a polishing pad having a polishing surface that is configured to polish a surface of a substrate, comprising a plurality of first polishing elements that each comprise a plurality of first polymer layers that comprise a first polymer material, wherein at least one of the plurality of first polymer layers forms the polishing surface, and a base region that is disposed between at least one of the plurality of first polishing elements and a supporting surface of the polishing pad, wherein the base region comprises a plurality of layers that each comprise a plurality of cured droplets of a first resin precursor composition material and a plurality of cured droplets of a second resin precursor composition material.

Embodiments of the disclosure may further provide a method of forming a polishing article, comprising dispensing a first droplet of a first liquid on a surface of a portion of a polishing body, wherein the surface comprises a first material formed by curing an amount of the first liquid, and exposing the dispensed first droplet of the first liquid to electromagnetic radiation for a first period of time to only partially cure the material within the first droplet, wherein exposing the dispensed first droplet of the first liquid occurs after a second period of time has elapsed, and the second time starts when the first droplet is disposed on the surface. The first droplet may comprises a urethane acrylate, a surface cure photoinitiator and a bulk cure photoinitiator, wherein the bulk cure photoinitiator comprises a material selected from a group consisting of benzoin ethers, benzyl ketals, acetyl phenones, alkyl phenones, and phosphine oxides, and the surface cure photoinitiator comprises a material selected from a group consisting of benzophenone compounds and thioxanthone compounds.

Embodiments of the disclosure may further provide a method of forming a polishing article, comprising dispensing an amount of a first liquid on a surface of a portion of a polishing body, where the surface comprises a first material formed by curing an amount of the first liquid and exposing the dispensed first amount of the first liquid to electromagnetic radiation generated from a source for a first period of time to only partially cure the first amount of the first liquid, and exposing the dispensed first amount of the first liquid occurs after a second period of time has elapsed. The method may also include dispensing an amount of a second liquid on the surface of the portion of the polishing body, wherein the amount of the second liquid is positioned adjacent to the amount of the first liquid, and exposing the dispensed amount of the second liquid to electromagnetic radiation generated from the source for a third period of time to only partially cure the amount of the second liquid, wherein the amount of first liquid and the amount of second liquid are simultaneously exposed to the electromagnetic radiation generated from the source.

Embodiments of the disclosure may further provide a method of forming a polishing pad, comprising forming a plurality of layers over a surface, where forming the plurality of layers comprises depositing an amount of a first composition over one or more regions of a surface, depositing an amount of a second composition over one or more second regions of the surface, wherein the one or more first regions and the one or more second regions form a continuous portion of each of the plurality of layers, and exposing the one or more first regions and the one or more second regions to electromagnetic radiation generated from a source for a first period of time to only partially cure a portion of the dispensed amounts of the first composition and the dispensed amounts of the second composition.

Embodiments of the disclosure may further provide a method of forming a polishing article, comprising forming a plurality of urethane acrylate polymer layers, wherein forming the plurality of urethane acrylate polymer layers comprises mixing a first amount of a first multifunctional urethane acrylate oligomer, a first amount of a first mono or multifunctional acrylate monomer and a first amount of a first curing agent to form a first precursor formulation that has a first viscosity that enables the first precursor formulation to be dispensed using an additive manufacturing process, mixing a second amount of the first multifunctional urethane acrylate oligomer, a second amount of the first mono or multifunctional acrylate monomer and a second amount of the first curing agent to form a second precursor formulation that has a second viscosity that enables the second precursor formulation to be dispensed using an additive manufacturing process, dispensing the first precursor formulation on a first region of a surface by use of the additive manufacturing process, dispensing the second precursor formulation on a second region of the surface by use of the additive manufacturing process, and exposing the dispensed first amount of the first precursor formulation and the dispensed first amount of the second precursor formulation to electromagnetic radiation for a first period of time to only partially cure the first amount of the first precursor formulation and the first amount of the second precursor formulation.

Embodiments of the disclosure may further provide a method of forming a polishing article, comprising forming a plurality of urethane acrylate polymer layers, wherein forming the plurality of urethane acrylate polymer layers comprises dispensing a plurality of droplets of a first precursor formulation in a first pattern across a surface of a polishing body that comprises a first material composition, wherein the first precursor formulation comprises a first multifunctional urethane acrylate oligomer, a first amount of a first multifunctional acrylate precursor and a first amount of a first curing agent, dispensing a plurality of droplets of a second precursor formulation in a second pattern across the surface of the polishing body, wherein the second precursor formulation comprises the first multifunctional urethane acrylate oligomer and/or the first multifunctional acrylate precursor, and exposing the dispensed droplets of the first precursor formulation and the dispensed droplets of the second precursor formulation to electromagnetic radiation for a first period of time to only partially cure the droplets of the first precursor formulation and the droplets of the second precursor formulation.

Embodiments of the disclosure may further provide a polishing pad having a polishing surface that is configured to polish a surface of a substrate, comprising a plurality of first polishing elements that each comprise a plurality of first polymer layers that comprise a first polymer material, wherein at least one of the plurality of first polymer layers forms the polishing surface, and a base region that is disposed between at least one of the plurality of first polishing elements and a supporting surface of the polishing pad. The base region may comprise a plurality of layers that each comprise a plurality of cured droplets of the first polymer material and a plurality of cured droplets of a second polymer material, and wherein the first polymer material has a first E'30/E'90 ratio that is greater than 6. In some cases, the second polymer material may also have a second E'30/E'90 ratio that is greater than 6, and the first E'30/E'90 ratio and the second E'30/E'90 ratio are different.

Embodiments of the disclosure may further provide a polishing pad having a polishing surface that is configured to polish a surface of a substrate, comprising a plurality of first polishing elements that each comprise a plurality of first polymer layers that comprise a first polymer material, wherein at least one of the plurality of first polymer layers forms the polishing surface, and a base region that is disposed between at least one of the plurality of first polishing elements and a supporting surface of the polishing pad, wherein the base region comprises a plurality of layers that each comprise a plurality of cured droplets of the first polymer material and a plurality of cured droplets of a second polymer material. The first polymer material may have a first storage modulus and the second polymer material may have a second storage modulus, wherein the first storage modulus is greater than the second storage modulus, and the base region comprises a greater volume percent of the second polymer material versus the first polymer material.

Embodiments of the disclosure may further provide a polishing pad having a polishing surface that is configured to polish a surface of a substrate, comprising a plurality of first polishing elements that are disposed in a pattern relative to the polishing surface, wherein each first polishing element comprises a plurality of first polymer layers that comprise a first polymer material, and at least one of the plurality of first polymer layers in each of the first polishing elements forms a portion of the polishing surface, and a base region that is disposed between each of the plurality of first polishing elements and a supporting surface of the polishing pad, and the base region comprises a second polymer material. The first polymer material may have a first E'30/E'90 ratio and the second polymer material may have a second E'30/E'90 ratio that is different from the first E'30/E'90 ratio.

Embodiments of the disclosure may further provide a polishing pad having a polishing surface that is configured to polish a surface of a substrate, comprising a plurality of first polishing elements that are disposed in a pattern relative to the polishing surface, wherein each first polishing element comprises a plurality of first polymer layers that comprise a first polymer material, and at least one of the plurality of first polymer layers in each of the first polishing elements forms a portion of the polishing surface, and a base region that is disposed between each of the plurality of first polishing elements and a supporting surface of the polishing pad, and the base region comprises a second polymer material. The first polymer material may have a first tan delta and the second polymer material may have a second tan delta that is different from the first tan delta. The first polymer material in the polishing pad may also include a first E'30/E'90 ratio and the second polymer material in the polishing pad may also a second E'30/E'90 ratio that is different from the first E'30/E'90 ratio, and at least a region of the formed polishing pad has a third E'30/E'90 ratio that is different from the first and second E'30/E'90 ratios when measured by loading the region of the polishing pad in a direction normal to the polishing surface. The region of the polishing pad may generally include a subset of the plurality of the first polishing elements (e.g., multiple first polishing elements) and a portion of the base region that is disposed between each of the first polishing elements in the subset of the first polishing elements and the supporting surface.

Embodiments of the disclosure may further provide a polishing pad having a polishing surface that is configured to polish a surface of a substrate, comprising a plurality of first polishing elements that each comprise a plurality of first polymer layers that comprise a first polymer material, wherein at least one of the plurality of first polymer layers forms the polishing surface, and each of the first polymer layers of the first polymer material comprises a plurality of cured droplets of a first droplet composition, and a base region that is disposed between each of the plurality of first polishing elements and a supporting surface of the polishing pad, wherein the base region comprises a plurality of layers that each comprise a plurality of cured droplets of the first polymer composition and a plurality of cured droplets of a second droplet composition. The first polymer material in the polishing pad may have a first storage modulus and the second polymer material may have a second storage modulus, wherein the first storage modulus is greater than the second storage modulus, and the base region comprises a greater volume percent of the second polymer material versus the first polymer material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only

FIGS. 1B-1E are schematic sectional views of a portion of a polishing head and polishing pad configuration that are positioned in the polishing station illustrated in FIG. 1A.

FIGS. 1F-1G is a schematic sectional view of a portion of a polishing head and polishing pad configuration that are positioned in the polishing station illustrated in FIG. 1A, according to an embodiment of the present disclosure.

FIG. 3B is a schematic view of a portion of the system illustrated in FIG. 3A, according to an embodiment of the present disclosure.

FIG. 3C is a schematic view of a dispensed droplet disposed on a surface of a region of the advanced polishing pad illustrated in FIG. 3B, according to an embodiment of the present disclosure.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

Figure 1A:
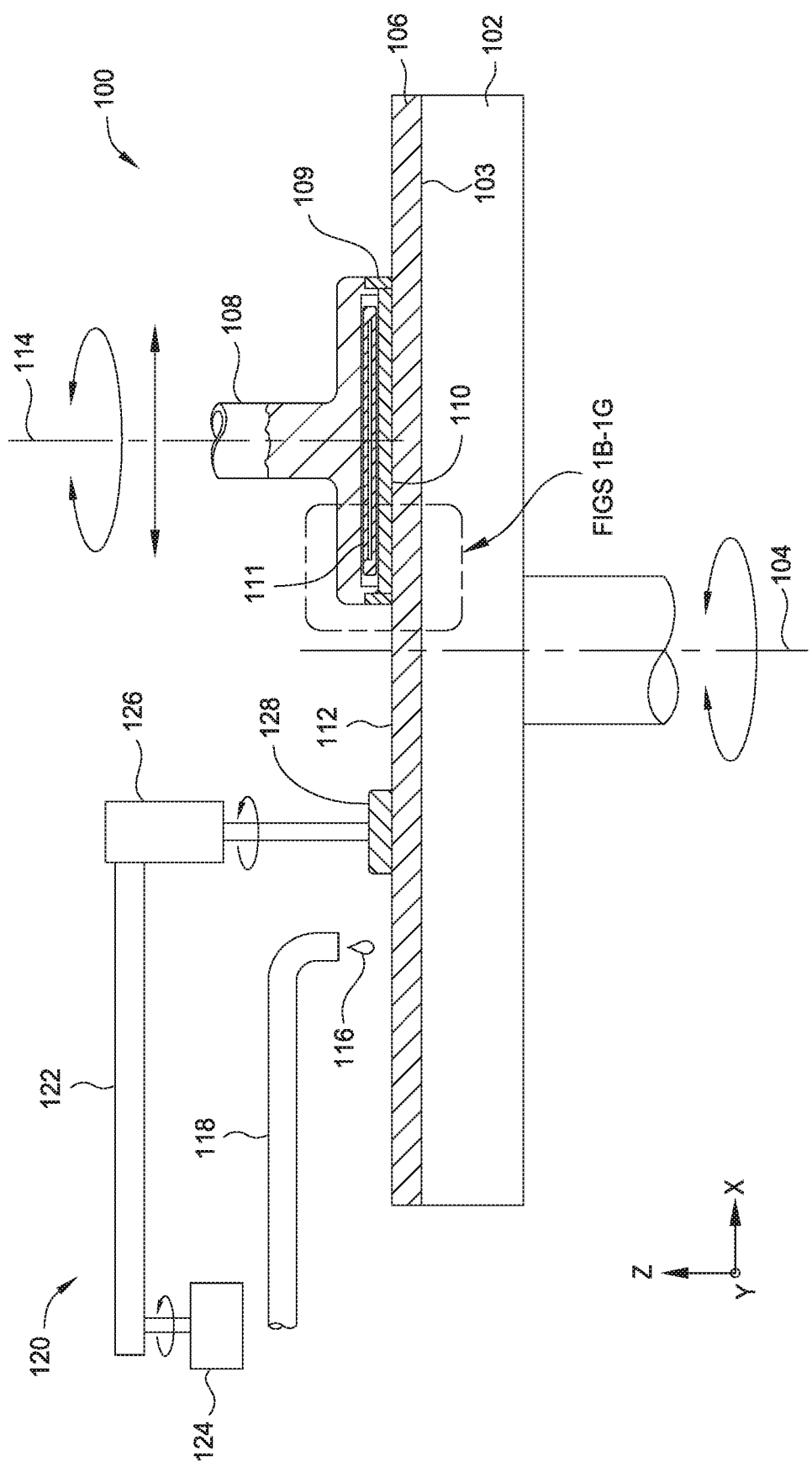
FIG. 1A is a schematic sectional view of a polishing station.

The present disclosure relates to advanced polishing pads with tunable chemical, material and structural properties, and new methods of manufacturing the same. According to one or more embodiments of the disclosure, it has been discovered that a polishing pad with improved properties may be produced by an additive manufacturing process, such as a three-dimensional (3D) printing process. Embodiments of the present disclosure provide an advanced polishing pad that has discrete features and geometries, formed from at least two different materials that are formed from precursors, or resin precursor compositions, that contain "resin precursor components" that include, but are not restricted to functional polymers, functional oligomers, monomers, reactive diluents, flow additives, curing agents, photoinitiators, and cure synergists. The resin precursor components may also include chemically active materials and/or compounds such as functional polymers, functional oligomers, monomers, and reactive diluents that may be at least monofunctional, and may undergo polymerization when exposed to free radicals, Lewis acids, and/or electromagnetic radiation. As one example, an advanced polishing pad may be formed from a plurality of polymeric layers, by the automated sequential deposition of at least one resin precursor composition followed by at least one curing step, wherein each layer may represent at least one polymer composition, and/or regions of different compositions. In some embodiments, the layers and/or regions of the advanced polishing pad may include a composite material structure, such as a radiation cured polymer that contains at least one filler, such as metals, semimetal oxides, carbides, nitrides and/or polymer particles. In some embodiments, the fillers may be used to increase abrasion resistance, reduce friction, resist wear, enhance crosslinking and/or thermal conductivity of the entire pad, or certain regions of the pad. Therefore, the advanced polishing pad, including the pad body and discrete features produced over, upon, and within the pad body, may be formed simultaneously from a plurality of different materials and/or compositions of materials, thus enabling micron scale control of the pad architecture and properties.

Moreover, a polishing pad is provided that includes desirable pad polishing properties over the complete polishing process range. Typical polishing pad properties include both static and dynamic properties of the polishing pad, which are affected by the individual materials within the polishing pad and the composite properties of the complete polishing pad structure. An advanced polishing pad may include regions that contain a plurality of discrete materials and/or regions that contain gradients in material composition in one or more directions within the formed polishing pad. Examples of some of the mechanical properties that can be adjusted to form an advance polishing pad that has desirable polishing performance over the polishing process range include, but are not limited to storage modulus E', loss modulus E", hardness, yield strength, ultimate tensile strength, elongation, thermal conductivity, zeta potential, mass density, surface tension, Poison's ratio, fracture toughness, surface roughness ($R_a$) and other related properties. Examples of some of the dynamic properties that can be adjusted within an advanced polishing pad may include, but are not limited to tan delta (tan δ), storage modulus ratio (or E'30/E'90 ratio) and other related parameters, such as the energy loss factor (KEL). The energy loss factor (KEL) is related to the elastic rebound and dampening effect of a pad material. KEL may be defined by the following equation: KEL=tan δ*$10^{12}$/[E'*(1+(tan δ)$^2$)], where E' is in Pascals. The KEL is typically measured using the method of Dynamic Mechanical Analysis (DMA) at a temperature of 40° C., and frequency of 1 or 1.6 hertz (Hz). Unless specified otherwise, the storage modulus E', the E'30/E'90 ratio and the percent recovery measurements provided herein were performed using a DMA testing process that was performed at a frequency of about 1 hertz (Hz) and a temperature ramp rate of about 5° C./min. By controlling one or more of the pad properties, an improved the polishing process performance, improved polishing pad lifetime and improved polishing process repeatability can be achieved. Examples of pad configurations that exhibit one or more these properties are discussed further below in conjunction with one or more the embodiments discussed herein.

As will be discussed more detail below, storage modulus E', is an important factor in assuring that the polishing results are uniform across a substrate, and thus is a useful metric for polishing pad performance. Storage modulus E' is typically calculated by dividing an applied tensile stress by the extensional strain in the elastic linear portion of the stress-strain curve (e.g., slope, or Δy/Δx). Similarly, the ratio of viscous stress to viscous strain is used to define the loss modulus E". It is noted that both storage modulus E' and loss modulus E" are intrinsic material properties, that result from the chemical bonding within a material, both intermolecular and intramolecular. Storage modulus may be measured at a desired temperature using a material testing technique, such as dynamic mechanical analysis (DMA) (e.g., ASTM D4065, D4440, and D5279). When comparing properties of different materials it is typical to measure the storage modulus E' of the material at a single temperature, in a range between 25° C. and 40° C., such as 40° C.

Another relevant metric in polishing pad performance and uniformity is the measure of the dampening ability of a material, such as the compression and rebound dampening properties of a polishing pad. A common way to measure dampening is to calculate the tan delta (tan δ) of a material at a desired temperature, where tan δ=loss modulus/storage modulus=E"/E'. When comparing properties of different materials it is typical to compare the tan δ measurements for materials at a single temperature, such as 40° C. Unless specified otherwise, the tan δ measurements provided herein were performed using a DMA testing process that was performed at a frequency of 1 hertz (Hz) and a temperature ramp rate of about 5° C./min. Tan δ is generally a measure of how "viscous" chemical structures in a material respond (e.g., bond rotation, polymer chain slippage and movement) to an applied cyclic strain in comparison to spring-like elastic chemical structures in the material, such as flexible and coiled aliphatic polymer chains that revert to a preferred low energy conformation and structure when a force is released. For example, the less elastic a material is, when a cyclic load is applied, the response of the viscous molecular segments of the material will lag behind the elastic molecular segments of the material (phase shift) and heat is generated. The heat generated in a polishing pad during processing of substrates may have an effect on the polishing process results (e.g., polishing uniformity), and thus should be controlled and/or compensated for by judicious choice of pad materials.

The hardness of the materials in a polishing pad plays a role in the polishing uniformity results found on a substrate after polishing and the rate of material removal. Hardness of a material, also often measured using a Rockwell, Ball or Shore hardness scale, measures a materials resistance toward indentation and provides an empirical hardness value, and may track or increase with increasing storage modulus E'. Pad materials are typically measured using a Shore hardness scale, which is typically measured using the ASTM D2240 technique. Typically, pad material hardness properties are measured on either a Shore A or Shore D scale, which is commonly used for softer or low storage modulus E' polymeric materials, such as polyolefins. Rockwell hardness (e.g., ASTM D785) testing may also be used to test the hardness of "hard" rigid engineering polymeric materials, such as a thermoplastic and thermoset materials.

Polishing Pad Apparatus and Polishing Methods

FIG. 1A is a schematic sectional view of a polishing station 100 that may be positioned within a larger chemical mechanical polishing (CMP) system that contains multiple polishing stations 100. The polishing station 100 includes a platen 102. The platen 102 may rotate about a central axis 104. A polishing pad 106 may be placed on the platen 102. Typically, the polishing pad 106 covers an upper surface of the platen 102 which is at least one to two times larger than the size of the substrate 110 (e.g., substrate diameter) that is to be processed in the polishing station 100. In one example, the polishing pad 106 and platen 102 are between about 6 inches (150 mm) and about 40 inches (1,016 mm) in diameter. The polishing pad 106 includes a polishing surface 112 configured to contact and process one or more substrates 110 and a supporting surface 103 that is positioned over a surface of the platen 102. The platen 102 supports the polishing pad 106 and rotates the polishing pad 106 during polishing. A carrier head 108 holds a substrate 110 against the polishing surface 112 of the polishing pad 106. The carrier head 108 typically includes a flexible diaphragm 111 that is used to urge the substrate 110 against the polishing pad 106 and a carrier ring 109 that is used to correct for an inherently non-uniform pressure distribution found across the substrate's surface during the polishing process. The carrier head 108 may rotate about a central axis 114 and/or move in a sweeping motion to generate relative motions between the substrate 110 and the polishing pad 106.

A delivery arm 118 delivers a polishing fluid 116, such as an abrasive slurry, is supplied to the polishing surface 112 during polishing. The polishing liquid 116 may contain abrasive particles, a pH adjuster and/or chemically active components to enable chemical mechanical polishing of the substrate. The slurry chemistry of 116 is designed to polish wafer surfaces and/or features that may include metals, metal oxides, and semimetal oxides. The polishing station 100 also typically includes a pad conditioning assembly 120 that includes a conditioning arm 122 and actuators 124 and 126 that are configured to cause a pad conditioning disk 128 (e.g., diamond impregnated disk) to be urged against and sweep across the polishing surface 112 at different times during the polishing process cycle to abrade and rejuvenate the surface 112 of the polishing pad 106.

FIGS. 1B-1C are schematic sectional views of a portion of the polishing head 108 and a conventional "hard" or high storage modulus E' modulus polishing pad 106A that are positioned in the polishing station 100. FIGS. 1D-1E are schematic sectional views of a portion of the polishing head 108 and a conventional soft or low storage modulus E' polishing pad 106B that are positioned in the polishing station 100. FIGS. 1F-1G are schematic sectional views of a portion of the polishing head 108 and one embodiment of an advanced polishing pad 200, which is described further below, that are positioned in the polishing station 100. For clarity, the flexible diaphragm 111 and upper part of the carrier head 108 have been left out of FIGS. 1B-1G. During operation the flexible diaphragm 111 (FIG. 1A) is positioned to urge the substrate 110 against the polishing pad 106A, 106B or an advanced polishing pad 200, and a carrier head actuator (not shown) that is coupled to a mounting portion (not shown) of the carrier head 108 is configured to separately urge the carrier head 108 and the retaining ring 109 against the surface of the polishing pad 106A, 106B or advanced polishing pad 200. As shown in FIGS. 1C, 1E and 1F, the flexible diaphragm 111 is configured to apply a pressure to the backside of the substrate 110, which is illustrated by the applied force $F_2$, and the carrier head actuator is configured to apply a force $F_1$ to the retaining ring 109.

FIG. 1B illustrates a portion of an edge of a substrate 110 that is positioned within the carrier head 108 and over a portion of a conventional "hard" or high storage modulus E' polishing pad 106A before the polishing process is performed on the substrate 110. The substrate 110 includes a layer 110A that has one or more device features 110B (FIG. 1H) that are to be removed and/or planarized during the subsequent CMP process. FIG. 1C illustrates the substrate 110 during a polishing process using the conventional "hard" polishing pad 106A illustrated in FIG. 1B. It has been found that CMP processes that use "hard" polishing pads tend to have non-uniform planarization results due to edge effects found at the edge of substrate 110 that specifically relate to the need to apply a force $F_1$ to the retaining ring 109 to compensate for a larger inherent polishing non-uniformity found at the edge of the substrate 110 during a CMP process. In other words, the high storage modulus E', rigid or hard nature of the material used to form the "hard" polishing pad causes a pad rebound or ridge 107A to be formed when the force $F_1$ is applied by the retaining ring 109 to the "hard" polishing pad 106A. The formation of the ridge 107A is generally related to the deformation 107B of the "hard" polishing pad 106A due to the applied force $F_1$, which causes the edge of the substrate 110 to polish faster than the center of the substrate 110. The higher polishing rate at the edge of the substrate 110 leads to a "global" CMP planarization non-uniformity (e.g., across the substrate non-uniformity).

Figure 1J:
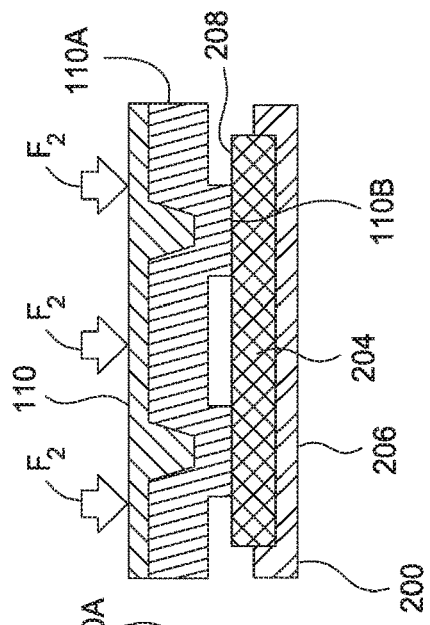
FIG. 1J is a schematic sectional view of a portion of a substrate that is being polished using the polishing station configuration illustrated in FIGS. 1F-1G, according to an embodiment of the present disclosure.
Figure 1I:
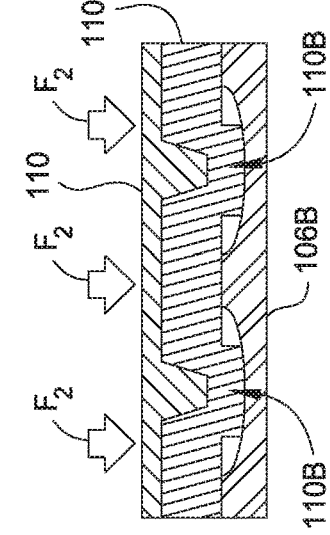
FIG. 1I is a schematic sectional view of a portion of a substrate that is being polished using the polishing station configuration illustrated in FIGS. 1D-1E.
Figure 1H:
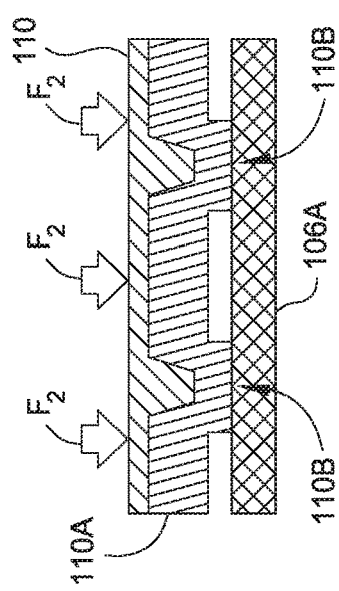
FIG. 1H is a schematic sectional view of a portion of a substrate that is being polished using the polishing station configuration illustrated in FIGS. 1B-1C.

FIG. 1H is a schematic sectional view of a portion of the substrate 110 that is being polished using the conventional "hard" polishing pad 106A. As shown, the substrate 110 includes a plurality of features 110B that are formed within the layer 110A, and are removed and/or planarized during the CMP process. In this example, the high storage modulus E', rigid and/or hard nature of the material used to form the "hard" polishing pad 106A will not allow it to significantly deform on a microscopic scale (e.g., 10 nm-1000 nm feature pitch) when the force $F_2$ is applied by the flexible diaphragm 111 to the substrate 110. In this case, the "hard" polishing pad 106A will generally deliver an acceptable amount of planarization and planarization efficiency on a microscopic scale, but achieve poor global planarization results for the reasons discussed above.

FIG. 1D illustrates a portion of an edge of a substrate 110 that is positioned within the carrier head 108 and over a portion of a conventional soft or low storage modulus E' polishing pad 106B before the polishing process is performed on the substrate 110. The substrate 110 includes a layer 110A that has one or more device features 110B (FIG. 1I) that are to be removed and planarized during the subsequent CMP process. FIG. 1E illustrates the substrate 110 during a polishing process using the conventional soft or low storage modulus E' polishing pad 106B illustrated in FIG. 1D. It has been found that CMP processes that use soft or low storage modulus E' polishing pads tend to have non-uniform planarization results due to the relative ease that a soft or low storage modulus E' polishing pad deforms under the applied force $F_1$ generated by the retaining ring 109 and the applied force $F_2$ generated by the flexible diaphragm 111 during a CMP process. In other words, the soft, flexible and low storage modulus E' nature of the material used to form the soft or low storage modulus E' polishing pad 106B allows the effect that the force $F_1$, supplied by the retaining ring 109, to be minimized, which improves the ability of the pad to compensate for retaining ring downforce 109. This compressive response of the low elastic modulus material allows for quick recover of retaining ring compression and a more consistent polishing rate seen between the center and edge of a substrate during the polishing process. Therefore, the use of a soft or low storage modulus E' polishing pad will lead to more global CMP planarization uniformity.

FIG. 1I is a schematic sectional view of a portion of a substrate that is being polished using the conventional soft or low storage modulus E' polishing pad 106B. In this example, the flexible or soft or low storage modulus E' nature of the material used to form the soft or low storage modulus E' polishing pad 106B allows the material to deform on a microscopic scale (e.g., 10 nm-1000 nm feature pitch) when the force $F_2$ is applied by the flexible diaphragm 111 to the substrate 110. As shown in FIG. 1I, the material in the soft or low storage modulus E' polishing pad 106B is able to deform and subsequently contact and polish regions of the layer 110A between the device features 110B. The act of simultaneously polishing the tops of the features 110B and portions of the regions between the features 110B will create planarization non-uniformities and other planarization problems. In this case, the soft or low storage modulus E' polishing pad 106B will generally deliver an acceptable amount of global planarization, but achieve a poor planarization efficiency and provide poor dishing results. Low storage modulus containing polishing pads provide the benefit on the microscopic scale of improved scratch performance as they allow hard defects, which can be disposed between the pad surface and the surface of the substrate, to be compressed and/or received within the pad matrix rather than forced against the substrate surface by a higher storage modulus material.

Advanced Polishing Pads

Embodiments of the present disclosure generally provide advanced polishing pads 200 that can be formed by use of an additive manufacturing process. The advanced polishing pads have a pad body that typically includes discrete features or regions that are formed from at least two different material compositions. FIGS. 1F-1G are schematic sectional views of a portion of the polishing head 108 and a pad body 202 of an advanced polishing pad 200 that are positioned in the polishing station 100. In general, it is desirable to form an advanced polishing pad 200 that is configured such that the load applied during the polishing process is distributed through regions of the polishing body 202 that include two or more material compositions to improve the advanced pad's mechanical, structural, and/or dynamic properties. In one embodiment, the pad body 202 may include a least a first polishing element 204 that is formed from a first storage modulus E' material (e.g., high storage modulus E' material), and a second polishing element 206 that may be formed from a second storage modulus E' material (e.g., medium or low storage modulus E' material). In one configuration, a height 150 of the first polishing element(s) 204 from the supporting surface 203 is higher than a height 151 of the second polishing element(s) 206 so that upper surfaces 208 of the first polishing element 204 protrude above the second polishing element(s) 206. In one example, as shown in FIG. 1G, the force $F_2$ is delivered by the flexible diaphragm 111 through the first polishing elements 204 to the second polishing element 206 that is supported by a supporting member, such as the platen 102 shown in FIG. 1A, so as to form an advanced polishing pad that has desired mechanical and dynamic properties that are a combination of materials in each of the polishing elements. By separating the higher storage modulus type polishing features from a low storage modulus type supporting feature the advanced polishing pad offers the benefit of improved global planarity, while maintaining the benefit of improved die and array level planarity offered by a higher storage modulus top pad.

FIG. 1J is a schematic sectional view of a portion of a substrate 110 that is being polished using an advanced polishing pad 200, according to an embodiment of the present disclosure. As illustrated in FIG. 1J, in some embodiments, a first polishing element 204 within the polishing body 202 is formed such that it is large enough to span the distance of at least two or more device features 110B (e.g., integrated circuit devices) that are formed on a surface of the substrate 110. In some embodiments, one or more of the first polishing elements 204 are sized such that they are smaller than the major dimension of the substrate (e.g., radius of a circular substrate), but larger than the smallest device feature size found on a substrate 110. In some embodiments, a plurality of the first polishing elements 204 each have a lateral dimension 208L, which is parallel to the polishing surface, that is between about 250 micrometers and about 3 mm in size. In one example, where the first polishing elements 204 have a circular, square, rectangular, or triangular cross-section at the polishing surface 208, the lateral dimension (e.g., length 208L) can be the diameter or leg of the square, rectangle, or triangle, respectively, of the first polishing element 204. In another example, where the first polishing elements 204 are toroid shaped or arc shaped at the polishing surface 208, the lateral dimension (e.g., width 214) can be the thickness of the toroid or arc when measured along its radius, or even the outer diameter of the toroid in some cases. The combination of the first polishing elements 204 and the one or more second polishing elements 206 can thus be used to adjust the advanced polishing pad properties and performance to improve the results of a polishing process performed on a substrate using the advanced polishing pad, as further discussed below.

In some embodiments, the advanced polishing pad 200 may contain at least one high storage modulus E', medium storage modulus E', and/or low storage modulus E' polishing element, and/or chemical structural feature. For example, a high storage modulus E' material composition may be at least one, or a mixture of, chemical groups and/or structural features including aromatic ring(s) and some aliphatic chains. In some cases, the high storage modulus E' materials have a crosslinking density greater than 2%. The high storage modulus E' compositions may be the most rigid element in an advanced polishing pad and have a high hardness value, and display the least elongation. Medium storage modulus E' compositions may contain a mixture of aromatic rings, crosslinking, but may contain a greater content of aliphatic chains, ether segments, and/or polyurethane segments, than high storage modulus E' compositions. The medium storage modulus E' compositions may have intermediate rigidity, hardness, and display a larger amount of elongation than the high storage modulus E' materials. Low storage modulus E' compositions may contain aliphatic chains, ether segments, and/or polyurethane segments, with minimal or no contribution from aromatic rings or crosslinking. The low storage modulus E' compositions may be flexible, soft, and/or rubber-like.

Materials having desirable low, medium, and/or high storage modulus E' properties at temperatures of 30° C. (E'30) are summarized in Table 1:

TABLE 1

| | Low Modulus Compositions | Medium Modulus Compositions | High Modulus Compositions |
| --- | --- | --- | --- |
| E'30 | 5 MPa-100 MPa | 100 MPa-500 MPa | 500 MPa-3000 MPa |

In one embodiment, and referring to Table 1, the polishing pad body 202 may be formed from at least one viscoelastic materials having different storage moduli E' and/or loss moduli E". As a result, the pad body may include a first material or a first composition of materials that have a first storage modulus E' and loss modulus E", and a second material or a second composition of materials that have a second storage modulus E' and loss modulus E" that is different than the first storage modulus E' and loss modulus E". In some embodiments, polishing pad surface features may include a plurality of features with one or more form factors or dimensions, and be a mixture of features that have different mechanical, thermal, interfacial and chemical properties. For example, the pad surface features, such as channels, grooves and/or proturbances, disposed over, upon, and within the pad body, may include both higher storage modulus E' properties derived from a first material or a first composition of materials and some lower storage modulus E' properties derived from a second material or a second composition of materials that are more elastic than the first material or the first composition of materials.

The term advanced polishing pad 200 as used herein is intended to broadly describe an advanced polishing pad that contains one or more of the attributes, materials, features and/or properties that are discussed above and further below. Specific configurations of advanced polishing pads are discussed in conjunction with the examples illustrated in FIGS. 2A-2K. Unless otherwise specified, the terms first polishing element(s) 204 and the second polishing element(s) 206 are intended to broadly describe portions, regions and/or features within the polishing body of the advanced polishing pad 200. The specific examples of different advanced polishing pad configurations, shown in FIGS. 2A-2K, are not intended to be limiting as to the scope of the disclosure provided herein, since other similar configurations may be formed by use of the one or more of the additive manufacturing processes described herein.

The advanced polishing pads may be formed by a layer by layer automated sequential deposition of at least one resin precursor composition followed by at least one curing step, wherein each layer may represent at least one polymer composition, and/or regions of different compositions. The compositions may include functional polymers, functional oligomers, reactive diluents, and curing agents. The functional polymers may include multifunctional acrylate precursor components. To form a plurality of solid polymeric layers, one or more curing steps may be used, such as exposure of one or more compositions to UV radiation and/or thermal energy. In this fashion, an entire polishing pad may be formed from a plurality of polymeric layers by 3D printing. A thickness of the cured layer may be from about 0.1 micron to about 1 mm, such as 5 micron to about 100 microns, and such as 25 microns to about 30 microns.

Polishing pads according to the present disclosure may have differing mechanical properties, such as storage modulus E' and loss modulus E", across the pad body 202, as reflected by at least one compositional gradient from polishing element to polishing element. Mechanical properties across the polishing pad 200 may be symmetric or non-symmetric, uniform or non-uniform to achieve target polishing pad properties, which may include static mechanical properties, dynamic mechanical properties and wear properties. The patterns of either of the polishing elements 204, 206 across the pad body 202 may be radial, concentric, rectangular, spiral, fractal or random according to achieve target properties including storage modulus E' and loss modulus E", across the polishing pad. Advantageously, the 3D printing process enables specific placement of material compositions with desired properties in specific pad areas of the pad, or over larger areas of the pad so the properties are combined and represent a greater average of properties or a "composite" of the properties.

Advanced Polishing Pad Configuration Examples

Figure 2A:
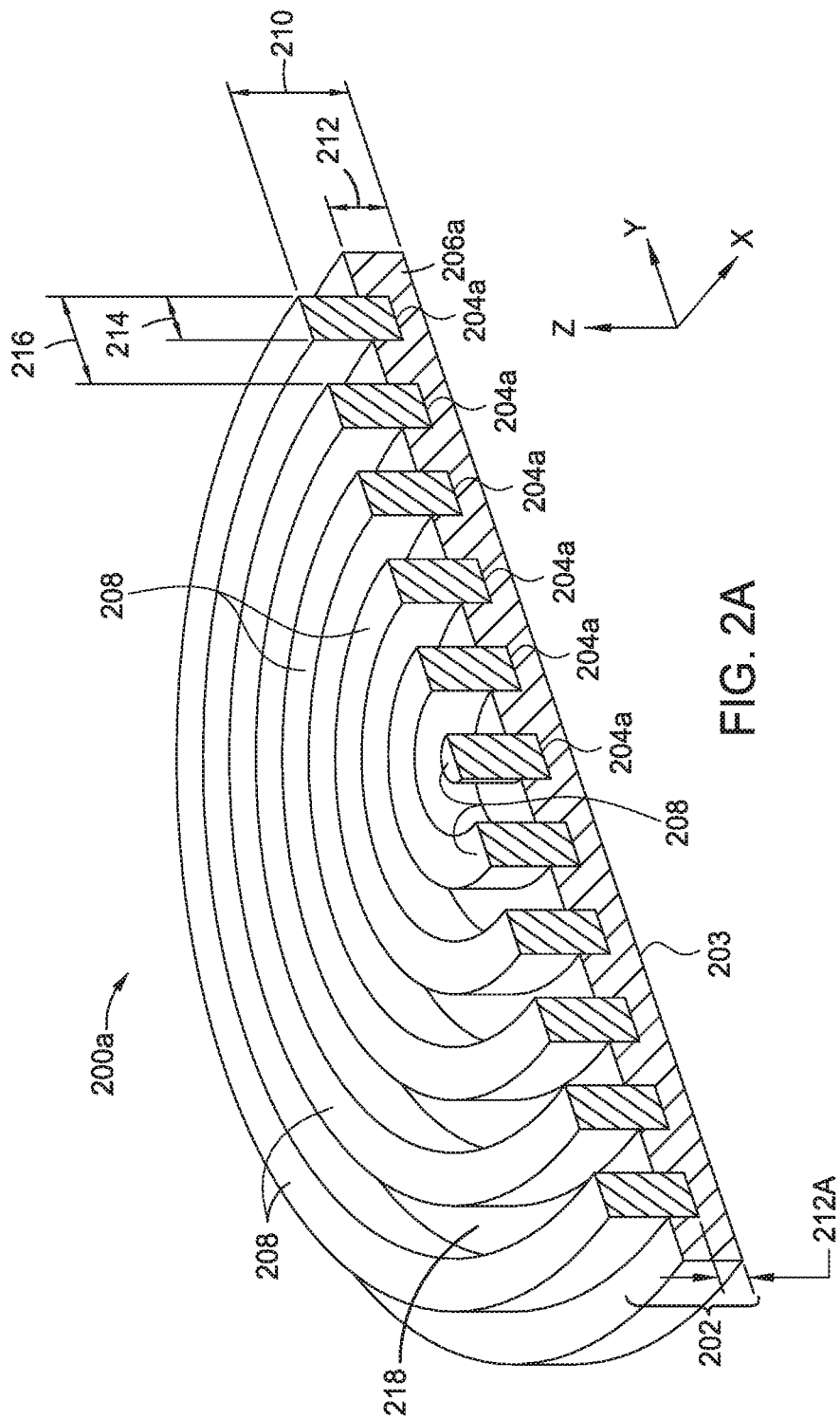
FIG. 2A is a schematic isometric and cross-sectional view of a polishing pad according to an embodiment of the present disclosure.

FIG. 2A is a schematic perspective sectional view of an advanced polishing pad 200a according to one embodiment of the present disclosure. One or more first polishing elements 204a may formed in alternating concentric rings that are coupled to one or more second polishing elements 206a to form a circular pad body 202. In one embodiment, a height 210 of the first polishing element(s) 204a from the supporting surface 203 is higher than a height 212 of the second polishing element(s) 206a so that the upper surfaces 208 of the first polishing element(s) 204a protrude above the second polishing element(s) 206a. In one embodiment, the first polishing element 204 is disposed over a portion 212A of the second polishing element(s) 206a. Grooves 218 or channels are formed between the first polishing element(s) 204a, and at least include a portion of the second polishing element(s) 206a. During polishing, the upper surfaces 208 of the first polishing elements 204a form a polishing surface that contacts the substrate, while the grooves 218 retain and channel the polishing fluid. In one embodiment, the first polishing element(s) 204a are thicker than the second polishing element(s) 206a in a direction normal to a plane parallel to the polishing surface, or upper surface 208, of the pad body 202 (i.e., Z-direction in FIG. 2A) so that the channels or grooves 218 are formed on the top surface of the pad body 202.

In one embodiment, a width 214 of the first polishing elements 204a may be between about 250 microns and about 5 millimeters. The pitch 216 between the hard first polishing element(s) 204a may be between about 0.5 millimeters and about 5 millimeters. Each first polishing element 204a may have a width within a range between about 250 microns and about 2 millimeters. The width 214 and/or the pitch 216 may vary across a radius of the advanced polishing pad 200 to define zones of varied hardness.

Figure 2B:
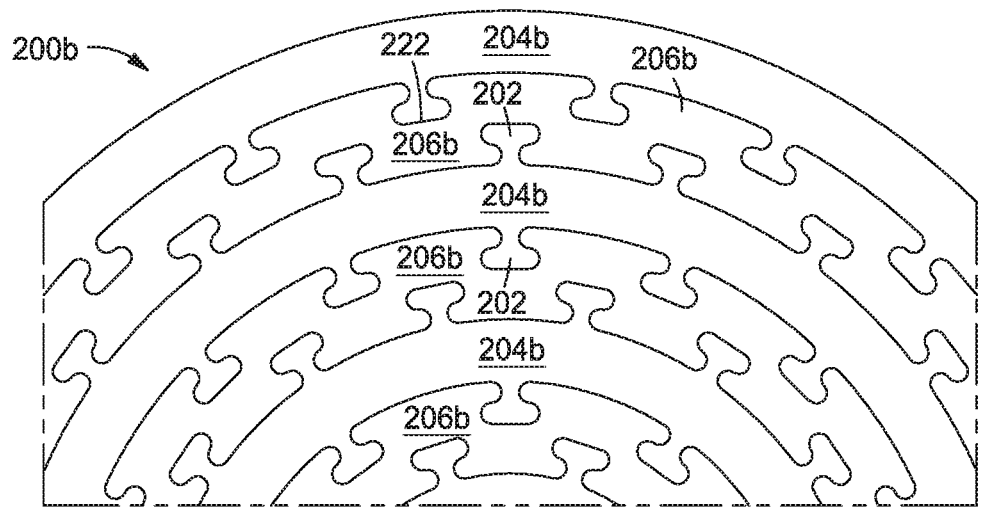
FIG. 2B is a schematic partial top view of a polishing pad according to an embodiment of the present disclosure.

FIG. 2B is a schematic partial top view of an advanced polishing pad 200b according to an embodiment of the present disclosure. The advanced polishing pad 200b is similar to the advanced polishing pad 200 of FIG. 2A except that the advanced polishing pad 200b includes interlocking first polishing elements 204b and second polishing elements 206b. The first polishing elements 204b and the second polishing elements 206b form a plurality of concentric rings. The first polishing elements 204b may include protruding vertical ridges 220 and the second polishing elements 206b may include vertical recesses 222 for receiving the vertical ridges 220. Alternatively, the second polishing elements 206b may include protruding ridges while the first polishing elements 204b include recesses. By having the second polishing elements 206b interlock with the first polishing elements 204b, the advanced polishing pad 200b will be mechanically stronger in relation to applied shear forces, which may be generated during the CMP process and/or material handling. In one embodiment, the first polishing elements and the second polishing elements may be interlocked to improve the strength of the polishing pad and improve physical integrity of the polishing pads. The interlocking of the features may be due to physical and/or chemical forces.

Figure 2C:
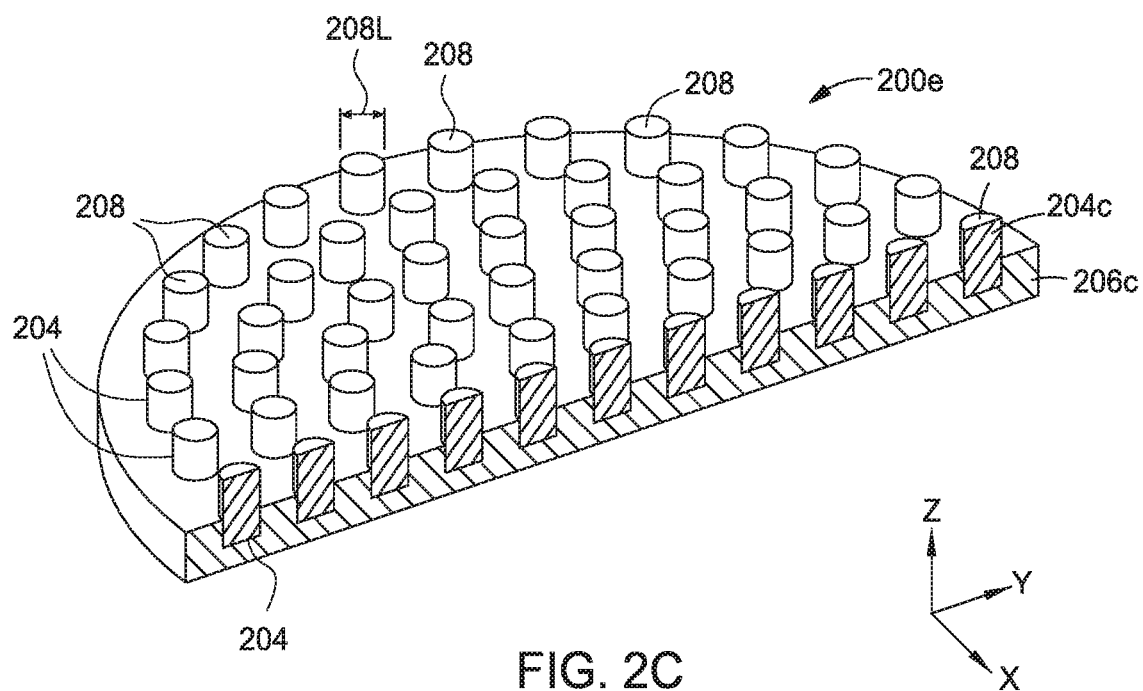
FIG. 2C is a schematic isometric and cross-sectional view of a polishing pad according to an embodiment of the present disclosure.

FIG. 2C is a schematic perspective sectional view of an advanced polishing pad 200c according to an embodiment of the present disclosure. The polishing pad 200c includes a plurality of first polishing elements 204c extending from a base material layer, such as the second polishing element 206c. Upper surfaces 208 of the first polishing elements 204c form a polishing surface for contacting the substrate during polishing. The first polishing elements 204c and the second polishing elements 206c have different material and structural properties. For example, the first polishing elements 204c may be formed from a hard material, while the second polishing elements 206c may be formed from an soft or low storage modulus E' material. The polishing pad 200c may be formed by 3D printing, similar to the advanced polishing pad 200.

The first polishing elements 204c may be substantially the same size, or may vary in size to create varied mechanical properties, such as varied storage modulus E' and/or varied loss modulus E", across the polishing pad 200c. The first polishing elements 204c may be uniformly distributed across the polishing pad 200c, or may be arranged in a non-uniform pattern to achieve target properties in the advanced polishing pad 200c.

In FIG. 2C, the first polishing elements 204c are shown to be circular columns extending from the second polishing elements 206c. Alternatively, the first polishing elements 204c may be of any suitable cross-sectional shape, for example columns with toroidal, partial toroidal (e.g., arc), oval, square, rectangular, triangular, polygonal, or other irregular section shapes, or combinations thereof. In one embodiment, the first polishing elements 204c may be of different cross-sectional shapes to tune hardness, mechanical strength or other desirable properties of the advanced polishing pad 200c.

Figure 2D:
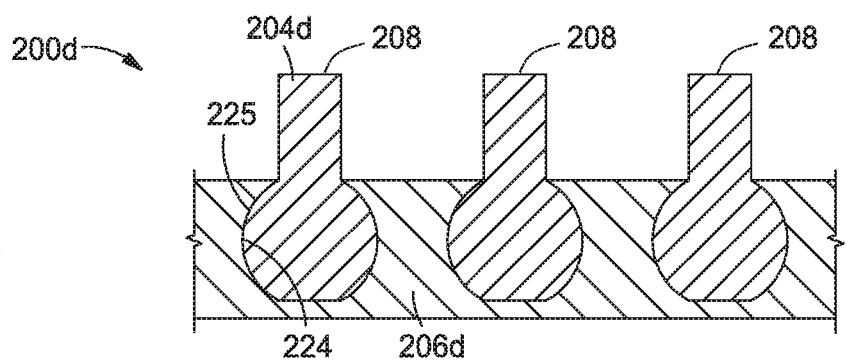
FIG. 2D is a schematic side cross-sectional view of a portion of a polishing pad according to an embodiment of the present disclosure.

FIG. 2D is a schematic partial side cross-sectional view of a polishing body 202 of an advanced polishing pad 200c according to an embodiment of the present disclosure. The advanced polishing pad 200d is similar to the advanced polishing pad 200a, 200b or 200c of FIGS. 2A-2C except that the advanced polishing pad 200d includes interlocking first polishing elements 204d and second polishing elements 206d. The first polishing elements 204d and the second polishing elements 206d may include a plurality of concentric rings and/or discrete elements that form part of the pad body 202, which are, for example, illustrated in FIG. 2A, 2B or 2C. In one embodiment, the first polishing elements 204d may include protruding sidewalls 224 while the second polishing elements 206d may include regions 225 to receive the protruding sidewalls 224 of the first polishing elements 204d. Alternatively, the second polishing elements 206d may include protruding sidewalls while the first polishing elements 204d include regions that are configured to receive the protruding sidewalls. By interlocking the second polishing elements 206c with the first polishing elements 204d, the advanced polishing pad 200d may exhibit an increased tensile, compressive and/or shear strength. Additionally, the interlocking sidewalls prevent the advanced polishing pad 200d from being pulled apart.

In one embodiment, the boundaries between the first polishing elements 204d and second polishing elements 206d include a cohesive transition from at least one composition of material to another, such as a transition or compositional gradient from a first composition used to form the first polishing element 204d and a second composition used to form the second polishing element 206d. The cohesiveness of the materials is a direct result of the additive manufacturing process described herein, which enables micron scale control and intimate mixing of the two or more chemical compositions in a layer by layer additively formed structure.

Figure 2E:
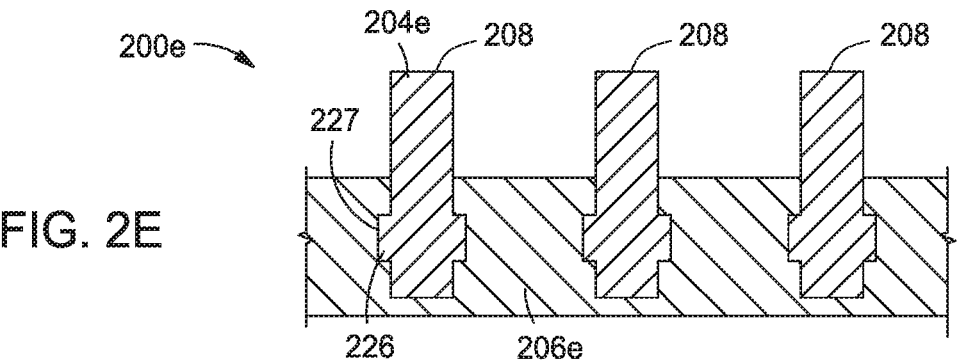
FIG. 2E is a schematic side cross-sectional view of a portion of a polishing pad according to an embodiment of the present disclosure.

FIG. 2E is a schematic partial sectional view of a polishing pad according to an embodiment of the present disclosure. The advanced polishing pad 200e is similar to the advanced polishing pad 200d of FIG. 2D except that the advanced polishing pad 200e includes differently configured interlocking features. The advanced polishing pad 200e may include first polishing elements 204e and second polishing elements 206e having a plurality of concentric rings and/or discrete elements. In one embodiment, the first polishing elements 204e may include horizontal ridges 226 while the second polishing elements 206e may include horizontal recesses 227 to receive the horizontal ridges 226 of the first polishing elements 204e. Alternatively, the second polishing elements 206e may include horizontal ridges while the first polishing elements 204e include horizontal recesses. In one embodiment, vertical interlocking features, such as the interlocking features of FIG. 2B and horizontal interlocking features, such as the interlocking features of FIGS. 2D and 2E, may be combined to form an advanced polishing pad.

FIGS. 2F-2K are schematic plan views of various polishing pad designs according to embodiments of the present disclosure. Each of the FIGS. 2F-2K include pixel charts having white regions (regions in white pixels) that represent the first polishing elements 204f-204k, respectively, for contacting and polishing a substrate, and black regions (regions in black pixels) that represent the second polishing element(s) 206f-206k. As similarly discussed herein, the white regions generally protrude over the black regions so that channels are formed in the black regions between the white regions. In one example, the pixels in a pixel chart are arranged in a rectangular array type pattern (e.g., X and Y oriented array) that are used to define the position of the various materials within a layer, or a portion of layer, of an advanced polishing pad. In another example, the pixels in a pixel chart are arranged in a hexagonal close pack array type of pattern (e.g., one pixel surrounded by six nearest neighbors) that are used to define the position of the various materials within a layer, or a portion of layer of a polishing pad. Polishing slurry may flow through and be retained in the channels during polishing. The polishing pads shown in FIGS. 2F-2K may be formed by depositing a plurality of layers of materials using an additive manufacturing process. Each of the plurality of layers may include two or more materials to form the first polishing elements 204f-204k and second polishing element(s) 206f-206k. In one embodiment, the first polishing elements 204f-204k may be thicker than the second polishing element(s) 206f-206k in a direction normal to a plane that is parallel to the plurality of layers of materials so that grooves and/or channels are formed on a top surface of the polishing pad.

Figure 2H:
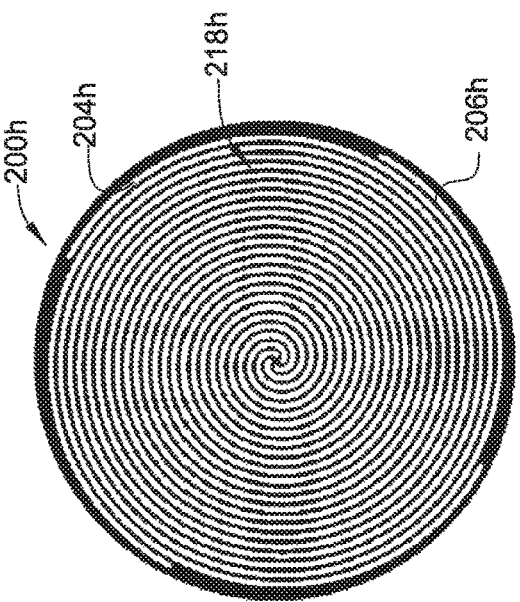
FIGS. 2F-2K are top views of polishing pad designs according to embodiments of the present disclosure.
Figure 2K:
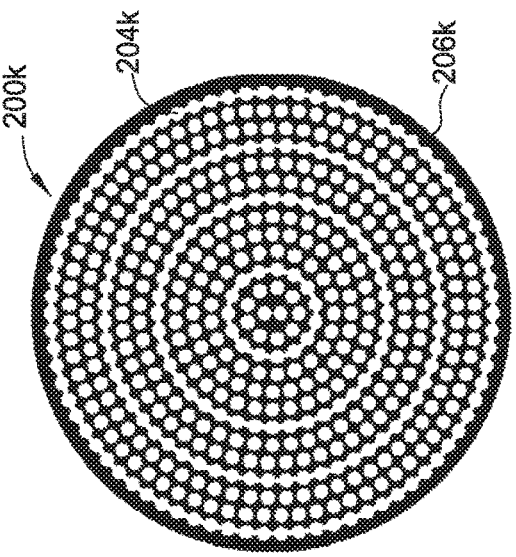
Figure 2G:
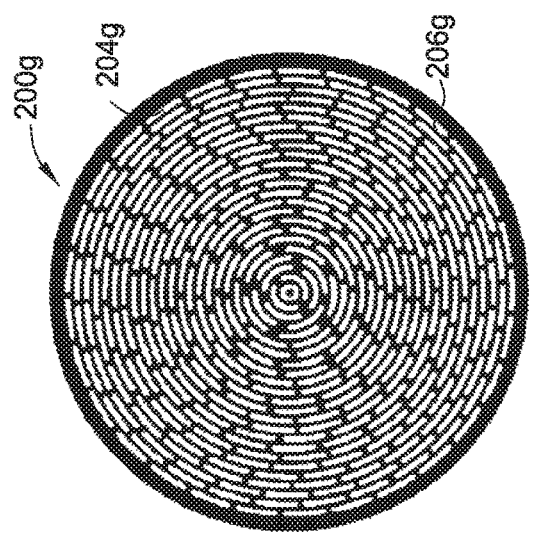
Figure 2J:
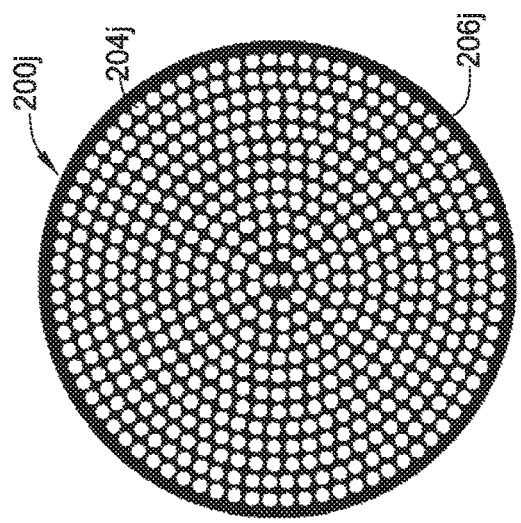
Figure 2F:
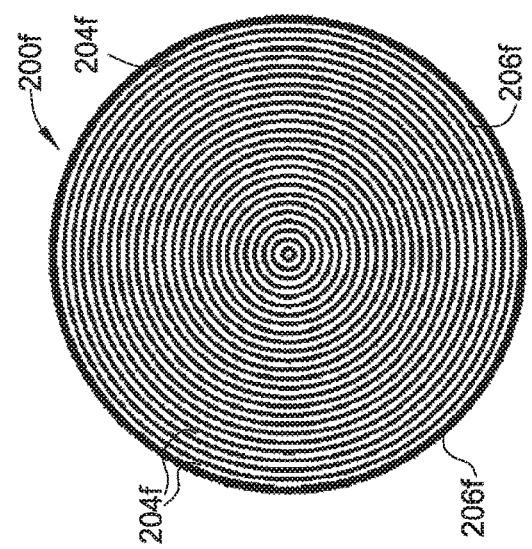

FIG. 2F is a schematic pixel chart of an advanced polishing pad design 200f having a plurality of concentric polishing features 204f. The polishing features 204f may be concentric circles of equal width. In one embodiment, the second polishing element(s) 206f may also have equal width so that the pitch of the first polishing element(s) 204f is constant along the radial direction. During polishing, channels between the first polishing element(s) 204f retain the polishing slurry and prevent rapid loss of the polishing slurry due to a centrifugal force generated by rotation of the polishing pad about its central axis (i.e., center of concentric circles).

FIG. 2G is a schematic pixel chart of a polishing pad design 200g having a plurality of segmented first polishing elements 204g arranged in concentric circles. In one embodiment, the segmented first polishing elements 204g may have substantially equal length. The segmented first polishing elements 204g may form a plurality of concentric circles. In each circle, the segmented first polishing elements 204g may be equally distributed within each concentric circle. In one embodiment, the segmented first polishing elements 204g may have an equal width in the radial direction. In some embodiments, the segmented first polishing elements 204g have a substantially equal length irrespective of the radius of the concentric circle (e.g., equal arc length except for the center region of the polishing pad). In one embodiment, the second polishing element(s) 206g are disposed between the plurality of concentric circles and have an equal width so that the pitch of the concentric circles is constant. In one embodiment, gaps between the segmented first polishing elements 204g may be staggered from circle to circle to prevent polishing slurry from directly flowing out of the polishing pad under the centrifugal force generated by rotation of the polishing pad about its central axis.

FIG. 2H is a schematic pixel chart of a polishing pad design 200h having spiral first polishing elements 204h disposed over second polishing element(s) 206h. In FIG. 2H, the polishing pad 200h has four spiral first polishing elements 204h extending from a center of the polishing pad to an edge of the polishing pad. Even though four spiral polishing features are shown, less or more numbers of spiral first polishing elements 204h may be arranged in similar manner. The spiral first polishing elements 204h define spiral channels 218h. In one embodiment, each of the spiral first polishing elements 204h has a constant width. In one embodiment, the spiral channels 218*h* also have a constant width. During polishing, the polishing pad may rotate about a central axis in a direction opposite to the direction of the spiral first polishing elements 204*h* to retain polishing slurry in the spiral channels. For example, in FIG. 2H, the spiral first polishing elements 204*h* and the spiral channels are formed in a counter-clockwise direction, and thus during polishing the polishing pad may be rotated clockwise to retain polishing slurry in the spiral channels and on the polishing pad. In some configurations, each of the spiral channels is continuous from the center of the polishing pad to the edge of the polishing pad. This continuous spiral channels allow polishing slurry along with any polishing waste to flow from the center of the polishing pad to the edge of the polishing pad. In one embodiment, the polishing pad may be cleaned by rotating the polishing pad in the same direction as the spiral first polishing elements 204*h* (e.g., counter-clockwise in FIG. 2H).

Figure 2I:
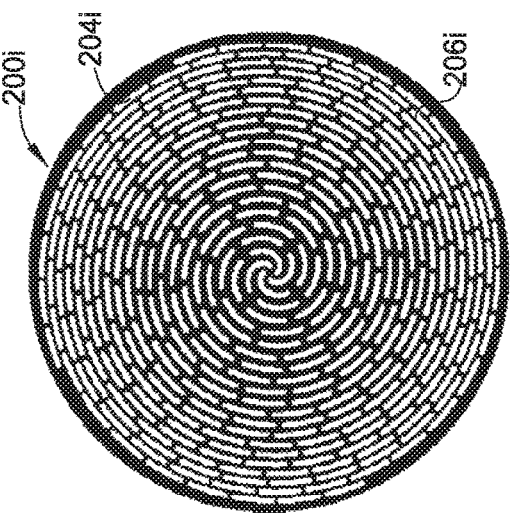

FIG. 2I is a schematic pixel chart of a polishing pad design 200*i* having segmented first polishing elements 204*i* arranged in a spiral pattern on second polishing element(s) 206*i*. The advanced polishing pad illustrated in FIG. 2I is similar to the polishing pad in FIG. 2H except that the first polishing elements 204*i* are segmented, and the radial pitch of the first polishing elements 204*i* varies. In one embodiment, the radial pitch of the segmented first polishing elements 204*i* decreases from a center of the polishing pad to an edge region of the polishing pad to adjust and/or control the retention of the slurry on different regions of the surface of the polishing pad during processing.

FIG. 2J is a schematic pixel chart of a polishing pad design 200*j* having a plurality of discrete first polishing elements 204*j* formed in a second polishing element(s) 206*j*. In one embodiment, each of the plurality of first polishing elements 204*j* may be a cylindrical post type structure, similar to the configuration illustrated in FIG. 2C. In one embodiment, the plurality of first polishing elements 204*j* may have the same dimension in the plane of the polishing surface. In one embodiment, the plurality of cylindrical first polishing elements 204*j* may be arranged in concentric circles. In one embodiment, the plurality of cylindrical first polishing elements 204*j* may be arranged in a regular 2D pattern relative to the plane of the polishing surface.

FIG. 2K is a schematic pixel chart of a polishing pad design 200*k* having a plurality of discrete first polishing elements 204*k* formed over a second polishing element(s) 206*k*. The polishing pad of FIG. 2K is similar to the polishing pad of FIG. 2J except that some first polishing elements 204*k* in FIG. 2K may be connected to form one or more closed circles. The one or more closed circles may create one or more dams to retain polishing slurry during polishing.

The first polishing elements 204*a*-204*k* in the designs of FIGS. 2A-2K may be formed from an identical material or identical compositions of materials. Alternatively, the material composition and/or material properties of the first polishing elements 204*a*-204*k* in the designs of FIG. 2A-2K may vary from polishing feature to polishing feature. Individualized material composition and/or material properties allows polishing pads to be tailored for specific needs.

Additive Manufacturing Apparatus and Process Examples

Figure 3A:
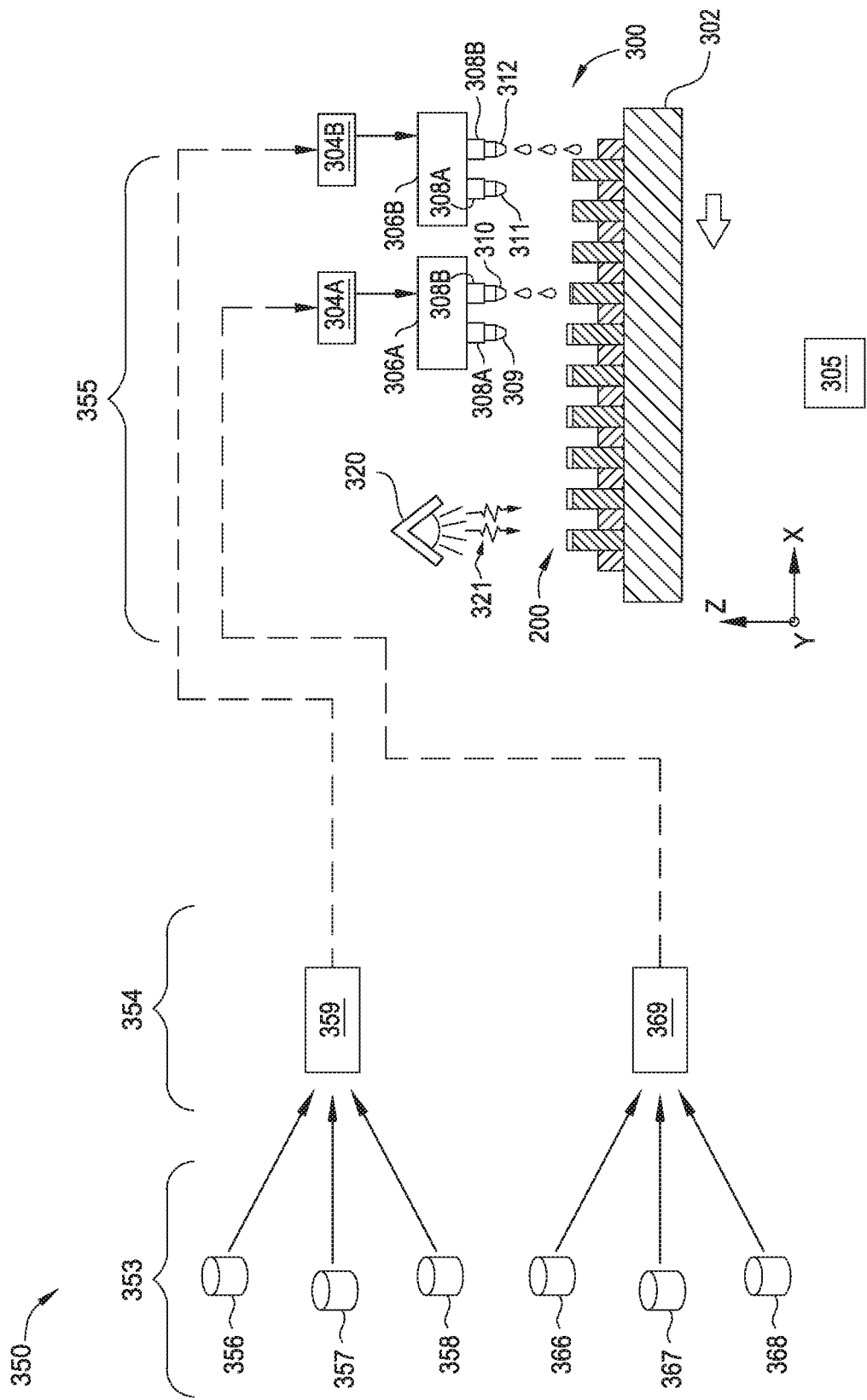
FIG. 3A is a schematic view of a system for manufacturing advanced polishing pads, according to an embodiment of the present disclosure.

FIG. 3A is a schematic sectional view of an additive manufacturing system 350 that can be used to form an advanced polishing pad using an additive manufacturing process according to one or more embodiments of the present disclosure. An additive manufacturing process may include, but are not limited to a process, such as a polyjet deposition process, inkjet printing process, fused deposition modeling process, binder jetting process, powder bed fusion process, selective laser sintering process, stereolithography process, vat photopolymerization digital light processing, sheet lamination process, directed energy deposition process, or other similar 3D deposition process.

The additive manufacturing system 350 generally includes a precursor delivery section 353, a precursor formulation section 354 and a deposition section 355. The deposition section 355 will generally include an additive manufacturing device, or hereafter printing station 300. The advanced polishing pad 200 may be printed on a support 302 within the printing station 300. Typically, the advanced polishing pad 200 is formed layer by layer using one or more droplet ejecting printers 306, such as printer 306A and printer 306B illustrated in FIG. 3A, from a CAD (computer-aided design) program. The printers 306A, 306B and the support 302 may move relative to each other during the printing process.

The droplet ejecting printer 306 may include one or more print heads 308 having one or more nozzles (e.g. nozzles 309-312) for dispensing liquid precursors. In the embodiment of FIG. 3A, the droplet ejecting printer 306A includes print head 308A that has a nozzle 309 and a print head 308B having a nozzle 310. The nozzle 309 may be configured to dispense a first liquid precursor composition to form a first polymer material, such as a soft or low storage modulus E' polymer, while the nozzle 310 may be used to dispense a second liquid precursor to form a second polymer material, such as a hard polymer, or a polymer exhibiting a high storage modulus E'. The liquid precursor compositions may be dispensed at selected locations or regions to form an advanced polishing pad that has desirable properties. These selected locations collectively form the target printing pattern that can be stored as a CAD-compatible file that is then read by an electronic controller 305, which controls the delivery of the droplets from the nozzles of the droplet ejecting printer 306.

The controller 305 is generally used to facilitate the control and automation of the components within the additive manufacturing system 350, including the printing station 300. The controller 305 can be, for example, a computer, a programmable logic controller, or an embedded controller. The controller 305 typically includes a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the controller 305 determines which tasks are performable by the components in the additive manufacturing system 350.

Preferably, the program is software readable by the controller 305 that includes code to perform tasks relating to monitoring, execution and control of the delivery and positioning of droplets delivered from the printer 306, and the movement, support, and/or positioning of the components within the printing station 300 along with the various process tasks and various sequences being performed in the controller 305.

After 3D printing, the advanced polishing pad 200 may be solidified by use of a curing device 320 that is disposed within the deposition section 355 of the additive manufacturing system 350. The curing process performed by the curing device 320 may be performed by heating the printed polishing pad to a curing temperature or exposing the pad to one or more forms of electromagnetic radiation or electron beam curing. In one example, the curing process may be performed by exposing the printed polishing pad to radiation 321 generated by an electromagnetic radiation source, such as a visible light source, an ultraviolet light source, and x-ray source, or other type of electromagnetic wave source that is disposed within the curing device 320.

The additive manufacturing process offers a convenient and highly controllable process for producing advanced polishing pads with discrete features formed from different materials and/or different compositions of materials. In one embodiment, soft or low storage modulus E' features and/or hard or high storage modulus E' features may be formed using the additive manufacturing process. For example, the soft or low storage modulus E' features of a polishing pad may be formed from the first composition containing polyurethane segments dispensed from the nozzle 312 of the printer 306B, and hard or high storage modulus E' features of the polishing pad may be formed from droplets of the second composition dispensed from the nozzle 310 of the printer 306A.

In another embodiment, the first polishing elements 204 and/or the second polishing element(s) 206 may each be formed from a mixture of two or more compositions. In one example, a first composition may be dispensed in the form of droplets by a first print head, such as the print head 308A, and the second composition may be dispensed in the form of droplets by a second print head, such as the print head 308B of the printer 306A. To form first polishing elements 204 with a mixture of the droplets delivered from multiple print heads requires/includes the alignment of the pixels corresponding to the first polishing elements 204 on predetermined pixels within a deposition map found in the controller 305. The print head 308A may then align with the pixels corresponding to where the first polishing elements 204 are to be formed and then dispense droplets on the predetermined pixels. The advanced polishing pad may thus be formed from a first composition of materials that is formed by depositing droplets of a first droplet composition and a second material that comprises a second composition of materials that is formed by depositing droplets of a second droplet composition.

FIG. 3B is a schematic cross-sectional view of a portion of the printing station 300 and advanced polishing pad 200 during the pad manufacturing process. The printing station 300, as shown in FIG. 3B, includes two printers 306A and 306B that are used to sequentially form a portion of the advanced polishing pad 200. The portion of the advanced polishing pad 200 shown in FIG. 3B may, for example, include part of either the first polishing element 204 or the second polishing elements 206 in the finally formed advanced polishing pad 200. During processing the printers 306A and 306B are configured to deliver droplets "A" or "B," respectively, to a first surface of the support 302 and then successively to a surface of the growing polishing pad that is disposed on the support 302 in a layer by layer process. As shown in FIG. 3B, a second layer 348 is deposited over a first layer 346 which has been formed on the support 302. In one embodiment, the second layer 348 is formed over the first layer 346 which has been processed by the curing device 320 that is disposed downstream from the printers 306A and 306B in the pad manufacturing process. In some embodiments, portions of the second layer 348 may be simultaneously processed by the curing device 320 while one or more of the printers 306A and 306B are depositing droplets "A" and/or "B" onto the surface 346A of the previously formed layer 346. In this case, the layer that is currently being formed may include a processed portion 348A and an unprocessed portion 348B that are disposed on either side of a curing zone 349A. The unprocessed portion 348B generally includes an array of dispensed droplets, such as dispensed droplets 343 and 347, which are deposited on the surface 346A of the previously formed layer 346 by use of the printers 306B and 306A, respectively.

FIG. 3C is a close up cross-sectional view of a dispensed droplet 343 that is disposed on a surface 346A of the previously formed layer 346. Based on the properties of the materials within the dispensed droplet 343, and due to surface energy of the surface 346A the dispensed droplet will spread across the surface an amount that is larger than the size of the original dispensed droplet (e.g., droplets "A" or "B"), due to surface tension. The amount of spread of the dispensed droplet will vary as a function of time from the instant that it is deposited on the surface 346A. However, after a very short period of time (e.g., <1 second) the spread of the droplet will reach an equilibrium size, and have an equilibrium contact angle α. The spread of the dispensed droplet across the surface affects the resolution of the placement of the droplets on the surface of the growing polishing pad, and thus the resolution of the features and material compositions found within various regions of the final polishing pad.

In some embodiments, it is desirable to expose one or both of the droplets "A" and "B" after they have been contact with the surface of the substrate for a period of time to cure, or "fix," each droplet at a desired size before the droplet has a chance to spread to its uncured equilibrium size on the surface of the substrate. In this case, the energy supplied to the dispensed droplet, and surface that it is placed on, by the curing device 320 and the droplet's material composition are adjusted to control the resolution of each of the dispensed droplets. Therefore, one important parameter to control or tune during a 3D printing process is the control of the dispensed droplet's surface tension relative to the surface that it is disposed on. In some embodiments, it is desirable to add one or more curing enhancement components (e.g., photoinitiators) to the droplet's formulation to control the kinetics of the curing process, prevent oxygen inhibition, and/or control the contact angle of the droplet on the surface that it is deposited on. One will note that the curing enhancement components will generally include materials that are able to adjust: 1) the amount of bulk curing that occurs in the material in the dispensed droplet during the initial exposure to a desired amount of electromagnetic radiation, 2) the amount of surface curing that occurs in the material in the dispensed droplet during the initial exposure to a desired amount of electromagnetic radiation, and 3) the amount of surface property modification (e.g., additives) to the surface cured region of the dispensed droplet. The amount of surface property modification to the surface cured region of the dispensed droplet generally includes the adjustment of the surface energy of the cured or partially cured polymer found at the surface of the dispensed and at least partially cured droplet.

It has been found that it is desirable to partially cure each dispensed droplet to "fix" its surface properties and dimensional size during the printing process. The ability to "fix" the droplet at a desirable size can be accomplished by adding a desired amount of at least one curing enhancement components to the droplet's material composition and delivering a sufficient amount of electromagnetic energy from the curing device 320 during the additive manufacturing process. In some embodiments, it is desirable to use a curing device 320 that is able to deliver between about 1 milli-joule per centimeter squared ($mJ/cm^2$) and 100 $mJ/cm^2$, such as about 10-20 $mJ/cm^2$, of ultraviolet (UV) light to the droplet during the additive layer formation process. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. The UV radiation may have a wavelength between about 170 nm and about 500 nm.

In some embodiments, the size of dispensed droplets "A", "B" may be from about 10 to about 200 microns, such as about 50 to about 70 microns. Depending on the surface energy (dynes) of the substrate or polymer layer that the droplet is dispensed over and upon, the uncured droplet may spread on and across the surface to a size 343A of between about 10 and about 500 microns, such as between about 50 and about 200 microns. In one example, the height of such a droplet may be from about 5 to about 100 microns, depending on such factors as surface energy, wetting, and/or resin precursor composition which may include other additives, such as flow agents, thickening agents, and surfactants. One source for the additives is BYK-Gardner GmbH of Geretsried, Germany.

In some embodiments, it is generally desirable to select a photoinitiator, an amount of the photoinitiator in the droplet composition, and the amount of energy supplied by curing device 320 to allow the dispensed droplet to be "fixed" in less than about 1 second, such as less than about 0.5 seconds after the dispensed droplet has come in contact with the surface on which it is to be fixed. The actual time it takes to partially cure the dispensed droplet, due to the exposure to delivered curing energy, may be longer or shorter than the time that the droplet resides on the surface before it is exposed to the delivered radiation, since the curing time of the dispensed droplet will depend on the amount of radiant energy and wavelength of the energy provide from the curing source 320. In one example, an exposure time used to partially cure a 120 micrometer (μm) dispensed droplet is about 0.4 microseconds (μs) for a radiant exposure level of about 10-15 $mJ/cm^2$ of UV radiation. In an effort to "fix" the droplet in this short timeframe one must position the dispense nozzle of the droplet ejecting printer 306 a short distance from the surface of the surface of the polishing pad, such as between 0.1 and 10 millimeters (mm), or even 0.5 and 1 mm, while the surface 346A of the advanced polishing pad are exposed to the radiation 321 delivered from the curing device 320. It has also been found that by controlling droplet composition, the amount of cure of the previously formed layer (e.g., surface energy of the previously formed layer), the amount of energy from the curing device 320 and the amount of the photoinitiator in the droplet composition, the contact angle α of the droplet can be controlled to control the fixed droplet size, and thus the resolution of the printing process. In one example, the underlying layer cure may be a cure of about 70% acrylate conversion. A droplet that has been fixed, or at least partially cured, is also referred to herein as a cured droplet. In some embodiments, the fixed droplet size 343A is between about 10 and about 200 microns. In some embodiments, the contact angle, also referred to herein as the dynamic contact angle (e.g., non-equilibrium contact angle), for a "fixed" droplet can be desirably controlled to a value of at least 50°, such as greater than 55°, or even greater than 60°, or even greater than 70°.

The resolution of the pixels within a pixel chart that is used to form a layer, or a portion of a layer, by an additive manufacturing process can be defined by the average "fixed" size of a dispensed droplet. The material composition of a layer, or portion of a layer, can thus be defined by a "dispensed droplet composition", which a percentage of the total number of pixels within the layer, or portion of the layer, that include droplets of a certain droplet composition. In one example, if a region of a layer of a formed advanced polishing pad is defined as having a dispensed droplet composition of a first dispensed droplet composition of 60%, then 60% percent of the pixels within the region will include a fixed droplet that includes the first material composition. In cases where a portion of a layer contains more than one material composition, it may also be desirable to define the material composition of a region within an advanced polishing pad as having a "material composition ratio." The material composition ratio is a ratio of the number of pixels that have a first material composition disposed thereon to the number of pixels that have a second material composition disposed thereon. In one example, if a region was defined as containing 1,000 pixels, which are disposed across an area of a surface, and 600 of the pixels contain a fixed droplet of a first droplet composition and 400 of the pixels contain a fixed droplet of a second droplet composition then the material composition ratio would include a 3:2 ratio of the first droplet composition to the second droplet composition. In configurations where each pixel may contain greater than one fixed droplet (e.g., 1.2 droplets per pixel) then the material composition ratio would be defined by the ratio of the number of fixed droplets of a first material to the number of fixed droplets of a second material that are found within a defined region. In one example, if a region was defined as containing 1,000 pixels, and there were 800 fixed droplet of a first droplet composition and 400 fixed droplets of a second droplet composition within the region, then the material composition ratio would be 2:1 for this region of the advanced polishing pad.

The amount of curing of the surface of the dispensed droplet that forms the next underlying layer is an important polishing pad formation process parameter, since the amount of curing in this "initial dose" affects the surface energy that the subsequent layer of dispensed droplets will be exposed to during the additive manufacturing process. The amount of the initial cure dose is also important since it will also affect the amount of curing that each deposited layer will finally achieve in the formed polishing pad, due to repetitive exposure of each deposited layer to additional transmitted curing radiation supplied through the subsequently deposited layers as they are grown thereon. It is generally desirable to prevent over curing of a formed layer, since it will affect the material properties of the over cured materials and/or the wettability of the surface of the cured layer to subsequently deposited dispensed droplets in subsequent steps. In one example, to effect polymerization of a 10-30 micron thick layer of dispensed droplets may be performed by dispensing each droplet on a surface and then exposing the dispensed droplet to UV radiation at a radiant exposure level of between about 10 and about 15 $mJ/cm^2$ after a period of time of between about 0.1 seconds and about 1 second has elapsed. However, in some embodiments, the radiation level delivered during the initial cure dose may be varied layer by layer. For example, due to differing dispensed droplet compositions in different layers, the amount of UV radiation exposure in each initial dose may be adjusted to provide a desirable level of cure in the currently exposed layer, and also to one or more of the underlying layers.

In some embodiments, it is desirable to control the droplet composition and the amount of energy delivered from the curing device 320 during the initial curing step, which is a step in which the deposited layer of dispensed droplets are directly exposed to the energy provided by the curing device 320, to cause the layer to only partially cure a desired amount. In general, it is desirable for the initial curing process to predominantly surface cure the dispensed droplet versus bulk cure the dispensed droplet, since controlling the surface energy of the formed layer is important for controlling the dispensed droplet size. In one example, the amount that a dispensed droplet is partially cured can be defined by the amount of chemical conversion of the materials in the dispensed droplet. In one example, the conversion of the acrylates found in a dispensed droplet that is used to form a urethane polyacrylate containing layer, is defined by a percentage x, which is calculated by the equation:

$$x = 1 - \frac{(A_{C=C}/A_{C=O})_x}{(A_{C=C}/A_{C=O})_0},$$

where $A_{C=C}$ and $A_{C=O}$ are the values of the C=C peak at 910 cm$^{-1}$ and the C=O peaks at 1700 cm$^{-1}$ found using FT-IR spectroscopy. During polymerization, C=C bonds within acrylates are converted to C—C bond, while C=O within acrylates has no conversion. The intensity of C=C to C=O hence indicates the acrylate conversion rate. The $A_{C=C}/A_{C=O}$ ratio refers to the relative ratio of C=C to C=O bonds within the cured droplet, and thus the $(A_{C=C}/A_{C=O})_0$ denotes the initial ratio of $A_{C=C}$ to $A_{C=O}$ in the droplet, while $(A_{C=C}/A_{C=O})_x$ denotes the ratio of $A_{C=C}$ to $A_{C=O}$ on the surface of the substrate after the droplet has been cured. In some embodiments, the amount that a layer is initially cured may be equal to or greater than about 70% of the dispensed droplet. In some configurations, it may be desirable to partially cure the material in the dispensed droplet during the initial exposure of the dispensed droplet to the curing energy to a level from about 70% to about 80%, so that the target contact angle of the dispensed droplet may be attained. It is believed that the uncured or partially acrylate materials on top surface are copolymerized with the subsequent droplets, and thus yield cohesion between the layers.

The process of partially curing a dispensed droplet during the initial layer formation step can also be important to assure that there will be some chemical bonding/adhesion between subsequently deposited layers, due to the presence of residual unbonded groups, such as residual acrylic groups. Since the residual unbonded groups have not been polymerized, they can be involved in forming chemical bonds with a subsequently deposited layer. The formation of chemical bonds between layers can thus increase the mechanical strength of the formed advanced polishing pad in the direction of the layer by layer growth during the pad formation process (e.g., Z-direction in FIG. 3B). As noted above, the bonding between layers may thus be formed by both physical and/or chemical forces.

The mixture of the dispensed droplet, or positioning of the dispensed droplets, can be adjusted on a layer by layer basis to form layers that individually have tunable properties, and a polishing pad that has desirable pad properties that are a composite of the formed layers. In one example, as shown in FIG. 3B, a mixture of dispensed droplets includes a 50:50 ratio of the dispensed droplets 343 and 347 (or a material composition ratio of 1:1), wherein the dispensed droplet 343 includes at least one different material from the material found in the dispensed droplet 347. Properties of portions of the polishing body 202, such as the first polishing elements 204 and/or second polishing elements 206 may be adjusted or tuned according to the ratio and/or distribution of a first composition and a second composition that are formed from the positioning of the dispensed droplets during the deposition process. For example, the weight % of the first composition may be from about 1% by weight based on total composition weight to about 100% based on total composition weight. In a similar fashion, the second composition may be from about 1% by weight based on total composition weight to about 100% based on total composition weight. Depending on the material properties that are required, such as hardness and/or storage modulus, compositions of two or more materials can be mixed in different ratios to achieve a desired effect. In one embodiment, the composition of the first polishing elements 204 and/or second polishing elements 206 is controlled by selecting at least one composition or a mixture of compositions, and size, location, and/or density of the droplets dispensed by one or more printers. Therefore, the controller 305 is generally adapted to position the nozzles 309-310, 311-312 to form a layer that has interdigitated droplets that have been positioned in a desired density and pattern on the surface of the polishing pad that is being formed. In some configurations, dispensed droplets may be deposited in such a way as to ensure that each drop is placed in a location where it does not blend with other drops, and thus each remains a discrete material "island" prior to being cured. In some configurations, the dispensed droplets may also be placed on top of prior dispensed droplets within the same layer to increase the build rate or blend material properties. Placement of droplets relative to each other on a surface may also be adjusted to allow partial mixing behavior of each of the dispensed droplets in the layer. In some cases, it may be desirable to place the droplets closer together or farther apart to provide more or less mixing of the components in the neighboring droplets, respectively. It has been found that controlling droplet placement relative to other dispensed droplets and the composition of each droplet can have an effect on the mechanical and polishing properties of the formed advanced polishing pad.

Even though only two compositions are generally discussed herein for forming the first polishing elements 204 and/or second polishing elements 206, embodiments of the present disclosure encompass forming features on a polishing pad with a plurality of materials that are interconnected via compositional gradients. In some configurations, the composition of the first polishing elements 204 and/or second polishing elements 206 in a polishing pad are adjusted within a plane parallel to the polishing surface and/or through the thickness of the polishing pad, as discussed further below.

The ability to form compositional gradients and the ability to tune the chemical content locally, within, and across an advanced polishing pad are enabled by "ink jettable" low viscosity compositions, or low viscosity "inks" in the 3D printing arts that are used to form the droplets "A" and/or "B" illustrated in FIG. 3B. The low viscosity inks are "pre-polymer" compositions and are the "precursors" to the formed first polishing elements 204 and second polishing elements 206 found in the pad body 202. The low viscosity inks enable the delivery of a wide variety of chemistries and discrete compositions that are not available by conventional techniques (e.g., molding and casting), and thus enable controlled compositional transitions or gradients to be formed within different regions of the pad body 202. This is achieved by the addition and mixing of viscosity thinning reactive diluents to high viscosity functional oligomers to achieve the appropriate viscosity formulation, followed by copolymerization of the diluent(s) with the higher viscosity functional oligomers when exposed to a curing energy delivered by the curing device 320. The reactive diluents may also serve as a solvent, thus eliminating the use of inert non-reactive solvents or thinners that must be removed at each step.

Referring to the precursor delivery section 353 and precursor formulation section 354 of FIG. 3A, in one embodiment, a first precursor 356 is mixed with a second precursor 357 and a diluent 358 to form a first printable ink composition 359, which is delivered to reservoir 304B of the printer 306B, and used to form portions of the polishing body 202. Similarly, a third precursor 366 can be mixed with a fourth precursor 367 and a diluent 368 to form a second new printable ink composition 369, which is delivered to reservoir 304A of the printer 306A, and used to form another portion of the polishing body 202. In some embodiments, the first precursor 356 and the third precursor 366 each comprise an oligomer, such as multifunctional oligomer, the second precursor 357 and the fourth precursor 367 each comprise a multifunctional monomer, and diluent 358 and the diluent 368 each comprise a reactive diluent (e.g., monomer) and/or initiator (e.g., photoinitiator). One example of a first printable composition 359 may include a first precursor 356 which includes a reactive difunctional oligomer, comprising aliphatic chain segments, which may have a viscosity from about 1000 centipoise (cP) at 25° C. to about 12,000 cP at 25° C., is then mixed with and thus diluted by a 10 cP at 25° C. reactive diluent (e.g., diluent 358), such as monoacrylate, to create a new composition that has new viscosity. The printable composition thus obtained may exhibit a viscosity from about 80 cP to about 110 cP at 25° C., and a viscosity from about 15 cP to about 30 cP at 70° C., which may be effectively dispensed from a 3D printer ink jet nozzle.

FIGS. 4A-4F provide examples of an advanced polishing pads that include a compositional gradient across one or more regions of the polishing body. In FIGS. 4A-4D, the white pixel marks are intended to schematically illustrate where a dispensed droplet of a first material is dispensed while the black pixel marks illustrate where no material is dispensed within one or more layers used to form the polishing pad. By use of these techniques, compositional gradients in the cured material, or material formed by a plurality of cured droplets, can be formed in the printed layers used to form at least part of a complete polishing pad. The tailored composition of the printed layers within a polishing pad can be used to adjust and tailor the overall mechanical properties of the polishing pad. The composition of polishing features may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the polishing features in any designs of the polishing pad, such as the polishing pads in FIGS. 2A-2K, may be varied in similar manner as the polishing pads in FIGS. 4A-4F.

Figure 4B:
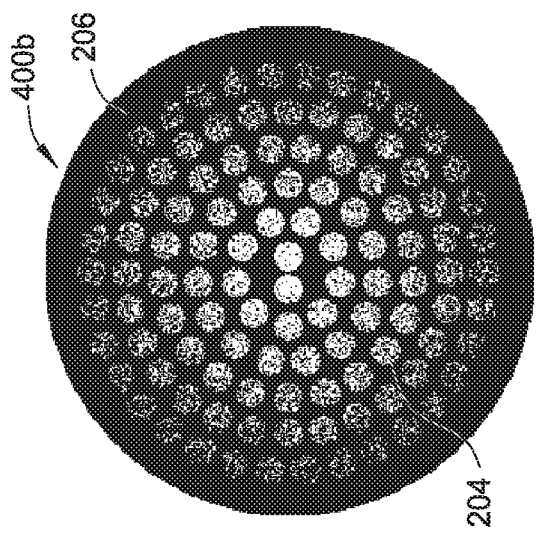
FIGS. 4A-4D are top views of pixel charts used to form an advanced polishing pad, according to at least one embodiment of the present disclosure.
Figure 4D:
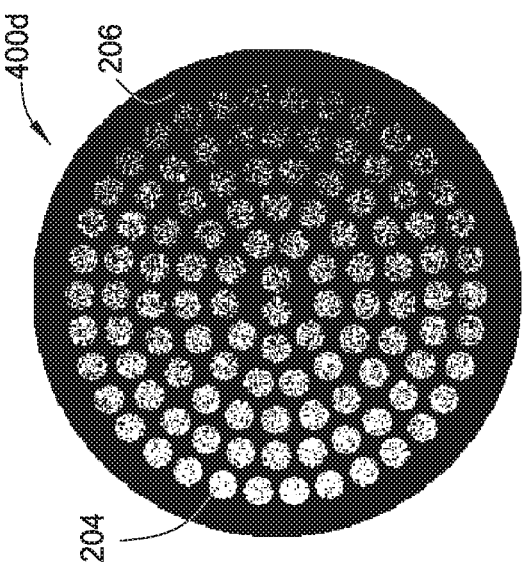
Figure 4A:
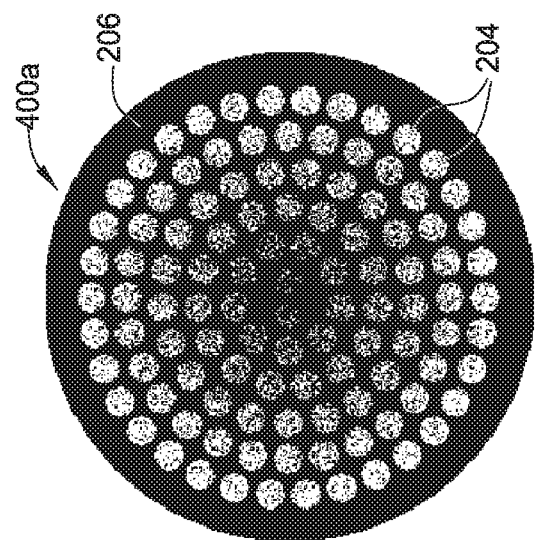

FIGS. 4A and 4B are black and white bitmap images reflecting pixel charts of a printed layer within an advanced polishing pad that includes portions of first polishing elements 204 and second polishing element(s) 206. In FIGS. 4A and 4B, the white pixel marks are where a droplet of a first material is dispensed while the black pixel marks are where no material is dispensed and cured. FIG. 4A is the pixel chart 400a of a first portion of a layer within an advanced polishing pad 200 and FIG. 4B is the pixel chart 400b of a second portion of the same advanced polishing pad. The first portion may be dispensed by a first print head according to the pixel chart 400a and the second portion may be dispensed by a second print head according to the pixel chart 400b. The two print heads superimpose the pixel charts 400a, 400b together to form one or more layers that contain discrete polishing features. The polishing features near an edge region of the polishing pad include more of the first material than the second material. The polishing features near a center region of the polishing pad include more of the second material than the first material. In this example, each polishing feature has a unique combination of the first material and the second material. In one example, the first polishing elements 204 include a first combination of the first material and the second material and the second polishing elements 206 include a different second combination of the first material and the second material. Therefore, by use of pixel charts, the polishing body can be sequentially formed so that a desired gradient in material composition is achieved in different parts of the polishing body to achieve a desired polishing performance of the advanced polishing pad.

Figure 4C:
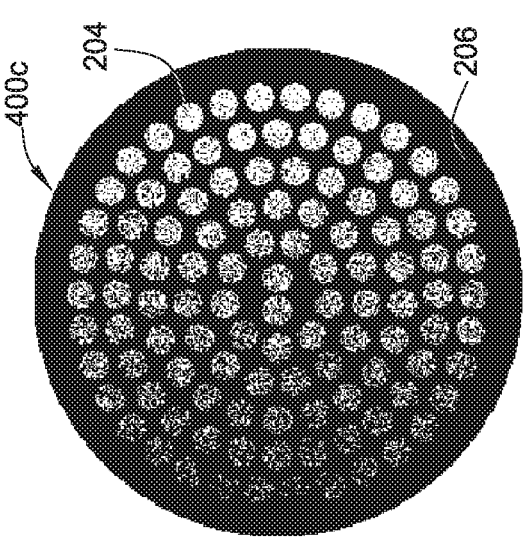

FIGS. 4C and 4D are schematic pixel charts 400c, 400d of a polishing pad having features. In some embodiments, FIG. 4C is the pixel chart 400c of a first portion of a polishing pad and FIG. 4D is the pixel chart 400d of a second portion of the same polishing pad. The polishing pad according to FIGS. 4C, 4D is similar to the polishing pad of FIGS. 4A, 4B except the gradient in the material composition of the polishing body varies from left to right across the polishing pad.

Figure 4E:
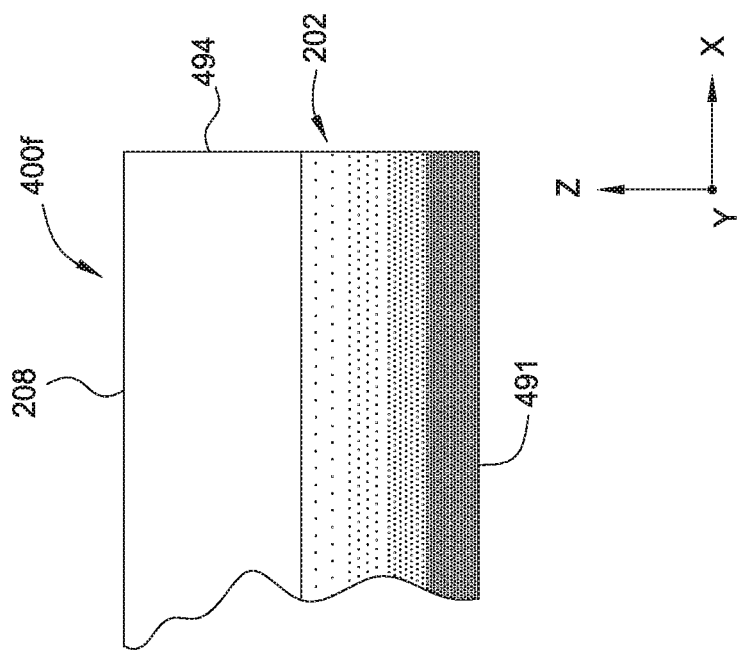
FIG. 4E is a schematic top view of a web or roll-to-roll type polishing pad, according to an embodiment of the present disclosure.

FIG. 4E is a schematic view of a web based polishing pad 400e that is formed using an additive manufacturing process to form a polishing surface 208 that has a gradient in material composition across the polishing surface 208 (e.g., Y-direction). As shown in FIG. 4E the polishing material may be disposed over a platen 102 between a first roll 481 and a second roll 482. By building a web, or even standard polishing pad, with differing regions of high and low storage modulus the substrate can be moved over different locations on the polishing pad 400e during different portion of the polishing process, so as to provide the desired mechanical properties during each phase of the polishing process. One example may involve a substrate having an initial surface texture removed rapidly using a planarizing portion of the polishing pad 400e that has a high elastic modulus and then moving the substrate to a second portion of the polishing pad 400e that has a lower elastic modulus to buff the substrate surface and reduce scratch defects.

Figure 4F:
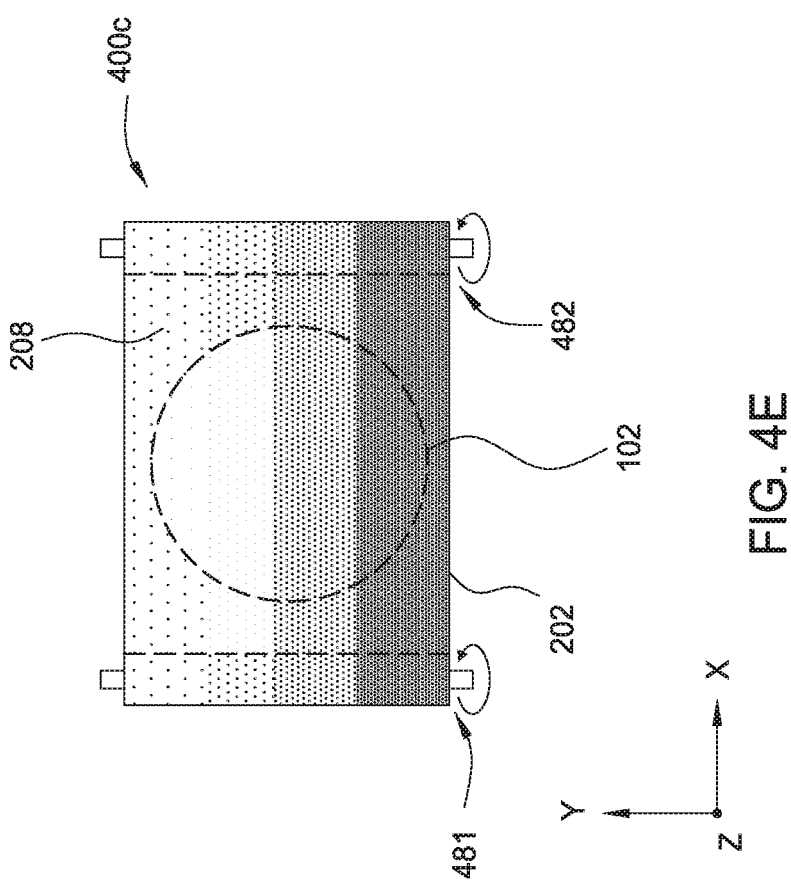
FIG. 4F is a schematic side cross-sectional view of a portion of a polishing pad, according to an embodiment of the present disclosure.

FIG. 4F is schematic side cross-sectional view of an advanced polishing pad 400f that is formed using an additive manufacturing process to form a polishing base layer 491 that has a gradient in material composition in the Z-direction. Gradients in the material composition and/or material properties of the stacked printed layers of the polishing base layer 491 can vary from a high concentration to a low concentration of a first material to a second material in one direction, or vice versa. In some cases, one or more regions within the polishing pad may include more complex concentration gradients, such as a high/low/high or low/high/low concentration gradient of at least two materials that have differing material properties. In one example, at least two materials that form the concentration gradient have different storage modulus E', E'30/E'90 ratio, tan delta or other similar parameter. In some configurations, the advanced polishing pad 400f may include a polishing element region 494 that may include discrete regions that include at least a first polishing element 204 and a second polishing element 206. In one example, the polishing element region 494 may include a portion of a polishing body 202 that contains one or more of the structures shown in FIGS. 2A-2K.

In one embodiment, the base layer 491 includes a homogeneous mixture of two or more different materials in each layer formed within the base layer 491. In one example, the homogeneous mixture may include a mixture of the materials used to form the first polishing element 204 and the second polishing element 206 in each layer formed within the base layer 491. In some configurations, it is desirable to vary the composition of the homogeneous mixture of materials layer by layer to form a gradient in material composition in the layer growth direction (e.g., Z-direction in FIG. 3B). The phrase homogeneous mixture is intended to generally describe a material that has been formed by dispensing and curing printed droplets that have at least two different compositions within each layer, and thus may contain a mixture of small regions of the at least two different compositions that are each sized at a desired resolution. The interface between the polishing base layer 491 and the polishing element region 494 may include a homogeneous blend of the materials found at the upper surface of the polishing base layer 491 and the lower surface of the polishing element region 494, or include a discrete transition where the differing material composition in the first deposited layer of the polishing element region 494 is directly deposited on the surface of the polishing base layer 491.

In some embodiments of the polishing element region 494, or more generally any of the polishing bodies 202 described above, it is desirable to form a gradient in the material composition in the first polishing elements 204 and/or second polishing elements 206 in a direction normal to the polishing surface of the polishing pad. In one example, it is desirable to have higher concentrations of a material composition used to form the soft or low storage modulus E' features in the printed layers near the base of the polishing pad (e.g., opposite to the polishing surface), and higher concentrations of a material composition used to form the hard or high storage modulus E' features in the printed layers near the polishing surface of the polishing pad. In another example, it is desirable to have higher concentrations of a material composition used to form the hard or high storage modulus E' features in the printed layers near the base of the polishing pad, and a higher concentration of a material composition used to form the soft or low storage modulus E' features in the printed layers near the polishing surface of the polishing pad. Surface features use low storage modulus E' can be used for defect removal and scratch reduction, and high storage modulus E' features can be used to enhance die and array scale planarization.

In one embodiment, it is desirable to form a gradient in the material composition within the material used to form the first and/or second polishing elements in a direction normal to the polishing surface of the polishing pad. In one example, it is desirable to have higher concentrations of a material composition used to form the second polishing elements 206 in the printed layers near the base of the polishing pad (e.g., opposite to the polishing surface), and higher concentrations of a material composition used to form the first polishing elements 204 in the printed layers near the polishing surface of the polishing pad. In another example, it is desirable to have higher concentrations of a material composition used to form the first polishing elements 204 in the printed layers near the base of the polishing pad, and a higher concentration of a material composition used to form the second polishing elements 206 in the printed layers near the polishing surface of the polishing pad. For example, a first layer may have a material composition ratio of the first printed composition to the second printed composition of 1:1, a material composition ratio of the first printed composition to the second printed composition of 2:1 in a second layer and a material composition ratio of the first printed composition to the second printed composition of 3:1 in a third layer. In one example, the first printed composition has a higher storage modulus E' containing material than the second printed composition, and the direction of sequential growth of the first, second and third layers is away from a supporting surface of the advanced polishing pad. A gradient can also be formed within different parts of a single layer by adjusting the placement of the printed droplets within the plane of the deposited layer.

Advance Polishing Pad Formation Process Example

In some embodiments, the construction of an advanced polishing pad 200 begins by creating a CAD model of the polishing pad design. This can be done through the use of existing CAD design software, such as Unigraphics or other similar software. An output file, which is generated by the modelling software, is then loaded to an analysis program to ensure that the advanced polishing pad design meets the design requirements (e.g., water tight, mass density). The output file is then rendered, and the 3D model is then "sliced" into a series of 2D data bitmaps, or pixel charts. As noted above, the 2D bitmaps, or pixel charts, are used to define the locations across an X and Y plane where the layers in the advanced polishing pad will be built. In some additive manufacturing process applications these locations will define where a laser will pulse, and in other applications the location where a nozzle will eject a droplet of a material.

The coordinates found in the pixel charts are used to define the location at which a specific droplet of uncured polymer will be placed using, for example, a poly jet print head. Every coordinate for an X and Y location and a given pad supporting Z stage position will be defined based on the pixel charts. Each X, Y and Z location will include either a droplet dispense or droplet non-dispense condition. Print heads may be assembled in an array in the X and/or Y directions to increase build rate or to deposit additional types of materials. In the examples shown in FIGS. 4A-4D, the black pixels indicate locations where nozzles will not deposit materials and the white pixels indicate where nozzles will deposit materials. By combining the material maps, or pixel charts, in each formed layer a polishing pad of any desirable shape or structural configuration can be printed by the positioning of the discrete droplets near one another.

An additive manufacturing device, such as a 3D printer can be used to form an advanced polishing pad by depositing thermoplastic polymers, depositing and curing of a photo-sensitive resin precursor compositions, and/or laser pulse type sintering and fusing of a dispensed powder layer. In some embodiments, the advanced polishing pad formation process may include a method of polyjet printing of UV sensitive materials. In this configuration, droplets of a precursor formulation (e.g., first printable ink composition 359) are ejected from a nozzle in the droplet ejecting printer 306 and resin precursor composition is deposited onto the build stage. As material is deposited from an array of nozzles, the material may be leveled with the use of a roller or other means to smooth drops into a flat film layer or transfer away excess material. While the droplet is being dispensed, and/or shortly thereafter, a UV lamp or LED radiation source passes over the deposited layer to cure or partially cure the dispensed droplets into a solid polymer network. This process is built layer on top of layer with adequate cohesion within the layer and between layers to ensure the final embodiment of the pad model is mechanically sound.

In order to better control the polymer stress through the build process, heat may be added during the formation of one or more of the layers. The delivery of heat allows the polymer network formed in each cured or partially cured layer to relax and thereby reduce stress and remove stress history in the film. Stress in the film can result in unwanted deformation of the polishing pad during or after the polishing pad formation process. Heating the partially formed polishing pad while it is on the printer's build tray ensures that the final pad properties are set through the layer by layer process and a predictable pad composition and polishing result can be achieved. In addition to inducing heat into the polishing pad formation process, the area surrounding the growing polishing pad may be modified to reduce the oxygen exposure to the uncured resin. This can be done by employing vacuum or by flooding the build chamber with nitrogen ($N_2$) or other inert gas. The reduction in oxygen over the growing pad will reduce the inhibition of the free radical polymerization reaction, and ensures a more complete surface cure of the dispensed droplets.

Formulation and Material Examples

As discussed above, the materials used to form portions of the pad body 202, such as the first polishing element 204 and second polishing element 206 may each be formed from at least one ink jettable pre-polymer composition that may be a mixture of functional polymers, functional oligomers, reactive diluents, and curing agents to achieve the desired properties of an advanced polishing pad. In general, the pre-polymer inks or compositions may be processed after being deposited by use of any number of means including exposure or contact with radiation or thermal energy, with or without a curing agent or chemical initiator. In general, the deposited material can be exposed to electromagnetic radiation, which may include ultraviolet radiation (UV), gamma radiation, X-ray radiation, visible radiation, IR radiation, and microwave radiation and also accelerated electrons and ion beams may be used to initiate polymerization reactions. For the purposes of this disclosure, we do not restrict the method of cure, or the use of additives to aid the polymerization, such as sensitizers, initiators, and/or curing agents, such as through cure agents or oxygen inhibitors.

In one embodiment, two or more polishing elements, such as the first and second polishing elements 204 and 206, within a unitary pad body 202, may be formed from the sequential deposition and post deposition processing of at least one radiation curable resin precursor composition, wherein the compositions contain functional polymers, functional oligomers, monomers, and/or reactive diluents that have unsaturated chemical moieties or groups, including but not restricted to: vinyl groups, acrylic groups, methacrylic groups, allyl groups, and acetylene groups. During the polishing pad formation process, the unsaturated groups may undergo free radical polymerization when exposed to radiation, such as UV radiation, in the presence of a curing agent, such as a free radical generating photoinitiator, such as an Irgacure® product manufactured by BASF of Ludwigshafen, Germany.

Two types of free radical photoinitiators may be used in one or more of the embodiments of the disclosure provided herein. The first type of photoinitiator, which is also referred to herein as a bulk cure photoinitiator, is an initiator which cleaves upon exposure to UV radiation, yielding a free radical immediately, which may initiate a polymerization. The first type of photoinitiator can be useful for both surface and through or bulk cure of the dispensed droplets. The first type of photoinitiator may be selected from the group including, but not restricted to: benzoin ethers, benzyl ketals, acetyl phenones, alkyl phenones, and phosphine oxides. The second type of photoinitiator, which is also referred to herein as a surface cure photoinitiator, is a photoinitiator that is activated by UV radiation and forms free radicals by hydrogen abstraction from a second compound, which becomes the actual initiating free radical. This second compound is often called a co-initiator or polymerization synergist, and may be an amine synergist. Amine synergists are used to diminish oxygen inhibition, and therefore, the second type of photoinitiator may be useful for fast surface cure. The second type of photoinitiator may be selected from the group including but not restricted to benzophenone compounds and thioxanthone compounds. An amine synergist may be an amine with an active hydrogen, and in one embodiment an amine synergist, such as an amine containing acrylate may be combined with a benzophenone photoinitiator in a resin precursor composition formulation to: a) limit oxygen inhibition, b) fast cure a droplet or layer surface so as to fix the dimensions of the droplet or layer surface, and c), increase layer stability through the curing process. In some cases, to retard or prevent free radical quenching by diatomic oxygen, which slows or inhibits the free radical curing mechanism, one may choose a curing atmosphere or environment that is oxygen limited or free of oxygen, such as an inert gas atmosphere, and chemical reagents that are dry, degassed and mostly free of oxygen.

It has been found that controlling the amount of the chemical initiator in the printed formulation is an important factor in controlling the properties of a formed advanced polishing pad, since the repeated exposure of underlying layers to the curing energy as the advanced polishing pad is formed will affect the properties of these underlying layers. In other words, the repeated exposure of the deposited layers to some amount of the curing energy (e.g., UV light, heat, etc.) will affect the degree of cure, or over curing the surface of that layer, within each of the formed layers. Therefore, in some embodiments, it is desirable to ensure that the surface cure kinetics are not faster than through-cure (bulk-cure), as the surface will cure first and block additional UV light from reaching the material below the surface cured region; thus causing the overall partially cured structure to be "undercured." In some embodiments, it is desirable to reduce the amount of photoinitiator to ensure proper chain extension and cross linking. In general higher molecular weight polymers will form with a slower controlled polymerization. It is believed that if the reaction products contain too many radicals, reaction kinetics may proceed too quickly and molecular weights will be low which will in turn reduce mechanical properties of the cured material.

In some embodiments, the first and second polishing elements 204 and 206 may contain at least one oligomeric and/or polymeric segments, compounds, or materials selected from: polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), halogenated polymers, block copolymers and copolymers thereof. Production and synthesis of the compositions used to form the first polishing element 204 and second polishing element 206 may be achieved using at least one UV radiation curable functional and reactive oligomer with at least one of the aforementioned polymeric and/or molecular segments, such as that shown in chemical structure A:

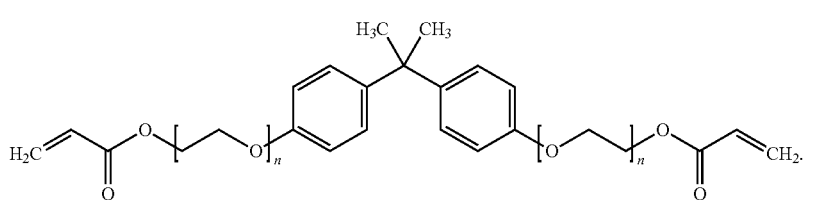

A

The difunctional oligomer as represented in chemical structure A, bisphenol-A ethoxylate diacrylate, contains segments that may contribute to the low, medium, and high storage modulus E' character of materials found in the first polishing element 204 and second polishing element 206 in the pad body 202. For example, the aromatic groups may impart added stiffness to pad body 202 because of some local rigidity imparted by the phenyl rings. However, those skilled in the art will recognize that by increasing the ether chain segment "n" will lower the storage modulus E' and thus produce a softer material with increased flexibility. In one embodiment, a rubber-like reactive oligomer, polybutadiene diacrylate, may be used to create a softer and more elastic composition with some rubber-like elastic elongation as shown in chemical structure B:

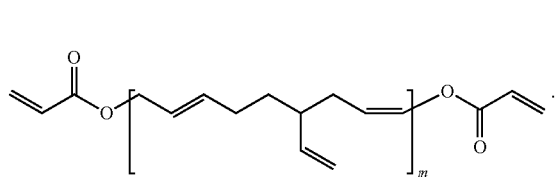

B

Polybutadiene diacrylate includes pendant allylic functionality (shown), which may undergo a crosslinking reaction with other unreacted sites of unsaturation. In some embodiments, the residual double bonds in the polybutadiene segment "m" are reacted to create crosslinks which may lead to reversible elastomeric properties. In one embodiment, an advanced polishing pad containing compositional crosslinks may have a percent elongation from about 5% to about 40%, and a E'30:E'90 ratio of about 6 to about 15. Examples of some crosslinking chemistries include sulfur vulcanization and peroxide, such as tert-butyl perbenzoate, dicumyl peroxide, benzoyl peroxide, di-tert-butyl peroxide and the like. In one embodiment, 3% benzoyl peroxide, by total formulation weight, is reacted with polybutadiene diacrylate to form crosslinks such that the crosslink density is at least about 2%.

Chemical structure C represents another type of reactive oligomer, a polyurethane acrylate, a material that may impart flexibility and elongation to the advanced polishing pad. An acrylate that contains urethane groups may be an aliphatic or an aromatic polyurethane acrylate, and the R or R' groups shown in the structure may be aliphatic, aromatic, oligomeric, and may contain heteroatoms such as oxygen.

Reactive oligomers may contain at least one reactive site, such as an acrylic site, and may be monofunctional, difunctional, trifunctional, tetrafunctional, pentafunctional and/or hexafunctional and therefore serve as foci for crosslinking. FIG. 5B is a plot of stress vs. strain for some cured reactive oligomers that may be useful for creating 3D printable ink compositions. The oligomers may represent "soft" or a low storage modulus E' materials, "medium soft" or medium storage modulus E' materials, or "hard" or high storage modulus E' materials (e.g., Table 1). As shown, the storage modulus E' (e.g., slope, or Δy/Δx) increases from a soft and flexible and stretchable polyurethane acrylate to an acrylic acrylate, then to a polyester acrylate, and then to the hardest in the series, a hard and high storage modulus E" epoxy acrylate. FIG. 5B illustrates how one may choose a storage modulus E' material, or a range or mixture of storage modulus E' materials, that may be useful for production of an advanced polishing pad. Functional oligomers may be obtained from a variety of sources including Sartomer USA of Exton, Pa., Dymax Corporation of Torrington, Conn., USA, and Allnex Corporation of Alpharetta, Ga., USA.

In embodiments of the disclosure, multifunctional acrylates, including di, tri, tetra, and higher functionality acrylates, may be used to create crosslinks within the material used to form, and/or between the materials found in, the first polishing element 204 and second polishing element 206, and thus adjust polishing pad properties including storage modulus E', viscous dampening, rebound, compression, elasticity, elongation, and the glass transition temperature. It has been found that by controlling the degree of crosslinking within the various materials used to form the first polishing element 204 and second polishing element 206 desirable pad properties can be formed. In some configurations, multifunctional acrylates may be advantageously used in lieu of rigid aromatics in a polishing pad formulation, because the low viscosity family of materials provides a greater variety of molecular architectures, such as linear, branched, and/or cyclic, as well as a broader range of molecular weights, which in turn widens the formulation and process window. Some examples of multifunctional acrylates are shown in chemical structures D (1,3,5-triacryloylhexahydro-1,3,5-triazine), and E (trimethylolpropane triacrylate):

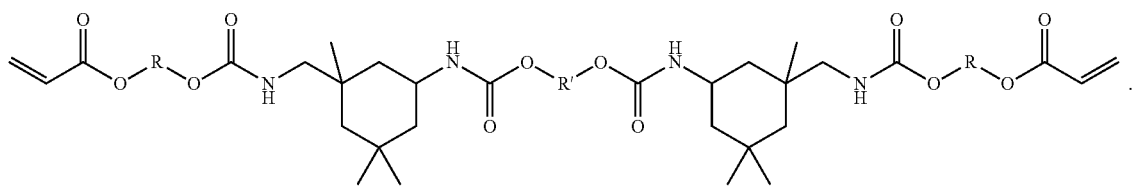

C

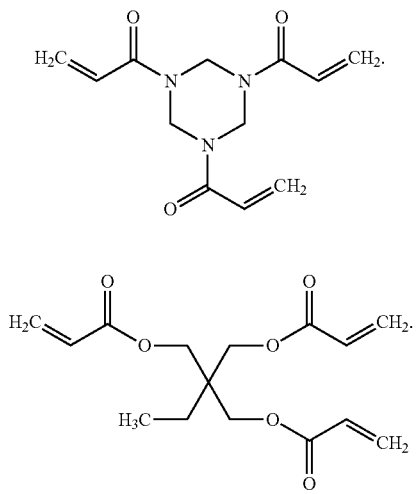

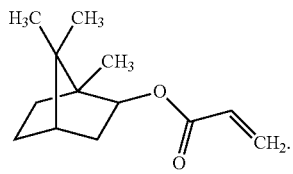

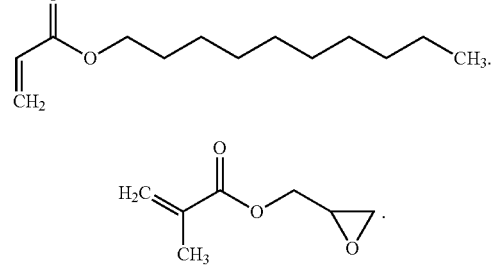

The type or crosslinking agent, chemical structure, or the mechanism(s) by which the crosslinks are formed are not restricted in the embodiments of this disclosure. For example, an amine containing oligomer may undergo a Michael addition type reaction with acrylic moiety to form a covalent crosslink, or an amine group may react with an epoxide group to create a covalent crosslink. In other embodiments, the crosslinks may be formed by ionic or hydrogen bonding. The crosslinking agent may contain linear, branched, or cyclic molecular segments, and may further contain oligomeric and/or polymeric segments, and may contain heteroatoms such as nitrogen and oxygen. Crosslinking chemical compounds that may be useful for polishing pad compositions are available from a variety of sources including: Sigma-Aldrich of St. Louis, Mo., USA, Sartomer USA of Exton, Pa., Dymax Corporation of Torrington, Conn., USA, and Allnex Corporation of Alpharetta, Ga., USA.

As mentioned herein, reactive diluents can be used as viscosity thinning solvents that are mixed with high viscosity functional oligomers to achieve the appropriate viscosity formulation, followed by copolymerization of the diluent(s) with the higher viscosity functional oligomers when exposed to a curing energy. In one embodiment, when n~4, the viscosity of bisphenol-A ethoxylate diacrylate may be about 1350 centipoise (cP) at 25° C., a viscosity which may be too high to effect dispense of a such a material in a 3D printing process. Therefore, it may be desirable to mix bisphenol-A ethoxylate diacrylate with a lower viscosity reactive diluents, such as low molecular weight acrylates, to lower the viscosity to about 1 cP to about 100 cP at 25° C., such as about 1 cP to about 20 cP at 25° C. The amount of reactive diluent used depends on the viscosity of the formulation components and the diluent(s) themselves. For example, a reactive oligomer of 1000 cP may require at least 40% dilution by weight of formulation to achieve a target viscosity. Examples of reactive diluents are shown in chemical structures F (isobornyl acrylate), G (decyl acrylate), and H (glycidyl methacrylate):

The respective viscosities of F-G at 25° C. are 9.5 cP, 2.5 cP, and 2.7 cP, respectively. Reactive diluents may also be multifunctional, and therefore may undergo crosslinking reactions or other chemical reactions that create polymer networks. In one embodiment, glycidyl methacrylate (H), serves as a reactive diluent, and is mixed with a difunctional aliphatic urethane acrylates, so that the viscosity of the mixture is about 15 cP. The approximate dilution factor may be from about 2:1 to about 10:1, such as about 5:1. An amine acrylate may be added to this mixture, such as dimethylaminoethyl methacrylate, so that it is about 10% by weight of the formulation. Heating the mixture from about 25° C. to about 75° C. causes the reaction of the amine with the epoxide, and formation of the adduct of the acrylated amine and the acrylated epoxide. A suitable free radical photoinitiator, such as Irgacure® 651, may be then added at 2% by weight of formulation, and the mixture may be dispensed by a suitable 3D printer so that a 20 micron thick layer is formed on a substrate. The layer may then be cured by exposing the droplet or layer for between about 0.1 µs to about 10 seconds, such as about 0.5 seconds, to UV light from about 200 nm to about 400 nm using a scanning UV diode laser at an intensity of about 10 to about 50 mJ/cm$^2$ to create a thin polymer film. Reactive diluent chemical compounds that may be useful for 3D printed polishing pad compositions are available from a variety of sources including Sigma-Aldrich of St. Louis, Mo., USA, Sartomer USA of Exton, Pa., Dymax Corporation of Torrington, Conn., USA, and Allnex Corporation of Alpharetta, Ga., USA.

Another method of radiation cure that may be useful in the production of polishing pads is cationic cure, initiated by UV or low energy electron beam(s). Epoxy group containing materials may be cationically curable, wherein the ring opening polymerization of epoxy groups may be initiated by cations such as protons and Lewis acids. The epoxy materials may be monomers, oligomers or polymers, and may have aliphatic, aromatic, cycloaliphatic, arylaliphatic or heterocyclic structures; and they can also include epoxide groups as side groups or groups that form part of an alicyclic or heterocyclic ring system.

UV-initiated cationic photopolymerization exhibits several advantages compared to the free-radical photopolymerization including lower shrinkage, better clarity, better through cure via living polymerization, and the lack of oxygen inhibition. UV cationic polymerization may polymerize important classes of monomers which cannot be polymerized by free radical means, such as epoxides, vinyl ethers, propenyl ethers, siloxanes, oxetanes, cyclic acetals and formals, cyclic sulfides, lactones and lactams. These cationically polymerizable monomers include both unsaturated monomers, such as glycidyl methacrylate (chemical structure H) that may also undergo free-radical polymerization through the carbon-carbon double bonds as described herein. Photoinitiators that generate a photoacid when irradiated with UV light (~225 to 300 nm) or electron beams include, but are not limited to aryl onium salts, such as iodonium and sulfonium salts, such as triarylsulfonium hexafluorophosphate salts, which may be obtained from BASF of Ludwigshafen, Germany (Irgacure® product).

In one embodiment, the material(s) used to form the first polishing element 204 and the second polishing element 206, and thus the unitary pad body 202, may be formed from the sequential deposition and cationic cure of at least one radiation curable resin precursor composition, wherein the compositions contain functional polymers, functional oligomers, monomers, and/or reactive diluents that have epoxy groups. Mixed free radical and cationic cure systems may be used to save cost and balance physical properties. In one embodiment, the first polishing element 204 and the second polishing element 206, may be formed from the sequential deposition and cationic and free radical cure of at least one radiation curable resin precursor composition, wherein the compositions contain functional polymers, functional oligomers, monomers, reactive diluents that have acrylic groups and epoxy groups. In another embodiment, to take advantage of the clarity and lack of light absorption inherent in some cationically cured systems, an observation window or CMP end-point detection window, which is discussed further below, may be formed from a composition cured by the cationic method. In some embodiments, some of the layers in the formed advanced polishing pad may be formed by use of a cationic curing method and some of the layers may be formed from a free radical curing method.

In one embodiment, the 3D printed polymer layers may contain inorganic and/or organic particles that are used to enhance one or more pad properties of selected material layers found in the formed advanced polishing pad 200. Because the 3D printing process involves layer by layer sequential deposition of at least one composition per layer, it may also be desirable to additionally deposit inorganic or organic particles disposed upon or within a pad layer to obtain a certain pad property and/or to perform a certain function. The inorganic or organic particles may be in the 25 nanometer (nm) to 100 micrometer (μm) range in size and may be added to the precursor materials prior to being dispensed by the droplet ejecting printer 306 or added to an uncured printed layer in a ratio of between 1 and about 50 weight percent (wt %). The inorganic or organic particles may be added during the advanced polishing pad formation process to improve the ultimate tensile strength, improve yield strength, improve the stability of the storage modulus over a temperature range, improve heat transfer, adjust a surfaces zeta potential, and/or adjust a surface's surface energy. The particle type, chemical composition, or size, and the added particles may vary by application or desired effect that is to be achieved. In some embodiments, the particles may include intermetallics, ceramics, metals, polymers and/or metal oxides, such as ceria, alumina, silica, zirconia, nitrides, carbides, or a combination thereof. In one example, the inorganic or organic particles disposed upon, over or within a pad may include particles of high performance polymers, such PEEK, PEK, PPS, and other similar materials to improve the mechanical properties and/or thermal conductivity of the advanced polishing pad. The particles that are integrated in a 3D printed polishing pad may also serve as foci for crosslinking, which may lead to a higher storage modulus E' depending on a percent by weight loading. In another example, a polymer composition containing polar particles, such as ceria, may have a further affinity for polar materials and liquids at the pad surface, such as CMP slurries.

Advanced Polishing Pad Properties

An advantage of forming an advanced polishing pad 200 that has a pad body 202 that includes at least a first polishing element 204 and a second polishing element 206 is the ability to form a structure that has mechanical, structural and dynamic properties that are not found in a pad body that is formed from a single material composition. In some embodiments, it is desirable to form a polishing body 202 that includes at least one region in which the first polishing element 204 is disposed over and supported by a portion (e.g., portion 212A in FIG. 2A) of the second polishing element 206. In this configuration, the combination of the properties of the two materials and structural configuration can be used to form an advanced polishing pad that has desirable mechanical, structural and dynamic properties, and improved polishing performance over conventional polishing pad designs.

Materials and chemical structure of the materials in the first polishing element(s) 204 and/or the second polishing element(s) 206 may be selected to achieve a "tuned" bulk material by use of the aforementioned chemistries. An advanced polishing pad 200 formed with this "tuned" bulk material has various advantages, such as improved polishing results, reduced cost of manufacturing, and elongated pad life. In one embodiment, an advanced polishing pad 200, when measured as a whole, may have a hardness between about 25 shore A to about 75 shore D, a tensile strength of between 5 MPa and about 75 MPa, an elongation at break of between about 5% and about 350%, a shear strength of above about 10 MPa, and a storage modulus E' modulus between about 5 MPa and about 3000 MPa.

As discussed above, materials having different mechanical properties may be selected for use in the first polishing element 204 and/or second polishing element 206 to achieve an improved polishing result on a polished substrate. The mechanical properties, such as storage modulus E' of the material(s) found in the formed first polishing element 204 and/or second polishing element 206, may be created by selecting different materials, material compositions and/or choosing different post deposition processing steps (e.g., curing processes) used during the polishing element forming process. In one embodiment, the second polishing element 206 may have a lower hardness value and a lower value of storage modulus E', while the first polishing element 204 may have a higher hardness value and a higher value of storage modulus E'. In another embodiment, storage modulus E' may be adjusted within each polishing element 204, 206 and/or at various different locations across the polishing surface of the polishing pad. In one embodiment, the first polishing elements 204 may have a hardness of about 40 Shore D scale to about 90 Shore D scale. The second polishing element 206 may have a hardness value between about 26 Shore A scale to about 95 Shore A scale. The first polishing element 204 and second polishing element 206 may each include different chemical compositions that are co-mingled and chemically bonded together at multiple boundaries within the unitary pad body 202.

For the purposes of this disclosure, and without intending to limit the scope of the disclosure provided herein, materials having desirable low, medium, and/or high storage modulus E' properties at temperatures of 30° C. (E'30) and 90° C. (E'90) for the first polishing elements 204 and the second polishing elements 206 in an advanced polishing pad 200, are summarized in Table 2:

TABLE 2

|  | Low Storage Modulus Compositions | Medium Storage Modulus Compositions | High Storage Modulus Compositions |
|---|---|---|---|
| E'30 | 5 MPa-100 MPa | 100 MPa-500 MPa | 500 MPa-3000 MPa |
| E'90 | <17 MPa | <83 MPa | <500 MPa |

In one embodiment of an advanced polishing pad 200, a plurality of first polishing elements 204 are configured to protrude above one or more second polishing elements 206, so that during a polishing process the surface of a substrate 110 is polished using the polishing surface 208 of the first polishing elements 204. In one embodiment, to assure that a desirable planarity, polishing efficiency, and reduced dishing during a bulk material polishing step it is desirable to form the first polishing elements 204, which contact the surface of the substrate during the polishing process, with a material that has a high storage modulus E', such as defined in Table 2. However, in one embodiment, to assure that a desirable planarity, polishing efficiency, and reduced dishing during a buffing or residual material clearing step it may be desirable to form the first polishing elements 204, which contact the surface of the substrate during the polishing process, with a material that has a low or medium storage modulus E'.

In some embodiments, the storage modulus of the first polishing elements 204 is adjusted to minimize the effect of pad glazing, which cause the polishing process removal rates to reduce over time in the absence of a process of abrading the glazed surface of the used polishing pad (i.e., pad conditioning). It is believed that pad glazing is caused by the plastic deformation of the materials that contact the surface of the substrate, which is inversely proportional to the shear modulus (G') as shear forces on the pad surface cause the "cold flow" or plastic deformation of the contacting material. For an isotropic solid, the shear modulus is generally related to the storage modulus by the following equation: G'=E'/2(1+v), where v is Poison's ratio. Thus, the materials used to form the first polishing elements 204 that have a low shear modulus, and thus storage modulus, would have a faster rate of plastic deformation and thus formation of glazed areas. Therefore, it is also desirable to form the first polishing elements 204 with a material that has a high storage modulus E' and/or hardness, as defined above.

To assure that a glazed surface of a polishing pad can be rejuvenated by use of a pad conditioning process, it is also desirable for the material(s) used to form the first polishing elements 204 to have desirable tensile strength and percent elongation at fracture. In some embodiments, the ultimate tensile strength (UTS) of the material used to form the first polishing elements 204 is between about 250 psi and 9,000 psi. It is believed that the higher the UTS of the material used to form the first polishing elements 204 the more durable and less particulate formation prone the polishing pad material will be before, during or after performing the pad conditioning process. In one example, the UTS of the material used to form the first polishing elements 204 is between about 5,000 psi and about 9,000 psi. In some embodiments, the elongation at fracture of the material used to form the first polishing elements 204 is between about 5% and 200%. It is believed that the lower the elongation at fracture of the material used to form the first polishing elements 204 the less deformable the material will be, and thus the easier to maintain the surface micro-texture or asperities which allow for abrasive capture and slurry transport. In one embodiment, the elongation at fracture of the material used to form the first polishing elements 204 that is configured to touch the polished surface of a substrate is adjusted to be between about 5% and about 40%.

There is a need to also provide a polishing pad that has desirable dampening properties to reduce the elastic rebound of a pad during polishing, which can cause dishing and other negative attributes relating to the cyclic deformation of the pad during processing. Therefore, to compensate for the need for a high storage modulus E' material to contact the surface of the substrate during polishing, the second polishing element 206, which is positioned to support the first polishing element 204, is formed from a material that has lower storage modulus E'.

Figure 5A:
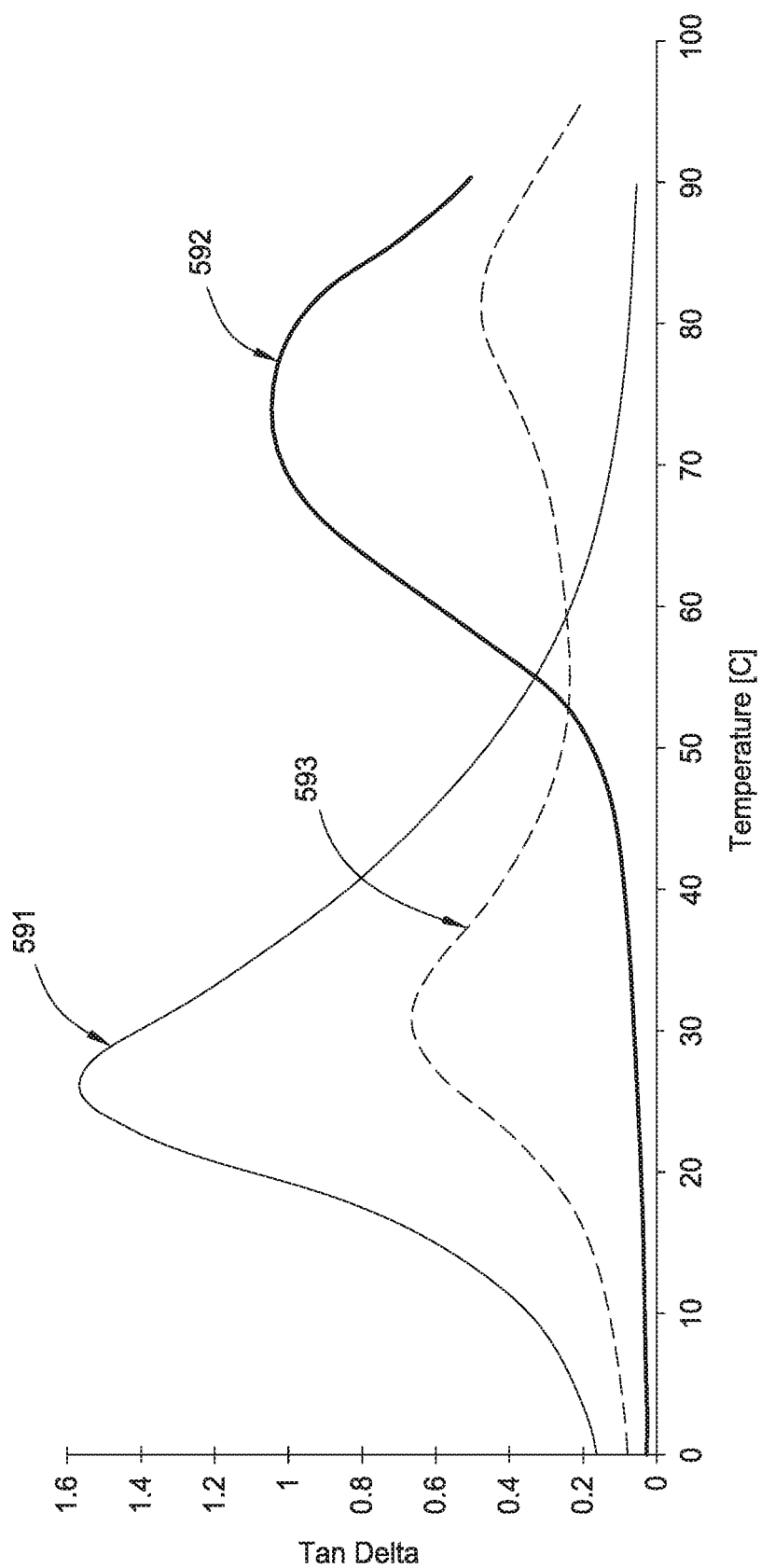
FIG. 5A illustrates a plot of tan delta versus temperature for various materials and an advanced polishing pad, according to an embodiment of the present disclosure.
Figure 5B:
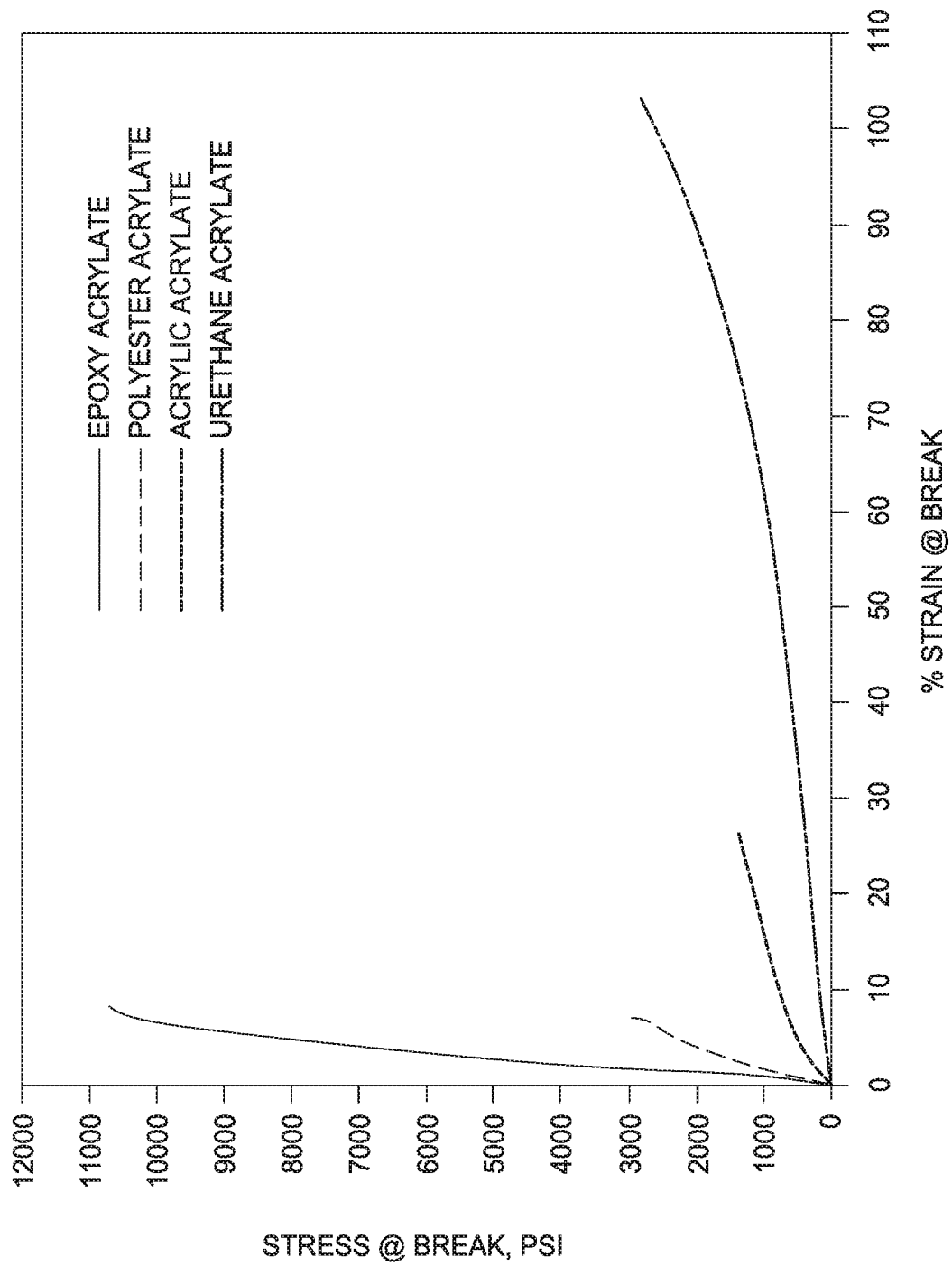
FIG. 5B illustrates a plot of stress versus strain for materials that can be used in an advanced polishing pad, according to an embodiment of the present disclosure.

In one example, an advanced polishing pad 200 may include the tan δ properties illustrated in FIG. 5A. FIG. 5A includes tan δ data (1 Hz, ramp rate 5° C./min) for a first polishing pad material (e.g., curve 591), a second polishing pad material (e.g., curve 592), and an advanced polishing pad configuration (e.g., curve 593) that contains regions that include either the first polishing pad material (e.g., soft material) or the second polishing pad material (e.g., hard material). As illustrated, the tan δ data contains separate and discrete tan δ peaks for the first and second materials, as shown by curves 591 and 592. In contrast the tan δ peaks for the advanced polishing pad material, curve 593, are broadened and coalesced, which is indicative of molecular scale mixing, chain entanglement, chemical bonding and/or a compositional gradient between the first polishing pad material, such as found in a second polishing element 206, and the second polishing pad material, such as found in a first polishing element 204. It has been found that a tan δ maximum of between about 0.1 and about 3 between a temperature of 30° C. and 90° C. is useful to minimize the amount of dishing, planarization efficiency and other related polishing non-uniformity.

Figure 5C:
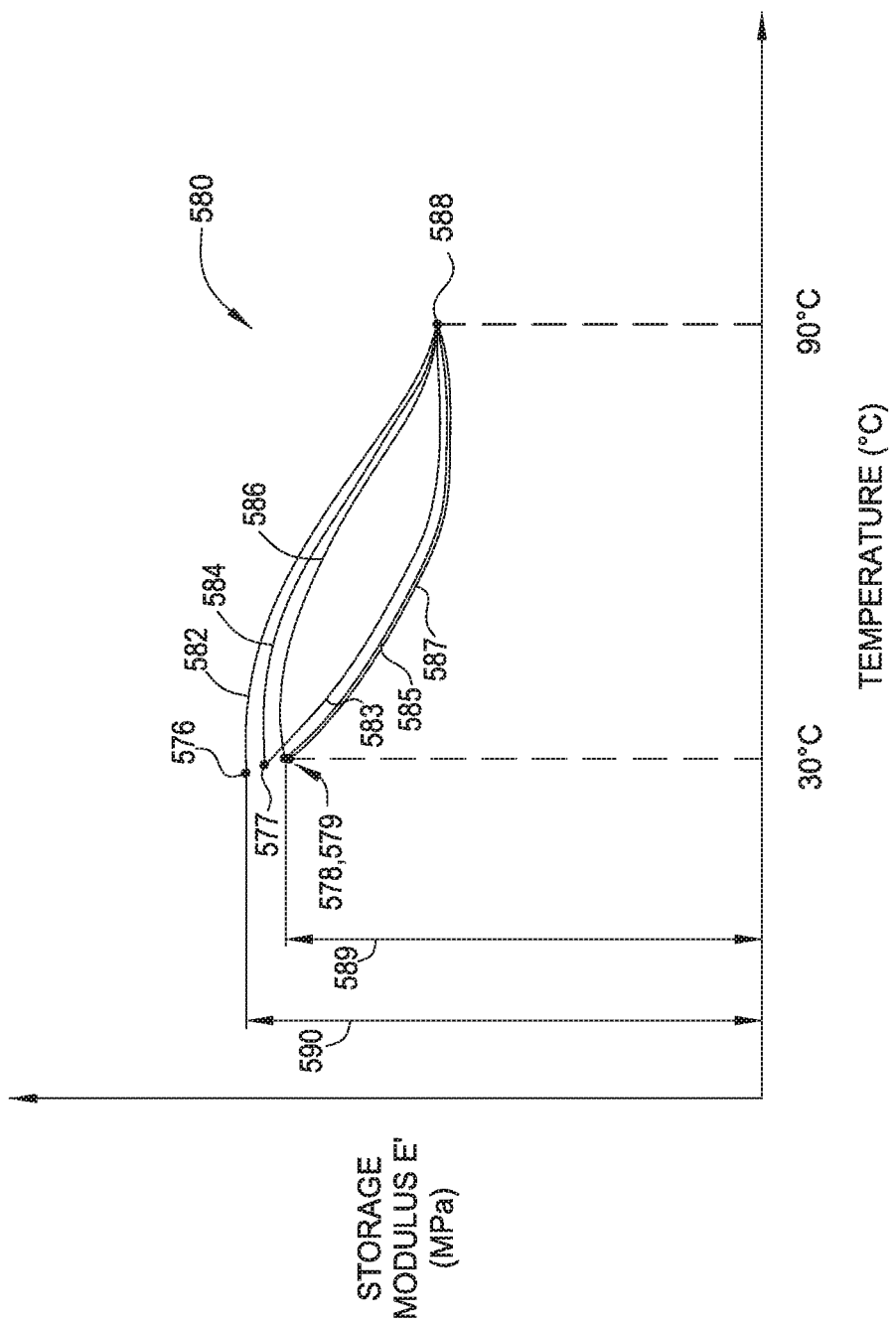
FIG. 5C illustrates a plot of the change in storage modulus versus temperature for pad materials that are subjected to cyclical processing in polishing system, according to an embodiment of the present disclosure.

In an effort to further control process repeatability, another parameter that can be controlled in an advanced polishing pad is a pad material's "recovery." FIG. 5C illustrates a plot of storage modulus E' as a function of temperature taken over a number of simulated polishing cycles for a material that may form part of the first polishing elements 204 or the second polishing element 206. The plot 580 includes a plurality of curves that measure the drop in storage modulus E' from an initial starting storage modulus value 576 as the polishing pad heats up from a starting temperature of about 30° C. to a final steady state polishing temperature about 90° C. (e.g., storage modulus value 588), and as the pad cools down from about 90° C. to a final temperature about 30° C. during each polishing cycle. For illustration purposes and clarity of discussion the plot in FIG. 5C illustrates data for three polishing cycles, which includes a first polishing cycle that includes curves 582 and 583, a second polishing cycle that includes curves 584 and 585 and a third polishing cycle that includes curves 586 and 587. As shown in FIG. 5C, at the end of each cycle 577-579 there is a drop in the measured storage modulus due to relaxation of the stress found in the polishing pad material and/or at least partial reconfiguration of bonding structure of the polymeric materials that likely occurs at the higher polishing temperatures when a higher load is applied during the polishing process. How well a material recovers after a number of successive cycles is known as a material's ability to "recover." Recovery is typically measured as a percentage of the drop in the magnitude of a property of a material (e.g., storage modulus) from the starting point 576 to a stable equilibrium point 579 that is measured at the same point in a polishing cycle. Recovery can be calculated by measuring the ratio of the ending value 589 to the starting value 590 times a hundred. To assure polishing process stability, it is generally desirable for the recovery of the materials in a polishing pad to be as large as possible, and thus it is believed that the recovery needs to be at least greater than 50%, or even greater than or equal to about 70% using a dynamic mechanical analysis (DMA) test that is configured to simulate a CMP process. In one example, the DMA test is between about 5-10 minutes long, such as about 8 minutes long, and the maximum temperature ramp rate is about 5° C./min, which is intended to simulate a standard CMP process. The DMA test is used to emulate pad heating which takes place on the polisher due to friction between the substrate, slurry, retaining ring, and polishing pad. Heat tends to build up through the polishing run and is then rapidly quenched between substrate processing steps, due to normal fluid convection or conduction of heat away from the pad. In some embodiments, to assure the polishing pad has a desirable recovery, and thus assure that the polishing process is stable, it is desirable to adjust the composition of the precursor formulation and/or curing process parameters to control the stress in the formed layer and/or degree of cross linking. In some embodiments, it may also be desirable to anneal the advanced polishing pad prior to use in a polishing process.

It is also believed that to maintain optimal polishing uniformity and polishing performance on a substrate, the E'30:E'90 ratio of the pad materials should be controlled and adjusted as needed. To that end, in one embodiment, the E'30:E'90 ratio of the one or more of the formed pad materials (e.g., material used to form first polishing element 204), and/or the overall advanced polishing pad 200, may be greater than or equal to 6, such as between about 6 and about 15. The polishing pad may have a stable storage modulus E' over a temperature range of about 25° C. to about 90° C. such that storage modulus E' ratio at E'30/E'90 falls within the range between about 6 to about 30, wherein E'30 is the storage modulus E' at 30° C. and E'90 is the storage modulus E' at 90° C. Polishing pads that have an E'30:E'90 ratio that is 6 or higher are useful to reduce scratch type defects often created when using high storage modulus E' materials at temperatures that are below steady state processing temperatures seen during normal processing. In other words, as the temperature rises in the materials, which are in contact with the substrate during processing, the materials will tend to soften a larger extent than materials having a lower E'30:E'90 ratio, which will thus tend to reduce the possibility of scratching the surface of the substrate. The material softening through the polish process can impact the substrate-to-substrate stability of the process in unfavorable ways. However, high E'30:E'90 ratio materials may be useful where the initial portion (e.g., 10-40 seconds) of a polish process needs a high storage modulus in the polishing surface materials, and then as the temperature continues to increase to levels in which the polishing surface materials become compliant, the polishing surface materials finish the polishing process in a buff or scratch reducing mode.

In some embodiments, it is desirable to control the thermal conductivity of various sections of the advanced polishing pad to allow for the control one or more aspects of the polishing process. In one embodiment, it is desirable to increase the thermal conductivity of the overall advanced polishing pad in a direction normal to the polishing surface, such as the Z-direction in FIGS. 1A-2K. In this example, the increased thermal conductivity in the Z-direction, over traditional polishing pad formulations, allows the polishing pad surface temperature to be maintained at a lower temperature, due the ability to more easily conduct the heat generated at the polishing pad surface during processing to the large thermal mass and/or often cooled polishing platen on which the advanced polishing pad is positioned. The reduced polishing process temperature will reduce the polishing process variability often seen when polishing a first substrate in a batch of substrates versus the last substrate in the batch (e.g., $25^{th}$ substrate), and reduce the degradation of material properties often found in polymeric materials (e.g., storage modulus E', E' ratio, etc.) over the batch of substrates. Alternately, in some embodiments, it is desirable to reduce the thermal conductivity of the overall advanced polishing pad in a direction normal to the polishing surface, such as the Z-direction in FIG. 1A. In this case, the reduced thermal conductivity in the Z-direction, over traditional polishing pad formulations, allows the polishing pad surface temperature to rapidly rise to an equilibrium processing temperature during polishing, due the reduced ability of the polishing pad to conduct the heat generated at the polishing pad surface during processing to the polishing platen on which the advanced polishing pad is positioned. The often higher, but more stable, polishing process temperatures can also be used to reduce the polishing process variability often seen when polishing a first substrate in a batch of substrates versus the last substrate in the batch (e.g., $25^{th}$ substrate).

Therefore, in some embodiments, it is desirable to add one or more fillers, particles or other materials to the first polishing elements 204 and/or second polishing element(s) 206 during the formation process to adjust the thermal conductivity of the advanced polishing pad 200 in the any direction (e.g., X, Y or Z-directions) within the polishing pad by use of one or more of the additive manufacturing process described herein. The thermal conductivity of polymers has been traditionally enhanced by the addition of thermally conductive fillers, including graphite, carbon black, carbon fibers, and nitrides, so a polishing pad formulation and composition may contain thermally conductive particles and compounds such as boron nitride, to increase the thermal conductivity of a polishing pad. For example, a conventional polishing pad without a thermally conductive filler may have a thermal conductivity of about 0.1 W/m·K to about 0.5 W/m·K at 25° C. In one embodiment, boron nitride, with a thermal conductivity of about 250 W/m·K is added to a polishing pad, at about 10 wt % based on formulation. The layers containing boron nitride may be deposited at and/or near the pad surface that contacts the substrate being polished, and that may be subjected to the most heating due to frictional polishing forces generated during polishing. In one embodiment, the additional boron nitride particles increased the thermal conductivity of the polishing pad from about 10% to about 25%, and thus increased the life of the polishing pad by about two times. In another embodiment, polymer layers at or near the polishing surface, such as first polishing element 204, may contain particles that aid in the removal of substrate metals and/or metal oxides.

In one embodiment, a percent by weight of silica particles in the surface layers may be from about 0.1% to about 30% by weight of formulation, such as 10% by weight, and by which may increase the Shore hardness and modulus of such a coating from about 10% to about 50%. In one embodiment, the particle surface may be chemically modified so that the particles may be well mixed and/or suspended in a 3D polishing pad ink, and thus more easily dispensed, without phase separation. Chemical modifications include the chemical binding of surfactant like molecules to the polar surface of a particle by a "coupling agent, such as a silane coupling agent. Other coupling agents that may be useful include titanates and zirconates. The chemical binding, coupling, or attachment of a coupling agent to a particle may occur by chemical reactions such as hydrolysis and condensation. Coupling agents and related chemical compounds described herein are available from a number of sources, including Gelest Incorporated of Morrisville, Pa., USA, and Sigma-Aldrich Chemical Company, of St. Louis, Mo., USA.

In one embodiment, the unitary pad body 202 may have pores that contain air or another gas. The pores may be generated by radiation or thermally induced generation of gaseous materials. In one embodiment, an advanced polishing pad pre-polymer composition may contain compounds, polymers, or oligomers that are thermally labile and that may contain of thermally labile groups. The porogens and thermally labile groups may be cyclic groups, such as unsaturated cyclic organic groups. The porogen may comprise a cyclic hydrocarbon compound. Some exemplary porogens include, but are not restricted to: norbornadiene (BCHD, bicycle(2.2.1)hepta-2,5-diene), alpha-terpinene (ATP), vinylcyclohexane (VCH), phenylacetate, butadiene, isoprene, and cyclohexadiene. In one embodiment, a prepolymer layer is deposited that contains a radiation curable oligomer with a covalently bound porogen group. After exposure to UV radiation and heat, a porous polymer layer may be formed by the effusion of the porogen group. In another embodiment, a plurality of porous layers may be formed by sequential layer deposition and pore formation. In other embodiments, pores may be generated by thermally induced decomposition of compounds that form a gas byproduct, such as azo compounds, which decompose to form nitrogen gas.

Advanced Polishing Pad Formulation Examples

As noted above, in some embodiments, one or more of the materials that are used to form at least one of the two or more polishing elements, such as the first and second polishing elements 204 and 206, is formed by sequentially depositing and post deposition processing of at least one curable resin precursor composition. In general, the curable resin precursor compositions, which are mixed during the precursor formulation process performed in the precursor delivery section 353 of the additive manufacturing system 350, will include the formulation of resin precursor compositions that contain functional oligomers, reactive diluents and curing components, such as initiators. Examples of some of these components are listed in Table 3.

TABLE 3

| Reference Name | Material Information | Functionality | Tg (° C.) | UTS (psi) | % Elongation |
|---|---|---|---|---|---|
| O1 | Aliphatic urethane acrylate oligomer | 2 | 27 | 5378 | 79 |
| O2 | Aliphatic hexafunctional urethane acrylate | 6 | 145 | 11,000 | 1 |
| O3 | Low viscosity diacrylate oligomer | 2 | 26 | 1,600 | 10 |
| O4 | Aliphatic hexafunctional acrylate | 6 | 120 | | |
| O5 | Multifunctional urethane acrylate oligomer | 3.4 | 46 | 3045 | 2 |
| M1 | Dipropylene glycol diacrylate | 2 | 104 | 2938 | 5 |
| M2 | 2-Propenoic acid, 2-phenoxyethyl ester | 1 | 5 | 19 | 236 |
| M3 | Tertio-butyl cyclohexanol acrylate (TBCHA) | 1 | 41 | | |
| M4 | Polyether-modified polydimethylsiloxane | | | | |
| M5 | CTFA 2 Ethers | 1 | 32 | — | — |
| M6 | EOEO-EA | 1 | −54 | — | — |
| P1 | 2-Hydroxy-2-methyl-1-phenyl-propan-1-one | | N/A | N/A | N/A |
| P2 | 4-Phenylbenzophenone | | N/A | N/A | N/A |
| A1 | Acrylated amine synergist | <1 | N/A | N/A | N/A |

Examples of functional oligomers can be found in items O1-O5 in Table 3. Examples of functional reactive diluents and other additives can be found in items M1-M6 in Table 3. Examples of curing components are found in items P1-P2 and A1 in Table 3. Items O1-O3, M1-M3 and M5-M6 found in Table 3 are available from Sartomer USA, item O4 is available from Miwon Specialty Chemicals Corporation of Korea, item O5 is available from Allnex Corporation of Alpharetta, Ga., USA, item M4 is available from BYK-Gardner GmbH of Germany and items P1-P2 and A1 are available from Chiba Specialty Chemicals Inc. and RAHN USA Corporation.

One advantage of the additive manufacturing processes described herein includes the ability to form an advance polishing pad that has properties that can be adjusted based on the composition of the materials and structural configuration of the various materials used within the pad body structure. The information below provides some examples of some material formulations and the affect that varying various components in these formulations and/or processing techniques have on some of the properties needed to form an advanced polishing pad that will achieve improved polishing results over conventional polishing pad designs. The information provided in these examples can be used to form at least a portion of the advanced polishing pad 200, such as part of the first polishing element 204, the second polishing element 206, or both the first and second polishing elements 204 and 206. The examples provided herein are not intended to be limiting as to the scope of the invention provided herein, since other similar chemical formulations and processing techniques can be used to adjust some of the properties described herein.

Examples of the curable resin precursor composition components, which are described above and below, are intended to be comparative examples and one skilled in the art can find other suitable monomers/oligomers from various sources to achieve the desired properties. Some examples for reactive diluents are 2-ethylhexyl acrylate, octyldecyl acrylate, cyclic trimethylolpropane formal acrylate, caprolactone acrylate and alkoxylated lauryl methacrylate. The first material is available from Sigma-Aldrich, and the balance may be obtained from Sartomer USA and/or Rahn AG USA (SR series 203, 217, 238, 242, 306, 339, 355, 368, 420, 484, 502, 506A, 508, SR 531, 550, 585, 495B, 256, 257, 285, 611, 506, 833S, and 9003B, CD series 421A, 535, 545, 553, 590, 730, and 9075, Genomer series 1116, 1117, 1119, 1121, 1122, 5142, 5161, 5275, 6058, 7151, and 7210, Genocure series, BP, PBZ, PMP, DETX, ITX, LBC, LBP, TPO, and TPO-L, and Miramer series, M120, M130, M140, M164, M166, and M170). Some examples for difunctional crosslinkers are bisphenol A glycerolate dimethacrylate, ethylene glycol dimethacrylate, diethylene glycol dimethacrylate, tetraethylene glycol dimethacrylate, 1,6-hexanediol diacrylate and 1,4-butanediol diacrylate, which may be obtained from Sigma-Aldrich. Some examples of oligomers could include aliphatic oligomers (CN series 131, 131B, 132, 152, 508, 549, 2910, 3100 and 3105 from Sartomer USA), polyester acrylate oligomers (CN series 292, 293, 294E, 299, 704, 2200, 2203, 2207, 2261, 2261 LV, 2262, 2264, 2267, 2270, 2271E, 2273, 2279, 2282, 2283, 2285 and 2303 from Sartomer USA) and aliphatic urethane oligomers (CN series 929, 959, 961 H81, 962, 969, 964A85, 965, 968, 980, 986, 989, 991, 992, 996, 2921, 9001, 9007, 9013, 9178 and 9783 from Sartomer USA). The agents or additives could be supplied from BYK, such as 3550, 3560, 307, 378, 1791, 1794, 9077, A515, A535, JET9510, JET9511, P9908, UV3500, UV3535, DISPERBYK168, and DISPERBYK2008. The first type photoinitiator could be from BASF, such as Irgacure series 184, 2022, 2100, 250, 270, 295, 369, 379, 500, 651, TPO, TPO-L, 754, 784, 819, 907, 1173, or 4265. Additionally, other functional oligomers and resin precursor composition components can be purchased from Allnex Corp., such as the Ebecryl series (EB): 40, 53, 80, 81, 83, 110, 114, 130, 140, 150, 152, 154, 168, 170, 180, 220, 230, 242, 246, 264, 265, 270, 271, 284, 303, 350, 411, 436, 438, 450, 452, 524, 571, 600, 605, 608, 657, 745, 809, 810, 811, 812, 830, 860, 870, 871, 885, 888, 889, 893, 1258, 1290, 1291, 1300, 1360, 1710, 3200, 3201, 3411, 3415, 3418, 3500, 3600, 3700, 3701, 3720, 4265, 4827, 4833, 4849, 4858, 4883, 5129, 7100, 8100, 8296, 8301, 8311, 8402, 8405, 8411, 8412, 8413, 8414, 8465, 8501, 8602, 8701, 8702, 8804, 8807, 8808, and 8810.

Example 1—Storage Modulus E' and E'30:E'90 Ratio Control Example

The selection, formulation and/or formation of materials that have a desirable storage modulus E' and E'30:E'90 ratio in desirable regions of an advanced polishing pad by use of an additive manufacturing process is an important factor in assuring that the polishing results achieved by the advanced polishing pad are uniform across a substrate. It is noted that storage modulus E' is an intrinsic material property of a formed material, which results from the chemical bonding within a cured polymeric material. Storage modulus may be measured at a desired temperature, such as 30° C. and 90° C. using a dynamic mechanical analysis (DMA) technique. Examples of formulations that contain different storage moduli are illustrated below in Table 4.

TABLE 4

| Item No. | Material Composition (See Table 3 Ref. Name) | Formulation Composition (wt %) | E'30 (MPa) | E'90 (MPa) | E'30/E'90 |
| --- | --- | --- | --- | --- | --- |
| 1 | O1:M3 | 45:55 | 404 | 3.6 | 113.6 |
| 2 | O1:M1 | 45:55 | 1595 | 169.5 | 9.4 |
| 3 | O1:M3:M1:M2 | 45:22:22:11 | 680 | 10.4 | 65.3 |
| 4 | O4:O1:M3:M1:M2 | 30:15:22:22:11 | 925 | 385.4 | 2.4 |

Referring to Table 3 and items 1 and 2 in Table 4, creating a formulation that contains resin precursor components (e.g., monomers, oligomers, reactive diluents and other materials that contain chemically active functional groups or segments) that have a higher functionality than other resin precursor components results in an increased storage moduli E' at different temperatures, while the E'30:E'90 ratio of the formed material can be decreased. Changing the resin precursor component from a type M3, which has a functionality of 1, to a resin precursor component of type M1, which has a functionality of 2, in the formulation increases the storage modulus E' at 30° C. by nearly 400%, while the E'30:E'90 ratio dropped to about 8% of its original value. Similarly, comparing items 3 and 4 in Table 4, one will note that by adding a multifunctional oligomer to a formulation that the storage moduli E' at different temperatures can be moderately increased, while the E'30:E'90 ratio of the formed material can be greatly decreased. Thus, by adding the multifunctional oligomer O4, which has a functionality of 6, to a formulation, the storage modulus E' at 30° C. was only increased by 136%, while the E'30:E'90 ratio dropped to about 4% of its original value. While not intending to be bound by theory, it is believed that by increasing the degree of crosslinking within a formed polymer material, due to the addition of components to a droplet formulation that have an increased functionality, has a significant effect on the storage modulus E' at higher temperatures (e.g., 90° C.) and thus has a significant effect on the E'30:E'90 ratio. Therefore, in some embodiments of the disclosure, precursor components that have a functionality of two or greater are used in the formulations used to form the harder material regions (e.g., first polishing elements 204) in the advanced polishing pad 200. In the same way, softer regions of the advanced polishing pad 200 may be formed by use of formulations that have a lesser functionality than the harder regions in the polishing pad. Therefore, in some embodiments of the disclosure, precursor components that have a functionality of two or less are used in the formulations used to form the softer material regions (e.g., second polishing elements 206) in the advanced polishing pad 200.

Example 2—Storage Modulus E' and Percent Recovery Control Example

Examples of different formulations that can be used to adjust the storage modulus E' and percent recovery (%) of a material used in an advanced polishing pad are illustrated below in Table 5.

TABLE 5

| Item No. | Material Composition (See Table 3 Ref. Name) | Formulation Composition (wt %) | E'30 (MPa) | UTS (MPa) | E'30/ E'90 | % EL @ break | % Recovery |
|---|---|---|---|---|---|---|---|
| 1 | O1:O2:M3:M1:M2 | 40:5:10:10:35 | 347 | 9.8 | 19 | 38.5 | 40 |
| 2 | O1:O2:M3:M1:M2 | 25:5:10:50:10 | 1930 | 19.5 | 11 | 1.9 | 86 |

Referring to items 1 and 2 in Table 5, one will note that by adjusting the amounts of various components in a formulation that an increase in storage moduli E' at lower temperatures (e.g., 30° C.), an increase in the percent recovery (%) and a reduction in the percent elongation at break can be achieved. It is believed that the significant change in the storage modulus E' at 30° C., the percent recovery (%) and elongation at break properties are largely due to the increase in the percentage of the chemical components that have a high glass transition temperature (Tg). One will note that a material that has a low glass transition temperature, such as resin precursor component M2 (e.g., Tg=5° C.), will tend to be softer at room temperature, while a material that has a high glass transition temperature, such as resin precursor component M1 (e.g., Tg=104° C.) will tend to be harder and more brittle at temperatures near room temperature. One will note in this example that while the percentage of the multifunctional oligomer O1, which has a functionality of two, is slightly decreased and percentage of the resin precursor component M1, which also has a functionality of 2, is significantly increased, and the change in the E'30:E'90 ratio is only modestly changed. Therefore, it is believed that the cross-linking density is likely to be similar for polymer materials formed by the compositions of items 1 and 2 in Table 5, which supported by the rather modest change in the E'30: E'90 ratio of the two materials. Therefore, in some embodiments, precursor components that have a high glass transition temperature can be increased in a formulation to form a material that has higher storage modulus E', greater hardness, a greater percentage of recovery during processing and a smaller elongation at break. Similarly, in some embodiments, precursor components that have a low glass transition temperature may be increased in a formulation to form a material that has lower storage modulus E', lower hardness and a greater elongation at break.

In some embodiments, it is desirable to adjust the various components in a droplet formulation used to form a low storage modulus E' material, such that the amount of components that have a glass transition temperature (Tg) of less than or equal to 40° C. is greater than the amount of components that have a glass transition temperature (Tg) of greater than 40° C. Similarly, in some embodiments, it is desirable to adjust the various components in a droplet formulation used to form a high storage modulus E' material, such that the amount of components that have a glass transition temperature (Tg) of greater than 40° C. is greater than the amount of components that have a glass transition temperature (Tg) of less or equal to about 40° C. In some embodiments, one or more resin precursor component materials in a droplet formulation used to form a low storage modulus E' material in an advanced polishing pad have a glass transition temperature (Tg) of less than or equal to 40° C., such as less than or equal to 30° C., and one or more resin precursor component materials used form a droplet formulation used to form a higher storage modulus E' material in the same advanced polishing pad have a glass transition temperature (Tg) of greater than or equal to 40° C.

Example 3—Contact Angle Control Example

Examples of different formulations that can be used to adjust the contact angle of droplets, as discussed above in conjunction with FIG. 3C, that are deposited on a surface is illustrated below in Table 6. As noted above, it has been found that by at least controlling: 1) the composition of the components in a dispensed droplet during the additive manufacturing process, 2) the amount of cure of the previously formed layer, 3) the amount of energy from the curing device, 4) the composition of the surface that the dispensed droplet is disposed on, and 5) the amount of the curing agent (e.g., photoinitiator) in the droplet composition, the contact angle α of the dispensed droplet can be controlled to improve the control of the resolution of the features formed by the additive manufacturing process described herein.

TABLE 6

| Item No. | Material Composition (See Table 3 Ref. Name) | Formulation Composition (wt %) | E'30 (MPa) | Contact Angle (°) | E'30/ E'90 | Recovery (%) |
|---|---|---|---|---|---|---|
| 1 | O1:O2:M1:M2:P1 | 22:18:30:30:<1 | 2078 | 30 | 9.4 | 85 |
| 2 | O1:O2:M1:M2:O3:M4:P1:P2:A1 | 22.5:22.5:30:25:0.06:0.02:<1:<1:<1 | 1353 | 60 | 4 | 82 |
| 3 | O1:O2:M1:M2:O3:M4:P1:P2:A1 | 27.5:17.5:30:25:0.06:0.02:<1:<1:<1 | 2632 | 90 | 4.4 | 79 |

Referring to items 1, 2 and 3 in Table 6, one will note that by adjusting the amounts of the various components in a formulation that the contact angle of a cured droplet or "fixed" droplet on a surface that was formed with same, or a similar, droplet formulation, can be adjusted. It is believed that a significant change in the contact angle can be achieved by adjusting the type and amount of the functional monomers (e.g., items M1-M2 and M4) and photoinitiator components (e.g., items P1, P2 and A1) in the dispensed droplet's formulation.

The contact angle of a droplet formulation can be improved through the use of: 1) through or bulk cure photoinitiators (e.g., first type of photoinitiator) that ensure that the mechanical properties of the at least partially cured droplets can be achieved, 2) through the use of a second type of photo-initiator such as benzophenones and an amine synergist, which enable a fast surface cure by reducing the ability of $O_2$ in the environment to quench the free radicals generated through UV exposure (e.g., second type of photoinitiator), and 3) through surface modifiers that tend to make the surface of the dispensed droplet more or less polar. The surface modifiers, for example, may be used such that when a drop of a hydrophilic uncured resin is deposited on a hydrophobic surface, the surface energy of the dispensed droplet can be altered. This will result in a large contact angle, and thereby ensure that the droplet does not "wet" the surface. The prevention of wetting of the surface will allow the subsequently deposited droplets to be built vertically (e.g., Z-direction). When droplet after droplet are positioned horizontally next to each other, it is desirable to prevent horizontal wetting of the surface, so that the side walls of the vertically formed features will be formed vertically as opposed to a slopping shape. This improvement in contact angle ensures that the side walls of the printed features are vertical, or have gradual slopes when deposited one on top of one another. This resolution is important in an advanced polishing pad as the substrate contact area of the polishing features needs to be maintained at a consistent contact area throughout each polish process and/or as the pad polishing material is removed by abrasion or pad conditioning throughout the life of the pad.

Example 4—Low Storage Modulus E' Tuning Example

The selection, formulation and/or formation of materials that have a desirable low storage modulus E' and desirable E'30:E'90 ratio in various regions of the advanced polishing pad can be an important factor in assuring that the static and dynamic related mechanical properties of an advanced polishing pad can be adjusted to achieve desirable polishing results when combined with higher storage modulus E' material. Examples of formulations that contain different storage moduli E' are illustrated below in Table 7.

the E'30:E'90 ratio only dropped to about 75% of its original value. While not intending to be bound by theory, it is believed that by increasing the degree of crosslinking within a formed polymer material, due to the addition of multifunctional oligomer O5 components to a droplet formulation, has a significant effect on the storage modulus E' at lower temperatures (e.g., 30° C.) when used in combination with a resin precursor component that has a relatively low glass transition temperature Tg. Therefore, in some embodiments of the disclosure, resin precursor components that have a functionality of two or greater are used in combination with resin precursor components that have a relatively low glass transition temperature Tg to form softer material regions (e.g., second polishing elements 206) in the advanced polishing pad 200. Also, in some embodiments of the disclosure, precursor components and functional oligomer that have a functionality of two or less are used in the formulations used to form the softer material regions (e.g., second polishing elements 206) in the advanced polishing pad 200.

In some embodiments, it is desirable to control the properties of one or more of the polishing elements 204, 206 in the advanced polishing pad by controlling the relative amounts of oligomers to monomers, or also referred to herein as controlling the oligomer-monomer ratio, in a resin precursor composition to control the amount of cross-linking within the cured material formed by the resin precursor composition. By controlling the oligomer-monomer ratio in a resin precursor composition, the properties (e.g., mechanical, dynamic, polishing performance, etc.) of the formed material can be further controlled. In some configurations, monomers have a molecular weight of less than 600. In some configurations, oligomers have a molecular weight of 600 or more, such as a molecular weight of >1000. In some configurations, the oligomer-monomer ratio is defined as a weight ratio of the oligomer component to the monomer component, and is typically selected to achieve the desired strength and modulus. In some implementations, the oligomer-monomer ratio is from about 3:1 to about 1:19. In some implementations the oligomer-monomer ratio is in a range from about 3:1 to about 1:3 (e.g., ratio 2:1 to 1:2; ratio 1:1 to 1:3; ratio 3:1 to 1:1). In one example, an oligomer-monomer ratio of 1:1 can be used to achieve desirable toughness properties such as elongation and storage modulus E' while maintaining printability of the formed formulation. In some embodiments, it is desirable to select an oligomer-monomer ratio that is greater than a 1:1 ratio, and

TABLE 7

| Item No. | Material Composition (See Table 3 Ref. Name) | Formulation Composition (wt %) | E'30 (MPa) | E'90 (MPa) | E'30/E'90 |
|---|---|---|---|---|---|
| 1 | O1:O5:M3:M5:M6:P1 | 25:25:21.4:14.3:14.3:<1 | 88 | 20 | 4.4 |
| 2 | O1:M3:M2 | 45:27.5:27.5:<1 | 17.9 | 3.1 | 5.9 |

Referring to items 1 and 2 in Table 7, as similarly noted in Example 1 above, one will note that by creating a formulation that contains multifunctional oligomers that have a functionality of two or greater and that have differing glass transition temperatures (Tg) the storage moduli E' at different temperatures can be adjusted, while the E'30:E'90 ratio of the formed material can remain constant. For example, by adding a multifunctional oligomer O5, which has a functionality of 3.4 to a formulation, the storage modulus E' at 30° C. can be increased by nearly 500%, while thus contains a greater amount by weight of oligomers to monomers. A resin precursor composition that has an oligomer-monomer ratio that is greater than a 1:1 may be used to form the tougher or more elastomeric material regions (e.g., first polishing elements 204) in the advanced polishing pad 200. In some embodiments, it is desirable to select an oligomer-monomer ratio that is less than 1:1 ratio, and thus contains a smaller amount by weight of oligomers to monomers. A resin precursor composition that has an oligomer-monomer ratio that is less than 1:1 may be used to form less elastomeric material regions (e.g., second polishing elements 206) in the advanced polishing pad 200.

Example 5—Advanced Polishing Pad Properties Example

As discussed above, the additive manufacturing processes described herein enable specific placement of material compositions with desired properties in specific pad areas of the advanced polishing pad, so that the properties of the deposited compositions can be combined to create a polishing pad that has properties that are an average of the properties, or a "composite" of the properties, of the individual materials. In one example, an advanced polishing pad may be formed so that it has desirable average tan delta (tan δ) properties over a desired temperature range. Curves 921-923, curves 931-933 and curve 941 in FIG. 9A illustrate the average tan delta properties as a function of temperature for differently configured and/or loaded advanced polishing pads.

Figure 9B:
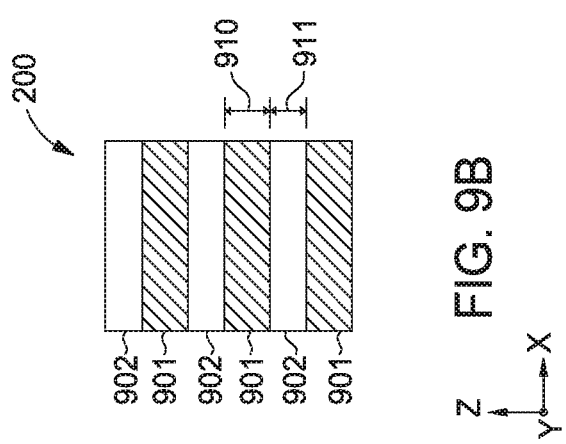
FIGS. 9B-9C are each schematic side cross-sectional views of portions of an advanced polishing pad, according to an embodiment of the present disclosure.
Figure 9C:
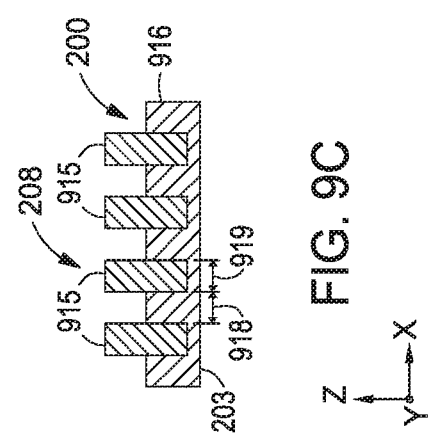
Figure 9A:
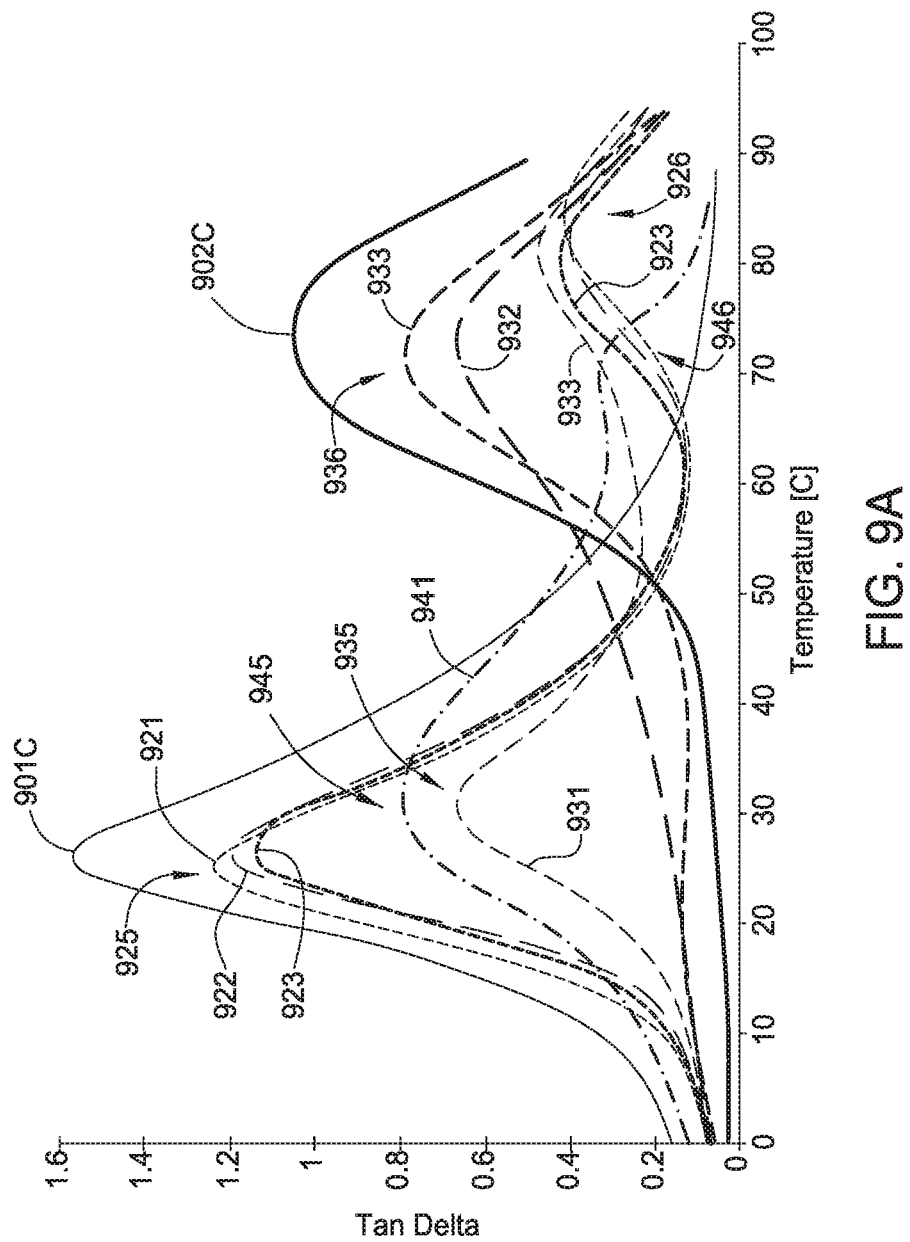
FIG. 9A illustrates a plot of tan delta versus temperature for various materials and an advanced polishing pad, according to an embodiment of the present disclosure.

FIGS. 9B and 9C are side cross-sectional views of two basic configurations of advanced polishing pads that were used to generate the tan delta versus temperature data, shown in FIG. 9A. The tan delta versus temperature data found in curves 921-923 in FIG. 9A were collected using a DMA technique that causes the advanced polishing pad samples of the type shown in FIG. 9B to be cycled in a test fixture that loads the cantilevered samples in the Z-direction. The tan delta versus temperature data found in curves 931-933 in FIG. 9A were collected using a DMA technique that causes the advanced polishing pad samples of the type shown in FIG. 9B to be cycled in a test fixture that loads the cantilevered samples in the X-direction (e.g., parallel to the formed layers). The tan delta versus temperature data found in curve 941 in FIG. 9A was collected using a DMA technique that causes the advanced polishing pad samples of the type shown in FIG. 9C to be cycled in a test fixture that loads a cantilevered test sample in the Z-direction. During all of the tests, the advanced polishing pad samples were heated from a temperature of −81° C. to a temperature of 95° C. at a ramp rate of 5° C./minute.

FIG. 9B illustrates a portion of an advanced polishing pad 200 that contains discrete layers of a first polishing pad material 901 and a second polishing pad material 902 that are formed using an additive manufacturing process described herein so that the formed layers are aligned parallel to the X-Y plane and are stacked in the Z-direction. The first polishing pad material 901 includes a low storage modulus urethane acrylate material that has a low glass transition temperature (Tg) and the second polishing pad material 902 includes a high storage modulus urethane acrylate material that has a high glass transition temperature (Tg). The layers of the first polishing pad material 901 and the second polishing pad material 902 each have a thickness 910 and 911 in the Z-direction, respectively.

Referring back to FIG. 9A, the plotted data contains separate and discrete tan delta peaks for the first polishing pad material 901 and second polishing pad material 902, as shown by curves 901C and 902C. The tan delta data for the DMA testing performed on the advanced polishing pad configuration shown in FIG. 9B are illustrated by curves 921-923 and curves 931-933, and the tan delta data for the DMA testing performed on the advanced polishing pad configuration shown in FIG. 9C is illustrated by curve 941.

Curves 921, 922 and 923 illustrate the effect of altering the thickness and relative spacing of each of the layers shown in FIG. 9B when loaded in the Z-direction during testing. Curve 921 illustrates a plot of the tan delta as a function of temperature for the advanced polishing pad structure shown in FIG. 9B, which has a 50:50 composition of the first polishing pad material 901 to the second polishing pad material 902, and thus has equivalent thicknesses 910 and 911 in the Z-direction for each of the layers. The thicknesses 910 and 911 in the first sample were both about 0.16 mm (0.006 inches). Curve 922 illustrates a plot of the tan delta as a function of temperature for the same general advanced polishing pad structure used to generate curve 921, except that the thicknesses 910 and 911 of the layers of the first and second materials 901 and 902 were both twice as large. Similarly, curve 923 illustrates a plot of the tan delta as a function of temperature for the same advanced polishing pad structure used to generate curve 921, except that thicknesses 910 and 911 of the layers of the first and second polishing pad materials 901 and 902 were both three times as large. One will note that curves 921, 922 and 923 all show a blending or averaging of the properties found in the individual materials 901 and 902, as seen by the two clear peaks (e.g., peaks 925 and 926) and the drop in magnitude of each of the peaks in the tan delta data. The two peaks found in curves 921, 922 and 923 may be indicative of molecular scale mixing, chain entanglement, and/or chemical bonding formed between the first polishing pad material and the second polishing pad material. Thus, in some embodiments, molecular scale mixing, chain entanglement, and/or chemical bonding may be desirably formed between a first material composition in the first polishing elements and a second material composition in the second polishing elements with an advanced polishing pad, which can help improve a property of the formed advanced polishing pad (e.g., tan delta, E'30:E'90 ratio, E'30, etc.).

Curves 931, 932 and 933 illustrate the effect of altering the thickness and relative spacing of each of the layers shown in FIG. 9B when loaded in the X-direction during testing. Curve 931 illustrates a plot of the tan delta as a function of temperature for the advanced polishing pad structure shown in FIG. 9B, which has a 50:50 composition of the first polishing pad material 901 to the second polishing pad material 902, and thus has equivalent widths 910 and 911 in the Z-direction for each of the layers. The widths 910 and 911 in the first sample were both about 0.16 mm (0.006 inches). Curve 932 illustrates a plot of the tan delta as a function of temperature for the same general advanced polishing pad structure used to generate curve 931, except that the widths 910 and 911 of the layers of the first and second materials 901 and 902 were both twice as large. Similarly, curve 933 illustrates a plot of the tan delta as a function of temperature for the same advanced polishing pad structure used to generate curve 931, except that widths 910 and 911 of the layers of the first and second polishing pad materials 901 and 902 were three times as large. One will note that curve 931 shows a blending or averaging of the properties found in the individual materials 901 and 902, as seen by the two clear peaks (e.g., peaks 935 and 936) and the drop in magnitude of each of the peaks in the tan delta data. While curves 932 and 933 show only a little blending or averaging of in the properties found in the individual materials 901 and 902, as seen by the lack of the two clear peaks.

FIG. 9C illustrates a portion of an advanced polishing pad 200 that contains a first polishing pad feature 915 and a base layer 916 that were also formed using an additive manufacturing process so that the first polishing pad features 915 are supported by the base layer 916 and are aligned in the Z-direction (e.g., items 204a in FIG. 2A). The base layer 916, in this configuration, includes a 50:50 "blend" (i.e., 1:1 material composition ratio) of fixed droplets of the first polishing pad material 901 and fixed droplets of the second polishing pad material 902. The thickness of the first polishing pad features 915 and the base layer 916 each have a width 918 and 919 that is aligned in the X-direction, respectively. Curve 941 illustrates the effect of forming a compositionally "blended" polishing pad element on the average or "composite" properties of an advanced polishing pad 200. One will note that curve 941 shows a blending or averaging of the properties found in the individual materials 901 and 902 found in the base layer 916, as seen by the two clear peaks (e.g., peaks 945 and 946) and the drop in magnitude of each of the peaks in the tan delta data. The two peaks found in curve 941 may be indicative of molecular scale mixing, chain entanglement, and/or chemical bonding formed between the first polishing pad material and the second polishing pad material within the base layer 916.

The tan delta versus temperature data found in FIG. 9A illustrates that the structural spacing or thickness of the layers relative to the loading direction (e.g., curves 921 and 941) can have a dramatic effect on the tan delta property averaging within an advanced polishing pad. Referring to curves 931, 932 and 933 one will note that as the spacing between the layers of the harder and softer materials increase the more the properties of the harder materials tend to dominate the properties of a formed polishing pad when loaded in a direction that is parallel to the formed layer orientation (e.g., X-direction). However, referring to curves 921, 922 and 923 one will note that the spacing between the layers of the harder and softer materials has little effect on the properties of a formed advanced polishing pad that is configured with the polishing features aligned in an orientation that is perpendicular to the loading direction, since the measured tan delta versus temperature does not vary much as the thickness of the features increases. Therefore, by controlling the structural orientation relative to the loading direction and relative spacing of the "hard" and "soft" layers within an advanced polishing pad, one or more of the pad properties (e.g., tan delta) can be adjusted to better control the polishing process performance of the advanced polishing pad.

Alternate Pad Structure Designs

Figure 6:
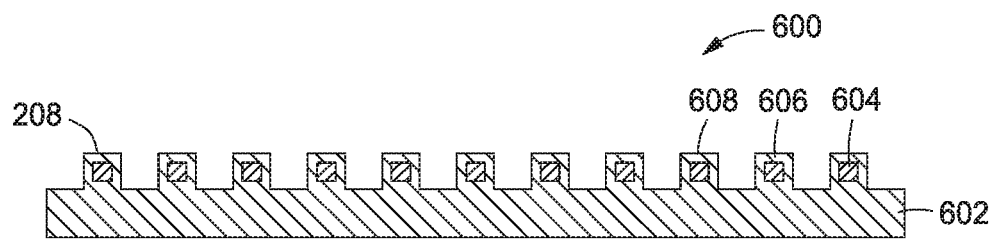
FIG. 6 is a schematic side cross-sectional view of a portion of a polishing pad according to an embodiment of the present disclosure.

FIG. 6 is a schematic perspective sectional view of a polishing pad 600 according to one embodiment of the present disclosure. The polishing pad 600 includes a second polishing element 602 that is a soft or low storage modulus E' material similar to the second polishing elements 206 of the 3D printed polishing pad. Similar to the second polishing elements 206, the second polishing element 602 may be formed from one or more elastomeric polymer compositions that may include polyurethane and aliphatic segments. The polishing pad 600 includes a plurality of surface features 606 extending from the second polishing element 602. Outer surfaces 608 of the surface features 606 may be formed from a soft or low E' material or a composition of soft or low storage modulus E' materials. In one embodiment, the outer surface 608 of the surface features 606 may be formed from the same material or the same composition of materials as the second polishing element 602. The surface features 606 may also include a hard feature 604 embedded therein. The hard or high storage modulus E' features 604 may be formed from a material or a composition of materials that is harder than the surface features 606. The hard or high storage modulus E' features 604 may be formed from materials similar to the material or materials of the hard or high storage modulus E' features 204 of the advanced polishing pad, including crosslinked polymer compositions and compositions containing aromatic groups. The embedded hard features 604 alter the effective hardness of the surface features 606, and thus provide a desired target pad hardness for polishing. The soft or low storage modulus E' polymeric layer of the outer surface 608 can be used to reduce defects and improve planarization on the substrate being polished. Alternatively, a soft or low storage modulus E' polymer material may be printed on surfaces of other polishing pads of the present disclosure to provide the same benefit.

Figure 7:
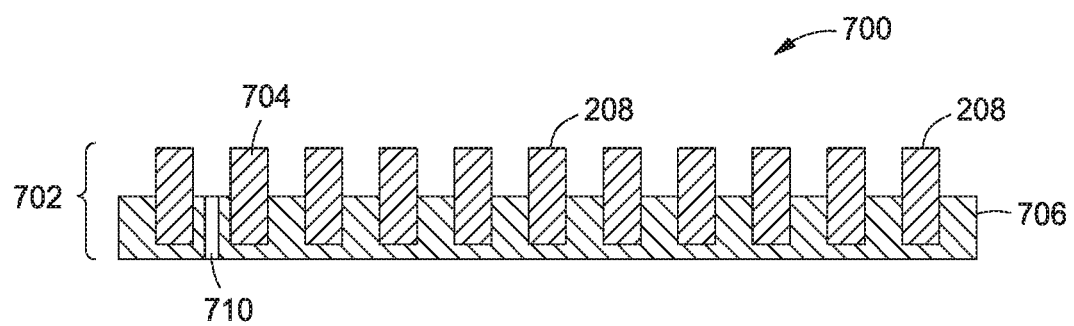
FIG. 7 is a schematic side cross-sectional view of a polishing pad having a transparent region formed therein, according to an embodiment of the present disclosure.

FIG. 7 is a schematic perspective sectional view of a polishing pad 700 having one or more observation windows 710. The polishing pad 700 may have a pad body 702. The pad body 702 may include one or more soft or low storage modulus E' features 706 and a plurality of first polishing elements 704 extending from the second polishing elements 706 for polishing. The second polishing elements 706 and the first polishing elements 704 may be formed from materials similar to those for the second polishing element(s) 206 and first polishing elements 204 of the advanced polishing pad 200. The first polishing elements 704 may be arranged in any suitable patterns according to the present disclosure.

The one or more observation windows 710 may be formed from a transparent material or compositions to allow observation of the substrate being polished. The observation windows 710 may be formed through, and/or about portions of, the second polishing elements 706 or the first polishing elements 704. In some embodiments, the observation window 710 may be formed from a material that is substantially transparent, and thus is able to transmit light emitted from a laser and/or white light source for use in a CMP optical endpoint detection system. The optical clarity should be high enough to provide at least about 25% (e.g., at least about 50%, at least about 80%, at least about 90%, at least about 95%) light transmission over the wavelength range of the light beam used by the end point detection system's optical detector. Typical optical end point detection wavelength ranges include the visible spectrum (e.g., from about 400 nm to about 800 nm), the ultraviolet (UV) spectrum (e.g., from about 300 nm to about 400 nm), and/or the infrared spectrum (e.g., from about 800 nm to about 1550 nm). In one embodiment, observation window 710 is formed from a material that has a transmittance of >35% at wavelengths between 280-800 nm. In one embodiment, observation window 710 is formed from a material that has a transmittance of >35% at wavelengths between 280-399 nm, and a transmittance of >70% at wavelengths between 400-800 nm. In some embodiments, the observation window 710 is formed from a material that has a low refractive index that is about the same as that of the polishing slurry and has a high optical clarity to reduce reflections from the air/window/water interface and improve transmission of the light through the observation window 710 to and from the substrate.

In one embodiment, the observation window 710 may be formed from a transparent printed material, including polymethylmethacrylate (PMMA). In another embodiment, the window is formed using transparent polymeric compositions that contain epoxide groups, wherein the compositions may be cured using a cationic cure, and may provide additional clarity and less shrinkage. In a similar embodiment, the window may be formed from a mixture of compositions that undergo both cationic and free radical cure. In another embodiment, the window may be produced by another process, and may be mechanically inserted into a preformed opening in the polishing pad that is formed by a 3D process.

Figure 8:
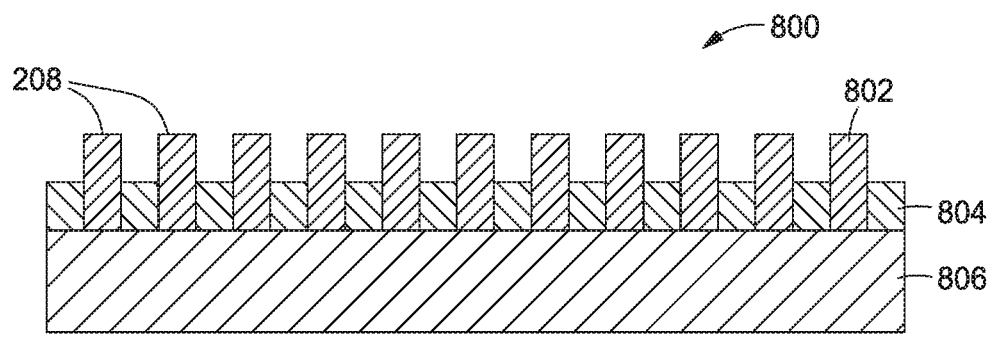
FIG. 8 is a schematic perspective sectional view of a polishing pad including a supporting foam layer, according to an embodiment of the present disclosure.

FIG. 8 is a schematic perspective sectional view of a polishing pad 800 including a backing layer 806. The polishing pad 800 includes a second polishing element 804 and a plurality of first polishing elements 802 protruding from the second polishing element 804. The polishing pad 800 may be similar to any of the polishing pads 200, 600, 700 described above, with the exception that the backing layer 806 attached to the second polishing element 804. The backing layer 806 may provide a desired compressibility to the polishing pad 800. The backing layer 806 may also be used to alter the overall mechanical properties of the polishing pad 800 to achieve a desired hardness and/or have desired storage modulus E' and loss modulus E". The backing layer 806 may have a hardness value of less than 80 Shore A scale. In one embodiment, the backing layer 806 may be formed from an open-cell or a closed-cell foam, such as polyurethane or polysiloxane (silicone), so that under pressure the cells collapse and the backing layer 806 compresses. In another embodiment, the backing layer 806 may be formed from natural rubber, EPDM rubber (ethylene propylene diene monomer), nitrile, or neoprene (polychloroprene).

In one embodiment, the materials of the first polishing element 204 and second polishing element 206 are chemically resistant to attack from the polishing slurry. In another embodiment, the materials of first polishing element 204 and second polishing element 206 are hydrophilic. The hydrophilic and hydrophobic nature of the polishing pad may be adjusted by judicious choice of formulation chemistries by those skilled in the art.

Although polishing pads described herein are circular in shape, polishing particles according to the present disclosure may include any suitable shape, such as polishing webs configured to move linearly during polishing.

Compared with traditional polishing pads, the advanced polishing pad disclosed herein has several manufacturing and cost related advantages. For example, traditional polishing pads generally include a machined and textured polishing surface that is supported by a subpad formed from a soft or low storage modulus E' material, such as a foam, to obtain target hardness and/or a storage modulus E' for polishing substrates. However, by selecting materials having various mechanical properties and adjusting the dimensions and arrangement of the different features formed on an advanced polishing pad the same properties can be achieved in the pad body of the advanced polishing pad without the need for a subpad. Therefore, the advanced polishing pad reduces a user's cost of ownership by eliminating the need for a subpad.

The increased complexity of polishing pad designs that will be required to polish the next generation IC devices greatly increases the manufacturing complexity of these polishing pads. There are non-additive manufacturing type processes and/or subtractive process which may be employed to manufacture some aspects of these complex pad designs. These processes may include multi-material injection molding and/or sequential step UV casting to form material layers from single discrete materials. These forming steps are then typically followed by machining and post processing using milling, grinding or laser ablation operations or other subtractive techniques.

While the foregoing is directed to embodiments of the present disclosure, other and further embodiments of the disclosure may be devised without departing from the basic scope thereof, and the scope thereof is determined by the claims that follow.

The invention claimed is:

1. A method of forming a polishing article, comprising:
forming a polishing element of the polishing article, wherein the polishing element comprises a mixture of a first material and a second material, and wherein forming the polishing element comprises sequential repetitions of:
positioning, according to a predetermined first deposition pattern, a plurality of droplets of a first material precursor across a surface;
positioning, according to a predetermined second deposition pattern, a plurality of droplets of a second material precursor across the surface,
wherein a composition of the second material precursor is different from a composition of the first material precursor,
wherein the first and second material precursors each comprise one or more resin components and a curing agent, and
wherein at least some droplets of the first material precursor and at least some droplets of the second material precursor are positioned relative to one another to allow partial mixing therebetween; and
partially curing the positioned droplets of the first and the second material precursors, by exposure thereof to electromagnetic radiation, to form a partially cured acrylate polymer layer, wherein partially curing each of the positioned droplets of the first material precursor results in the droplet having a contact angle relative to a surface of a previously formed acrylate polymer layer of greater than or equal to 50 degrees.

2. The method of claim 1, wherein at least one of the one or more resin components of the first material precursor comprises a first oligomer and at least one of the one or more resin components of the second material precursor comprises a second oligomer and the first and second oligomers are each selected from the group consisting of a multifunctional urethane oligomer, a polyester acrylate oligomer, a polyether acrylate oligomer, an epoxy acrylate oligomer, and combinations thereof.

3. The method of claim 2, wherein one of the one or more resin precursor components of the first material precursor comprises a monomer selected from the group consisting of a monofunctional acrylate monomer, a multifunctional acrylate monomer, and combinations thereof.

4. The method of claim 3, wherein the curing agent of the first material precursor comprises a photoinitiator selected from the group consisting of benzoin ethers, benzyl ketals, acetyl phenones, alkyl phenones, phosphine oxides, benzophenone compounds, thioxanthone compounds, and combinations thereof, and
and the curing agent of the second material precursor comprises a photoinitiator selected from the group consisting of benzoin ethers, benzyl ketals, acetyl phenones, alkyl phenones, phosphine oxides, benzophenone compounds, thioxanthone compounds, and combinations thereof.

5. The method of claim 3, wherein a ratio of the first oligomer to the monomer in the first material precursor by weight is between 3:1 to 1:3.

6. The method of claim 1, wherein partially curing the positioned droplets of the first and second material precursors further cures the previously formed acrylate polymer layer disposed therebeneath.

7. The method of claim 1, wherein
the one or more resin precursor components of the first material precursor comprise a multifunctional urethane acrylate oligomer and a multifunctional acrylate monomer,
one of the one or more or more resin precursor components of the second material precursor comprises a multifunctional urethane acrylate oligomer,
the curing agent of the first material precursor comprises an amine synergist and a photoinitiator selected from a group consisting of benzophenone compounds and thioxanthone compounds, and
the curing agent of the second material precursor comprises a photoinitiator selected from a group consisting of benzoin ethers, benzyl ketals, acetyl phenones, alkyl phenones, and phosphine oxides.

8. The method of claim 1, wherein an additive manufacturing system is used to sequentially form a plurality of the partially cured acrylate polymer layers, and wherein a curing atmosphere of the additive manufacturing system is oxygen limited or free of oxygen.

9. The method of claim 1, further comprising:
dispensing a third material precursor composition to form at least a portion of the polishing article comprising a third material; and
at least partially curing the dispensed third material precursor composition by exposure thereof to electromagnetic radiation to form the third material,
wherein the third material has a transmittance of >35% at wavelengths between 280-399 nm, and a transmittance of >70% at wavelengths between 400-800 nm.

10. The method of claim 9, wherein the third material precursor composition comprises polymethylmethacrylate (PMMA), an epoxide group containing material, or a combination thereof.

11. A method of forming a polishing article, comprising:
forming a polishing element by sequential repetitions of:
positioning, according to a predetermined first pattern, a plurality of droplets of a first pre-polymer composition, the first pre-polymer composition comprising a multifunctional urethane acrylate oligomer, a first resin precursor component having a glass transition temperature greater than 40° C., and a first curing agent;
positioning, according to a predetermined second pattern, a plurality of droplets of a second pre-polymer composition, the second pre-polymer composition comprising the multifunctional urethane acrylate oligomer and a second resin precursor component having a glass transition temperature of less than or equal to 40° C.,
wherein the droplets of the first pre-polymer composition and the droplets of the second pre-polymer composition are positioned relative to one another to allow partial mixing therebetween; and
partially curing the droplets of the first and second pre-polymer compositions using electromagnetic radiation to form a urethane acrylate polymer layer, wherein partially curing each of the positioned droplets of the first pre-polymer composition results in the droplet having a contact angle relative to a surface of a previously formed urethane acrylate polymer layer of greater than or equal to 50 degrees.

12. The method of claim 11, wherein the first and second pre-polymer compositions each further comprise a photoinitiator selected from a group consisting of benzoin ethers, benzyl ketals, acetyl phenones, alkyl phenones, phosphine oxides, benzophenone compounds, thioxanthone compounds, and combinations thereof.

13. The method of claim 11, wherein an additive manufacturing system is used to form the polishing element, and wherein a curing atmosphere of the additive manufacturing system is oxygen limited or free of oxygen.

14. The method of claim 11, further comprising:
dispensing a plurality of droplets of a third pre-polymer composition to form at least a portion of the polishing article; and
at least partially curing the plurality of droplets of the third pre-polymer composition by exposure thereof to electromagnetic radiation,
wherein the formed portion has a transmittance of >35% at wavelengths between 280-399 nm and a transmittance of >70% at wavelengths between 400-800 nm.

15. The method of claim 11, wherein the droplets of the first and second pre-polymer compositions are positioned onto a previously formed urethane acrylate polymer layer, and wherein partially curing the droplets of the first and second pre-polymer compositions further cures the previously formed urethane acrylate polymer layer.

16. The method of claim 11, wherein the droplets of the first and second pre-polymer compositions are exposed to electromagnetic radiation within 1 second or less of contacting a surface of a previously formed acrylate polymer layer.

17. The method of claim 1, wherein the positioned droplets of the first material precursor and the positioned droplets of the second material precursor form an interdigitated pattern.

18. The method of claim 11, wherein the positioned droplets of the first pre-polymer composition and the positioned droplets of the second pre-polymer composition form an interdigitated pattern.

19. A method of manufacturing a polishing article, comprising:
forming a polishing element by at least partially mixing a first polymer precursor and a second polymer precursor, wherein the first polymer precursor and the second polymer precursor have different compositions, and wherein at least partially mixing the first polymer precursor and second polymer precursor, comprises:
positioning, according to a first pixel chart, a pattern of droplets of the first polymer precursor on a previously formed polymer layer;
positioning, according to a second pixel chart, a pattern of droplets of the second polymer precursor on the previously formed polymer layer,
wherein at least some droplets of the first polymer precursor and at least some droplets of the second polymer precursor are positioned relative to one another to allow partial mixing therebetween; and
exposing the positioned droplets of the first and second polymer precursors to form a partially cured polymer layer, wherein exposing each of the positioned droplets of the first polymer precursor results in the droplet having a contact angle relative to a surface of a previously formed partially cured polymer layer of greater than or equal to 50 degrees.

20. The method of claim 19, wherein the positioned droplets of the first pre-polymer composition and the positioned droplets of the second pre-polymer composition form an interdigitated pattern.

21. The method of claim 19, wherein partially curing the droplets of the first and second pre-polymer compositions forms an interpenetrating polymer network within the polishing element.

* * * * *